US012736103B2

(12) United States Patent
Kropczynski et al.

(10) Patent No.: US 12,736,103 B2
(45) Date of Patent: Sep. 15, 2026

(54) END-STOP CONTROL VALVES FOR PROVIDING PROGESSIVE DAMPING FORCES IN VIBRATION DAMPERS

(71) Applicants: Thyssenkrupp Bilstein of America Inc., Hamilton, OH (US); Thyssenkrupp AG, Essen (DE)

(72) Inventors: Peter Kropczynski, Cincinnati, OH (US); Jayson Moore, Cincinnati, OH (US)

(73) Assignees: Thyssenkrupp Bilstein of America Inc., Hamilton, OH (US); thyssenkrupp AG, Essen (DE)

( * ) Notice: Subject to any disclaimer, the term of this patent is extended or adjusted under 35 U.S.C. 154(b) by 969 days.

(21) Appl. No.: 17/991,003

(22) Filed: Nov. 21, 2022

(65) Prior Publication Data

US 2024/0084873 A1 Mar. 14, 2024

Related U.S. Application Data

(63) Continuation-in-part of application No. 17/952,989, filed on Sep. 26, 2022, now Pat. No. 12,595,835.
(Continued)

(51) Int. Cl.
*F16F 13/00* (2006.01)
*B60G 15/06* (2006.01)
*B60G 17/08* (2006.01)

(52) U.S. Cl.
CPC .......... *F16F 13/007* (2013.01); *B60G 15/061* (2013.01); *B60G 17/08* (2013.01);
(Continued)

(58) Field of Classification Search
CPC ........................... F16F 2230/42; B60G 15/061
See application file for complete search history.

(56) References Cited

U.S. PATENT DOCUMENTS 3,038,560 A 6/1962 Long, Jr.
3,111,201 A 11/1963 Bliven et al.
(Continued)

FOREIGN PATENT DOCUMENTS

CN 108757811 A * 11/2018 ............. B60G 13/08
CN 114616407 A 6/2022
(Continued)

OTHER PUBLICATIONS

Javier Lizarraga Sener, Double Hydraulic Stop (DHS) Suspension, pp. 19-24 (2019).

*Primary Examiner* — Melody M Burch
(74) *Attorney, Agent, or Firm* — thyssenkrupp North America, LLC

(57) ABSTRACT

An end-stop control valve can progressively add end-of-stroke damping resistance to complement the damping force provided by a main piston in a damper tube. The end-stop control valve may include a piston that selectively engages with a catch piston, both of which are longitudinally movable within the damper tube. To reduce bypass around the piston, a piston band wrapped at least partially around the piston may engage with a sidewall of the catch piston just prior to engagement of the catch piston and the piston, although at least some hydraulic fluid can flow through a pathway of the piston band. A spring disc that moves with the piston may also engage with the catch piston just prior to engagement between the catch piston and the piston. The spring disc may elastically deform to contribute end-of-stroke resistance leading up to engagement of the piston and the catch piston.

18 Claims, 40 Drawing Sheets

Related U.S. Application Data

(60) Provisional application No. 63/405,337, filed on Sep. 9, 2022.

(52) U.S. Cl.
CPC ...... *B60G 2202/30* (2013.01); *B60G 2204/62* (2013.01); *B60G 2206/41* (2013.01); *B60G 2500/11* (2013.01); *B60G 2800/162* (2013.01); *F16F 2222/12* (2013.01); *F16F 2228/066* (2013.01); *F16F 2230/007* (2013.01); *F16F 2230/42* (2013.01); *F16F 2232/08* (2013.01); *F16F 2234/02* (2013.01)

(56) References Cited

U.S. PATENT DOCUMENTS

| | | | | |
|---|---|---|---|---|
| 4,768,629 | A | 9/1988 | Wossner | |
| 5,219,414 | A | 6/1993 | Yamaoka | |
| 5,580,034 | A | 12/1996 | Cheng | |
| 6,626,274 | B2 | 9/2003 | Pfundstein et al. | |
| 6,681,906 | B1 | 1/2004 | Sasse | |
| 7,975,994 | B2 | 7/2011 | Born et al. | |
| 8,162,112 | B2 | 4/2012 | Gartner et al. | |
| 8,418,820 | B2 | 4/2013 | Kim | |
| 9,695,899 | B2 | 7/2017 | Smith et al. | |
| 10,107,352 | B2 | 10/2018 | Grzesik et al. | |
| 10,208,830 | B2 | 2/2019 | Bruno et al. | |
| 10,371,226 | B2 | 8/2019 | Bruno et al. | |
| 10,683,906 | B2 | 6/2020 | Kus et al. | |
| 11,320,017 | B2 | 5/2022 | Bielak | |
| 2002/0027051 | A1 | 3/2002 | Grundei | |
| 2006/0290037 | A1 | 12/2006 | Born et al. | |
| 2010/0011395 | A1 | 1/2010 | Ito | |
| 2010/0059321 | A1 | 3/2010 | Boivin | |
| 2015/0192187 | A1 | 7/2015 | Smith et al. | |
| 2016/0025174 | A1 | 1/2016 | Lizarraga Senar | |
| 2016/0223045 | A1 | 8/2016 | Baldoni et al. | |
| 2018/0223942 | A1* | 8/2018 | Kus | F16F 9/165 |
| 2018/0355944 | A1 | 12/2018 | Veltum et al. | |
| 2020/0011395 | A1 | 1/2020 | Sankaran et al. | |
| 2020/0141466 | A1 | 5/2020 | Miyata et al. | |
| 2021/0054901 | A1 | 2/2021 | Gross et al. | |
| 2021/0088096 | A1 | 3/2021 | Baldoni et al. | |
| 2021/0115998 | A1 | 4/2021 | Meinert et al. | |
| 2021/0123495 | A1 | 4/2021 | Sankaran et al. | |
| 2021/0180662 | A1 | 6/2021 | Lizarraga Senar | |
| 2022/0333664 | A1 | 10/2022 | Kasprzyk et al. | |
| 2024/0084872 | A1 | 3/2024 | Kropczynski | |

FOREIGN PATENT DOCUMENTS

| | | | |
|---|---|---|---|
| CN | 114763818 | A | 7/2022 |
| DE | 15 05 360 | A1 | 3/1970 |
| DE | 35 33 387 | A1 | 3/1987 |
| DE | 100 41 199 | C1 | 11/2001 |
| DE | 10 2004 015 448 | B3 | 8/2005 |
| DE | 10 2005 002 007 | A1 | 3/2006 |
| DE | 10 2010 020 052 | A1 | 11/2011 |
| DE | 11 2016 000 630 | T5 | 11/2017 |
| DE | 20 2019 101 886 | U1 | 8/2020 |
| DE | 11 2020 005 512 | T5 | 8/2022 |
| DE | 11 2016 000 579 | T5 | 3/2024 |
| EP | 3 173 655 | A1 | 5/2017 |
| EP | 3 207 273 | A1 | 8/2017 |
| FR | 2 800 141 | A1 | 4/2001 |
| JP | 2008-151253 | A | 7/2008 |
| JP | 2021191967 | A | 12/2021 |
| WO | 2015/ 105 791 | A1 | 7/2015 |

* cited by examiner 104
112
402
110
166
152
170
402
116
174
114
302
134
400
118

116
404
174
152
314
114
302
110
400
134
318
322
326
404
118
204
104
112
306

116
404
174
152
314
110
114
302
400
134
318
322
404
326
118
204

104
112
306

END-STOP CONTROL VALVES FOR PROVIDING PROGESSIVE DAMPING FORCES IN VIBRATION DAMPERS

CROSS REFERENCE TO RELATED APPLICATION

This application is a continuation-in-part non-provisional that claims priority to U.S. patent application Ser. No. 17/952,989, filed Sep. 26, 2022, which in turn claims priority to U.S. Provisional Patent Application No. 63/405,337, filed Sep. 9, 2022, both of which are hereby incorporated by reference in their entireties.

FIELD

The present disclosure generally relates to vibration dampers, including end-stop control valves that are configured to provide a progressive amount of damping force in vibration dampers used in vehicles.

BACKGROUND

Vibration dampers or "shock absorbers" are used in automotive, recreational, and industrial vehicles to assist the vehicle in adapting to different driving conditions due to irregularities in the road such as bumps, potholes, and other road surface anomalies. Vibration dampers are also used to assist a vehicle in traveling over more extreme conditions such as off-road driving. In certain conditions, such as high-speed driving or off-road driving, for instance, the irregularities can be severe and may cause a standard vibration damper to bottom out, that is, abruptly reach its maximum compression or maximum rebound position and produce a jarring impact. When such a maximum compression or maximum rebound position occurs in the vibration damper, a sudden jolt can cause the respective wheel to lift off the ground. Hence, this jarring impact can also lead to a loss of traction.

To address such problems, vibration dampers with controlled compression stage end position damping were developed. Such a vibration damper is known from WIPO Patent Publication No. WO2015/105791 A1, where the vibration damper includes a first piston for controlling the rebound stage and the compression stage and a piston rod with a valve assembly. The first piston is arranged on the piston rod. If the valve assembly on the piston rod enters an end region of the damper tube in compression, the valve assembly engages a second piston to cause an increase in damping force. The second piston can be moved even farther in compression towards a third piston, which interacts with the second piston and causes a further increase in damping force. Vibration dampers like that disclosed in WIPO Patent Publication No. WO 2015/105791 A1 are oftentimes referred to as jounce control vibration dampers. More recent efforts, such as those disclosed in German Utility Model Application No. DE202019101886 U1, for example, have incorporated such "end-stop" or "auxiliary" pistons at both ends of the vibration damper to either prevent or at least ease into a state where the vibration damper is at a maximum compression position or a maximum rebound position.

However, the increase in damping force associated with such known auxiliary pistons resembles a step function into a peak force output, with a large increase in damping force being supplied as the auxiliary piston is engaged. Although this large increase in damping force is not nearly as harsh as the forces present at a maximum compression or maximum rebound position in a vibration damper without any form of jounce or rebound control, the jump in damping force can potentially cause a large, rapid change in acceleration; undesirable noise, vibration, and harshness (NVH) effects within the vehicle; and a change in performance.

SUMMARY

A vibration damper may include a damper tube that contains hydraulic fluid. A main piston may be secured to a piston rod that is longitudinally movable within the damper tube. The main piston divides an interior of the damper tube into a first working chamber and a second working chamber. An end-stop control valve that can be used for jounce cutoff (JCO) may be positioned in the first working chamber. In some examples, the end-stop control valve can be positioned in the second working chamber for rebound cutoff (RCO). In still other examples, a vibration damper may include a JCO end-stop control valve and an RCO end-stop control valve.

The end-stop control valve may include a piston that is arranged on the piston rod and is configured to move longitudinally within the damper tube. The piston may include a valve seat. The end-stop control valve may further include a valve disc stack-up arranged on the piston rod. A radially inner portion of the valve disc stack-up may be supported on a hub of the piston or a hub of a piston insert, and a radially outer portion of the valve disc stack-up may be supported on the valve seat of the piston.

Further, an elongate catch piston of the end-stop control valve may be disposed within the damper tube so as to form a seal between a radial exterior of the elongate catch piston and an inner wall of the damper tube. The piston is configured to engage the elongate catch piston and form a seal between the piston and the elongate catch piston during an end-of-stroke damping event. A third working chamber exists between the elongate catch piston and an end of the damper tube where hydraulic fluid is trapped. As a result, to leave the third working chamber when the piston and the elongate catch piston are engaged, hydraulic fluid must pass through passages that extend from a first longitudinal side of the piston to a second longitudinal side of the piston.

However, just prior to engagement of the elongate catch piston and the piston, several features of the end-stop control valve help ease into the end-of-stroke damping resistance provided by deflecting the valve disc stack-up away from the valve seat of the piston. First, the end-stop control valve may include a piston band that is arranged on the piston and at least partially surrounds the piston. As the end-of-stroke damping event begins, the piston comes within the elongate catch piston but does not contact the elongate catch piston. Meanwhile, the piston band contacts a sidewall of the elongate catch piston because the piston band protrudes farther radially than the piston. The piston band may include a pathway that extends longitudinally and permits hydraulic fluid to flow from the third working chamber to the first working chamber or, in other words, from a first longitudinal side of the piston and the elongate catch piston to a second longitudinal side. The pathway through or by the piston band may be a main flow path for hydraulic fluid to pass from the first longitudinal side of the catch piston to the second longitudinal side of the catch piston, particularly as hydraulic fluid will travel through the pathway before travelling through the passages of the piston and deflecting the valve disc stack-up. Although once the piston engages with the elongate catch piston, hydraulic fluid does not flow through the pathway of the piston band. The pathway may be formed by a break in a split ring, which split ring is positioned in a recess that encircles the piston, for example. Nevertheless, an amount of bypass around the piston is greatly reduced when the piston band contacts the elongate catch piston, and thus the end-stop control valve begins to generate at least some initial end-of-stroke damping.

Second, a spring disc may also be disposed on the piston rod such that the spring disc can move longitudinally with the piston within the damper tube. Just before the piston contacts the elongate catch piston, the spring disc may contact a support such as a support edge, a support surface, a flange, a lip, a rim, or a valve seat, for example, of the elongate catch piston. When the spring disc contacts the support of the elongate catch piston, but prior to any deformation of the spring disc, a first contact surface of the piston may be spaced longitudinally apart 0.2 mm to 5.0 mm from a second contact surface of the elongate catch piston. When the spring disc initially makes contact with the elongate catch piston, the spring disc is in a neutral, steady state and is not elastically deformed. Conversely, when the piston contacts the elongate catch piston, the spring disc is elastically deformed in a longitudinal direction to a state of maximum deformation. In moving from the neutral, steady state to the state of maximum deflection, the spring disc contributes end-of-stroke resistance. In some examples, hydraulic fluid can pass through openings in the spring disc that are circumferentially spaced apart.

A washer may be secured on the piston rod, in direct contact with one side of the spring disc. The washer may serve as a fulcrum about which the spring disc bends. In some instances, a diameter of the washer is 28%-63% of a diameter of the spring disc. The washer may be particularly advantageous in cases where there is a need to space the spring disc longitudinally apart from other components, such as spacer discs, that have a diameter that is too large or too small to enable the spring disc to be effective. As an alternative to the washer that serves as a fulcrum, a spring may be disposed along the piston rod adjacent to the spring disc. An end of the spring that is distal the spring disc may be longitudinally fixed. The spring and the spring disc may be configured such that the spring begins to compress after the spring disc contacts the support of the elongate catch piston. As the spring compresses, the spring slows the motion of the piston towards the elongate catch piston and thereby begins to generate end-of-stroke damping resistance.

The resistance provided by using the piston band to decrease bypass around the piston and by elastically deforming the spring disc is less than the end-of-stroke resistance that is attributable to deflecting the valve disc stack-up from the valve seat of the piston when the piston and the elongate catch piston engage. Notwithstanding, the contributions to end-of-stroke damping resistance provided by the piston band and the disc spring greatly smooth the transition into the end-of-stroke damping event. In some cases, the valve disc stack-up and the spring disc may be configured such that a force that is required to deflect the valve disc stack-up off the valve seat of the piston is greater than a force that is required to elastically deform the spring disc in a longitudinal direction. Conversely, in other cases, the valve disc stack-up and the spring disc may be configured such that a force that is required to elastically deform the spring disc in a longitudinal direction is greater than a force that is required to deflect the valve disc stack-up off the valve seat of the piston.

In some examples, the end-stop control valve may involve a combination of the spring disc and a two-part piston structure. For instance, a portion of a valve piston insert may be disposed at one or more longitudinal locations radially within the piston. The piston may be longitudinally movable relative to the valve piston insert in an assembled state of the end stop control valve. And the radially inner portion of the valve disc stack-up may be supported on a hub of the valve piston insert. The piston and the valve piston insert are configured such that a preload, which is based on a longitudinal distance between the valve seat of the piston and the hub of the valve piston insert, increases from an initial preload to a maximum preload during the end-of-stroke damping event. Preload is indicative of the degree to which the valve disc stack-up is held against (or spaced apart from) the valve seat of the auxiliary piston. The greater the initial preload, the more firmly the valve disc stack-up will be held against the valve seat. Damping force provided by the end-stop control valve increases as the longitudinal distance between the valve seat and the hub—and thus the preload—increases during the end-of-stroke damping event. The relative movement between the piston and the valve piston insert enables the end-stop control valve to progressively increase the amount of damping force during the end-of-stroke damping event.

In still other examples, the piston and the catch piston may be sized and shaped to form an annular pocket therebetween as a contact surface of the piston approaches a contact surface of the elongate catch piston during the end-of-stroke damping event. The contact surfaces may be transverse to a longitudinal axis along which the piston and elongate catch piston are configured to move. Nonetheless, the pocket may be formed radially and directly between a first segment of the piston and an elongate sidewall of the elongate catch piston and formed longitudinally and directly between the contact surfaces of the piston and the elongate catch piston. A limited number of flow paths to and from the pocket causes the end-stop control valve to start generating resistance before the contact surface of the piston engages the contact surface of the elongate catch piston to output peak resistance. In some cases, the piston and the elongate piston are configured such that the pocket between the piston and the catch piston is formed only after a piston band engages the elongate sidewall of the catch piston and only after the first segment of the piston engages an inner portion of the catch piston.

One path for hydraulic fluid to/from the pocket is via a series of channels in the first segment of the piston that are in fluid communication with one or more of the passages in the piston. The channels may be longitudinally spaced apart such that the channels cease to lead directly into the pocket as each channel reaches or passes the inner portion of the elongate catch piston that engages with the first segment of the piston. As more channels reach the inner portion of the elongate catch piston as the contact surface of the piston approaches the contact surface of the elongate catch piston, the cross-sectional area for hydraulic fluid to leave the pocket decreases. The pocket may cease to exist when the contact surfaces are engaged, and during such time the only way for hydraulic fluid to pass from one longitudinal side of the piston to the other is via the longitudinally-extending passages and via deflection of the valve disc stack-up. Upon separation of the contact surfaces, the pocket refills with hydraulic fluid and the channels once again open directly into the pocket.

Another way for hydraulic fluid to enter/exit the pocket is via a pathway in the piston band. Still another way for hydraulic fluid to enter/exit the pocket is via a bypass notch that extends longitudinally in the first segment of the piston. The bypass notch creates an opening between the first segment of the piston and the inner portion of the elongate catch piston through which hydraulic fluid can flow. Those having ordinary skill in the art will appreciate that multiple or all of these flow paths (e.g., the series of channels, the pathway in the piston band, the bypass notch) may be used in combination.

When the piston changes directions and begins retreating from the elongate catch piston, one way for hydraulic fluid to refill the pocket is via bypass ducts in a second segment of the piston. The second segment may be adjacent to the valve disc stack-up that is disposed alongside the piston. The bypass ducts may extend longitudinally, may be circumferentially spaced apart, and may be selectively opened and closed. For example, a recess of the piston in which the piston band is disposed may have a greater longitudinal extent than the piston band such that the piston band is configured to slide longitudinally in the recess. When the contact surfaces are approaching one another, the piston band may cover and thus close the bypass ducts. However, when the contact surfaces are being separated, the piston band may slide longitudinally within the recess to uncover and thus open the bypass ducts.

It should be appreciated that the present disclosure contemplates the combination of various aspects from different examples. For instance, some example vibration dampers may include an end-stop control valve that includes a spring disc as well as a piston and a catch piston that are configured to generate a pocket as a contact surface of the piston approaches a contact surface of the catch piston. Elastically deforming the spring disc and controllably discharging hydraulic fluid from the pocket helps ease into the peak resistance provided by the end-stop control valve. In some cases, the vibration damper may have such an end-stop control valve on the JCO-side of a main piston and such an end-stop control valve on an RCO-side of the main piston.

DETAILED DESCRIPTION

Although certain example methods and apparatuses are described herein, the scope of coverage of this patent is not limited thereto. On the contrary, this patent covers all methods, apparatuses, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claim need not necessarily be performed in the order in which they are recited, unless so required by the context of the claims. In addition, all references to one skilled in the art shall be understood to refer to one having ordinary skill in the art. With respect to the drawings, it should be understood that not all components are drawn to scale. Furthermore, those having ordinary skill in the art will understand that the various examples disclosed herein should not be considered in isolation. Rather, those with ordinary skill in the art will readily understand that the disclosure relating to some examples may be combined with and/or equally applicable to the disclosure relating to other examples.

Figure 1:
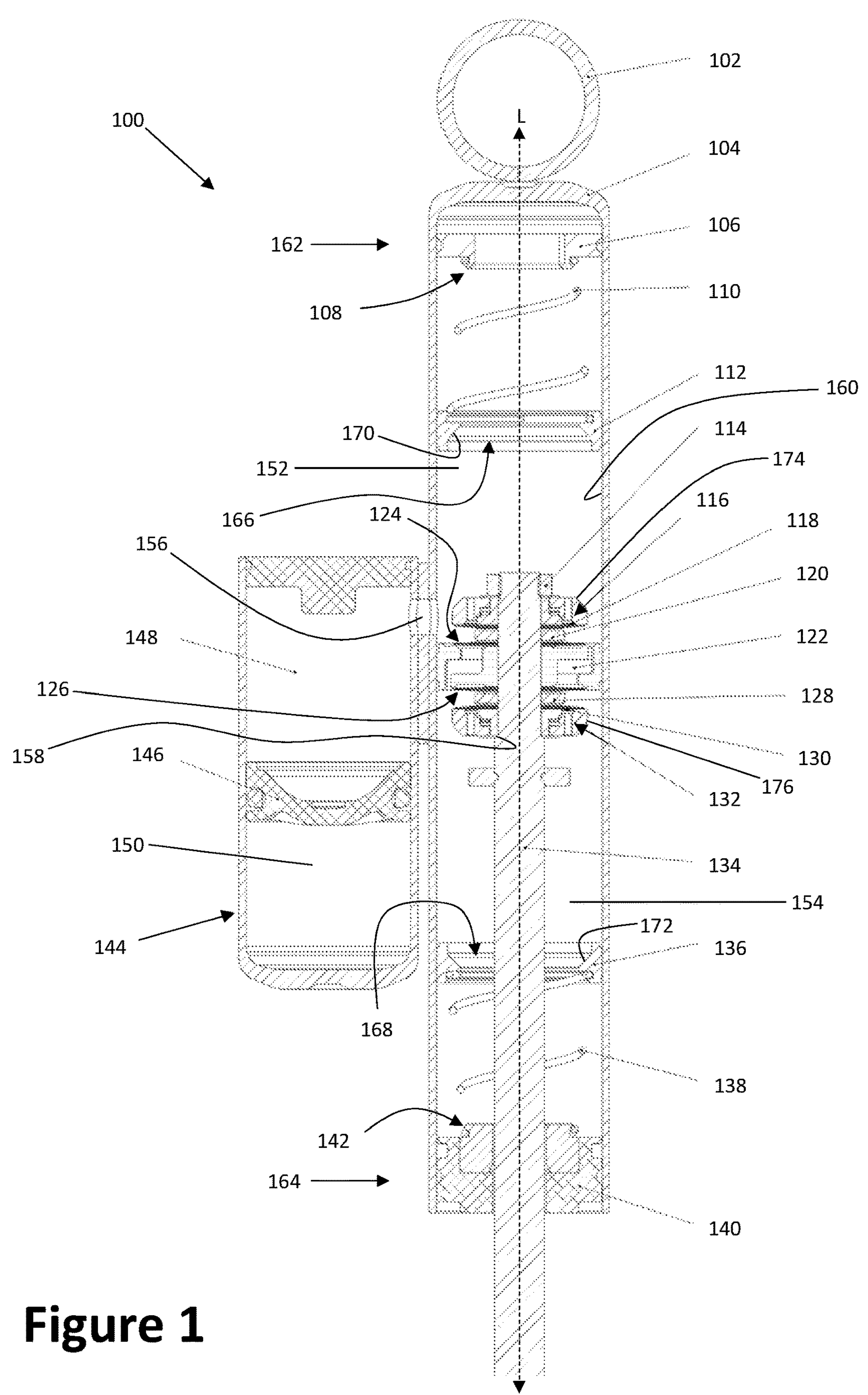
FIG. 1 is a cross-sectional view of an example vibration damper with end-stop control valves that are configured to provide a progressive amount of damping force.
Figure 2:
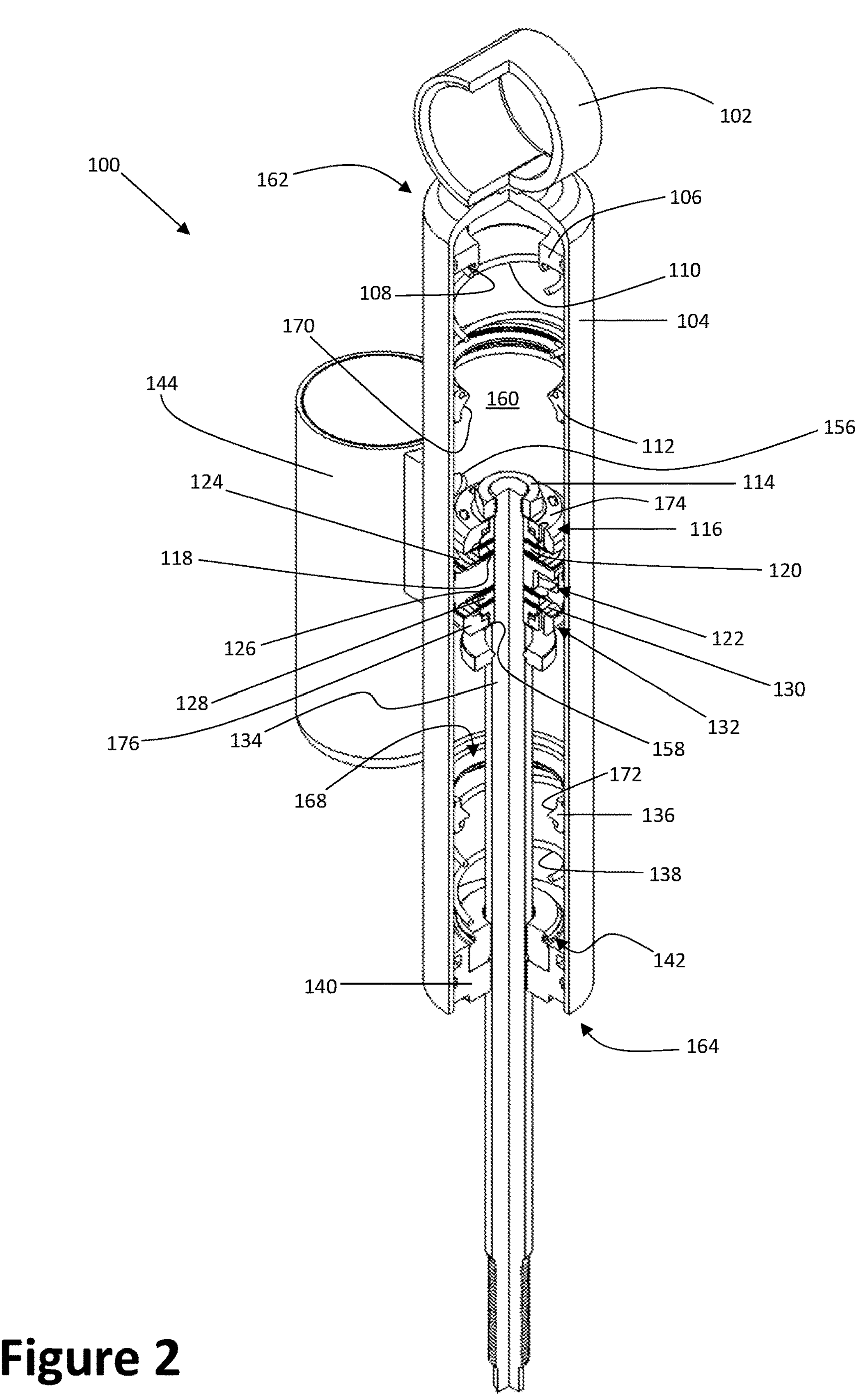
FIG. 2 is a 90° cutaway view of the example vibration damper shown in FIG. 1.

An example vibration damper 100 is shown in FIGS. 1 and 2, with FIG. 1 showing a cross-sectional view of the vibration damper 100 and FIG. 2 showing a cutaway view of the vibration damper 100. In general, the vibration damper 100 in this example includes an eye ring 102, a damper tube 104, a jounce cutoff (JCO) crimp ring 106 with spring retention means 108, a JCO spring 110, a JCO catch piston 112, a piston rod assembly fastener 114, a JCO valve piston assembly 116, a JCO valve disc stack-up 118 of the JCO valve piston assembly 116, a first brake washer 120, a main piston 122 with valve discs 124, 126, a second brake washer 128, a rebound cutoff (RCO) valve disc stack-up 130, an RCO valve piston assembly 132, a piston rod 134, an RCO catch piston 136, an RCO spring 138, a sealing package 140, spring retention means 142, and a reservoir 144 with a dividing piston 146 that separates the reservoir 144 into a first volume 148 and a second volume 150.

The main piston 122, the JCO valve piston assembly 116, and the RCO valve piston assembly 132, amongst other components, may be positioned along the piston rod 134 so as to be movable with the piston rod 134 in the damper tube 104 along a longitudinal axis L. The main piston 122 separates an interior of the damper tube 104 into a first working chamber 152 and a second working chamber 154, with the JCO valve piston assembly 116 being disposed in the first working chamber 152 and the RCO valve piston assembly 132 being disposed in the second working chamber 154. The working chambers 152, 154 are fluidly connected to one another by the main piston 122 depending on a direction of movement of the piston rod 134. For this purpose, the main piston 122 includes the valve discs 124, 126, which govern flow of hydraulic fluid during, respectively, a compression stage and a rebound stage of the vibration damper 100. During operation, the working chambers 152, 154 are filled with hydraulic fluid (not shown) or damper oil. To increase the damping force in the end regions of the damper tube 104, the JCO valve piston assembly 116 and the RCO valve piston assembly 132 engage, respectively, with the associated catch pistons 112, 136, which will be discussed in more detail further below.

The vibration damper 100 in this example also includes the reservoir 144 in which the dividing piston 146 for separating a damper gas from hydraulic fluid is movably arranged. In other words, the dividing piston 146 separates the first volume 148, which contains hydraulic fluid, from the second volume 150, which contains gas. The first volume 148 is fluidically connected to the first working chamber 152 of the damper tube 104 via a through-opening 156. During operation, the first volume 148 in the reservoir 144, much like the first and second working chambers 152, 154, is filled with hydraulic fluid. The second volume 150 is filled with gas, which charges, pressurizes, or otherwise biases the dividing piston 146 against the hydraulic fluid.

As can be seen in FIGS. 1 and 2, the main piston 122 is disposed between the JCO valve piston assembly 116 and the RCO valve piston assembly 132 on the piston rod 134. More specifically, the JCO valve piston assembly 116, the JCO valve disc stack-up 118 thereof, the first brake washer 120, the main piston 122, the second brake washer 128, the RCO valve piston assembly 132, and the RCO valve disc stack-up 130 thereof may be securely fastened along the piston rod 134 between the piston rod assembly fastener 114 and a shoulder 158, for example, of the piston rod 134. Hence, in the case of a compression stage or a rebound stage, the main piston 122, the JCO valve piston assembly 116, and the RCO valve piston assembly 132 move longitudinally with the piston rod 134. In many cases, the JCO valve piston assembly 116 and the RCO valve piston assembly 132 are mirror images of one another. In other cases, though, the JCO valve piston assembly 116 may be different (e.g., in terms of piston shape and/or valve disc stack-up) than the RCO valve piston assembly 132.

A radial gap is provided between the JCO valve piston assembly 116 and an inner wall 160 of the damper tube 104. Likewise, a radial gap is provided between the RCO valve piston assembly 132 and the inner wall 160 of the damper tube 104. Consequently, so long as neither the JCO catch piston 112 nor the RCO catch piston 136 is engaged, hydraulic fluid can flow around the JCO valve piston assembly 116 and around the RCO valve piston assembly 132 during operation of the vibration damper 100.

In some examples, vibration dampers may further include a spacer element that is disposed between a JCO valve piston assembly and a main piston. The spacer element may be pushed onto the piston rod and may, depending on the configuration, prevent the main piston from passing over a through-opening that leads to a reservoir. The spacer element may have a smaller radial extent than the valve piston assemblies. In other words, the spacer element may be configured to be smaller transversely to the longitudinal direction of the vibration damper than the valve piston assemblies. Further, the spacer element can be cylindrical. It should also be understood that the spacer element can have an angular cross section. In other words, the spacer element can also be cuboid.

With continued reference to the example vibration damper 100 shown in FIGS. 1 and 2, the JCO valve piston assembly 116 faces a first end 162 of the damper tube 104. The first end 162 of the damper tube 104 corresponds to an end of the damper tube 104 that faces away from the piston rod 134. The RCO valve piston assembly 132 faces a second end 164 of the damper tube 104. The second end 164 of the damper tube 104 corresponds to an end of the damper tube 104 on the piston rod side. The sealing package 140 is arranged in the damper tube 104 at the second end 164 of the damper tube 104. In some cases, the sealing package 140 may be positively connected to the damper tube 104. The sealing package 140 may be connected to the damper tube 104 by crimping. The piston rod 134 is guided in the sealing package 140 so that the piston rod 134 can move longitudinally.

In the first working chamber 152 of the damper tube 104, the JCO catch piston 112 is disposed towards the first end 162. The JCO catch piston 112 is movable longitudinally within the damper tube 104, although the JCO spring 110 restores the JCO catch piston 112 to the position shown in FIG. 1 when the JCO catch piston 112 is not engaged. Similarly, in the second working chamber 154 of the damper tube 104, the RCO catch piston 136 is disposed towards the second end 164. The RCO catch piston 136 is movable longitudinally within the damper tube 104, although the RCO spring 138 restores the RCO catch piston 136 to the position shown in FIG. 1 when the RCO catch piston 136 is not engaged. Further, the catch pistons 112, 136 may be annular and may be arranged in a sealing manner with respect to the inner wall 114 of the damper tube 104.

The catch pistons 112, 136 each have a main opening 166, 168 that extends longitudinally and is configured as a longitudinally-extending through opening. Each main opening 166, 168 has a sealing area 170, 172 that is configured to mate with a respective portion of the valve piston assemblies 116, 132. In particular, in the case of end-of-travel damping in compression a JCO piston 174 of the JCO valve piston assembly 116 engages and mates with the sealing area 170 of the JCO catch piston 112 to form a seal. In the case of end-of-travel damping in rebound, a RCO piston 176 of the RCO valve piston assembly 132 engages and mates with the sealing area 172 of the RCO catch piston 136 to form a seal. As can be seen especially in FIG. 1, the JCO piston 174 and the RCO piston 176 each have an outer contour that complements the sealing areas 170, 172 of the main openings 166, 168.

Also arranged at the first end 162 of the damper tube 104 is the JCO crimp ring 106, which may be positively connected to the damper tube 104 by crimping. The JCO crimp ring 106 and/or the sealing package 140 can also be pressed into the damper tube 104. In other words, the JCO crimp ring 106 and/or the sealing package 140 can be connected to the damper tube 104 in a non-positive manner. The JCO crimp ring 106 and/or the sealing package 140 can additionally or alternatively be integrally connected to the damper tube 106 by welding. In general, it is also conceivable for the JCO crimp ring 106 and/or the sealing package 140 to be connected to the damper tube 104 by still other techniques, including combinations of the connection types mentioned above.

The JCO crimp ring 106 and the sealing package 140 have spring retention means 108, 142 on which the JCO spring 110 and the RCO spring 138 are, respectively, fixedly arranged. The JCO crimp ring 106 and the sealing package 140 are arranged with the spring retention means 108, 142 in the longitudinal direction opposite the respective catch piston 112, 136. The spring retention means 108, 142 serve as an abutment on which the springs 110, 138 are supported. The springs 110, 138 hold the catch pistons 112, 136 in respective longitudinal starting positions when the catch pistons 112, 136 are not engaged. In particular, after end-of-stroke cushioning, the JCO spring 110 guides the JCO catch piston 112 in a compression stage after longitudinal displacement or movement by the JCO valve piston assembly 116 back into the original, longitudinal starting position. Likewise, after end-of-stroke cushioning, the RCO spring 138 guides the RCO catch piston 136 in a rebound stage after longitudinal displacement or movement by the RCO valve piston assembly 132 back into the original, longitudinal starting position. As explained above, the springs 110, 138 serve as return springs. Furthermore, the JCO crimp ring 106 may also include an opening 178 for receiving at least part of the piston rod assembly fastener 114 and the piston rod 134 in a full compression stroke.

The general operation of the vibration damper 100 and the flow of hydraulic fluid therein will now be explained with reference to FIGS. 3A-3D, particularly with respect to the relation between the main piston 122 and the valve piston assemblies 116, 132. However, specific details regarding JCO and RCO valve piston assemblies will be explained further below with reference to more-detailed figures. And although FIGS. 3A-3D concern a compression stroke and thus primarily JCO-related components, those having ordinary skill in the art will understand the applicability of this teaching to a rebound stroke and RCO-related components as well. Finally, it should be understood that FIGS. 3A-3D show a simplified version of the vibration damper 100, as some parts have been omitted to facilitate the explanation.

Figure 3A:
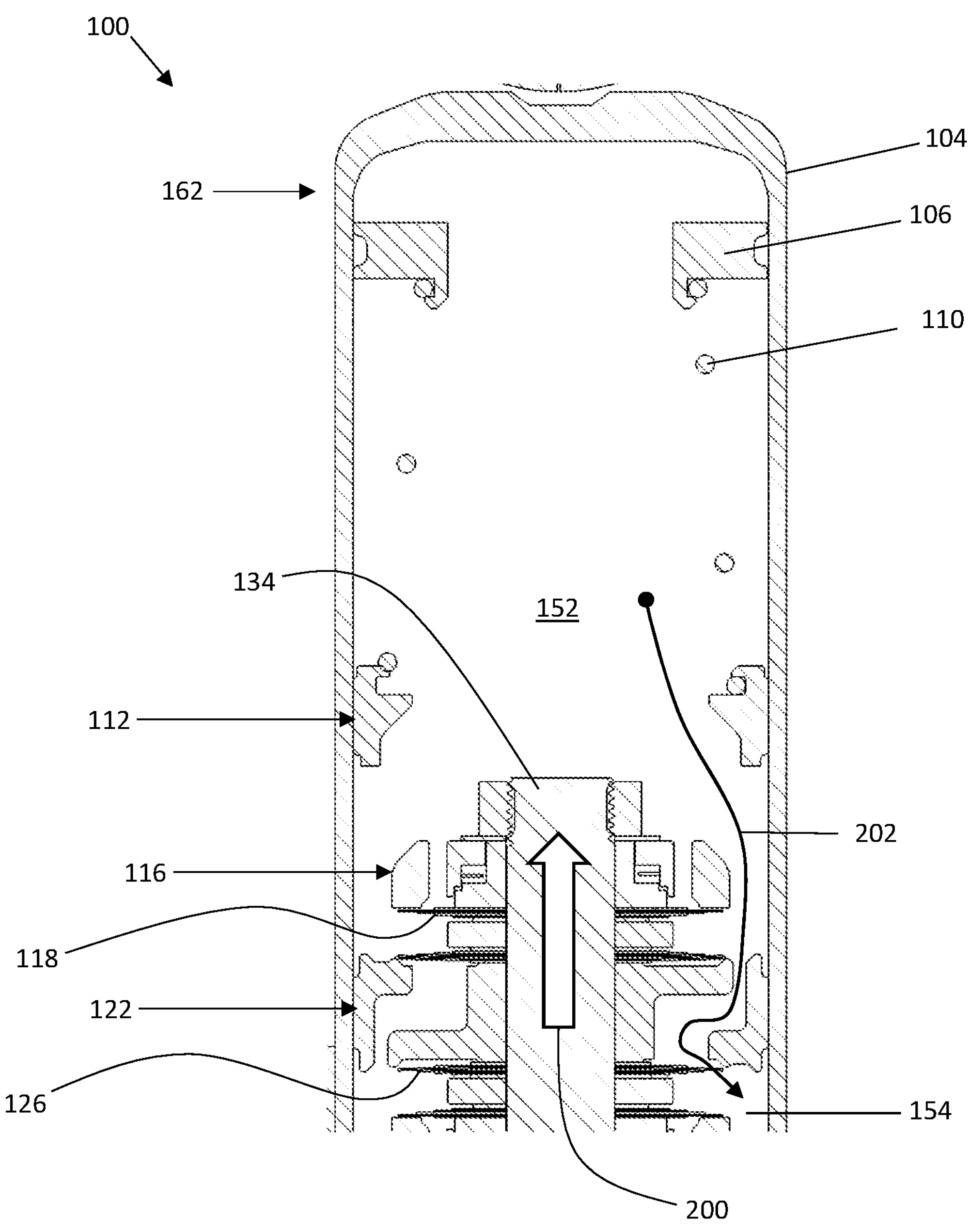
FIG. 3A is a cross-sectional view showing a first step in a sequence whereby an example end-stop control valve is engaged and then disengaged.

To reiterate, end-of-stroke damping is utilized in compression and in rebound where large displacement of the piston rod 134 occurs. To this end, FIG. 3A shows the piston rod 134 moving in a compression stroke towards the first end 162 of the damper tube 104, as represented by an upward-pointing arrow 200. Due to the stroke movement of the main piston 122 and due to the JCO valve piston assembly being spaced apart from the JCO catch piston 112, the hydraulic fluid flows from the first working chamber 152, around the JCO valve piston assembly 116, through the main piston 122, deflecting the valve discs 126 thereof, and into the second working chamber 154, as represented by a flow path 202.

Figure 3B:
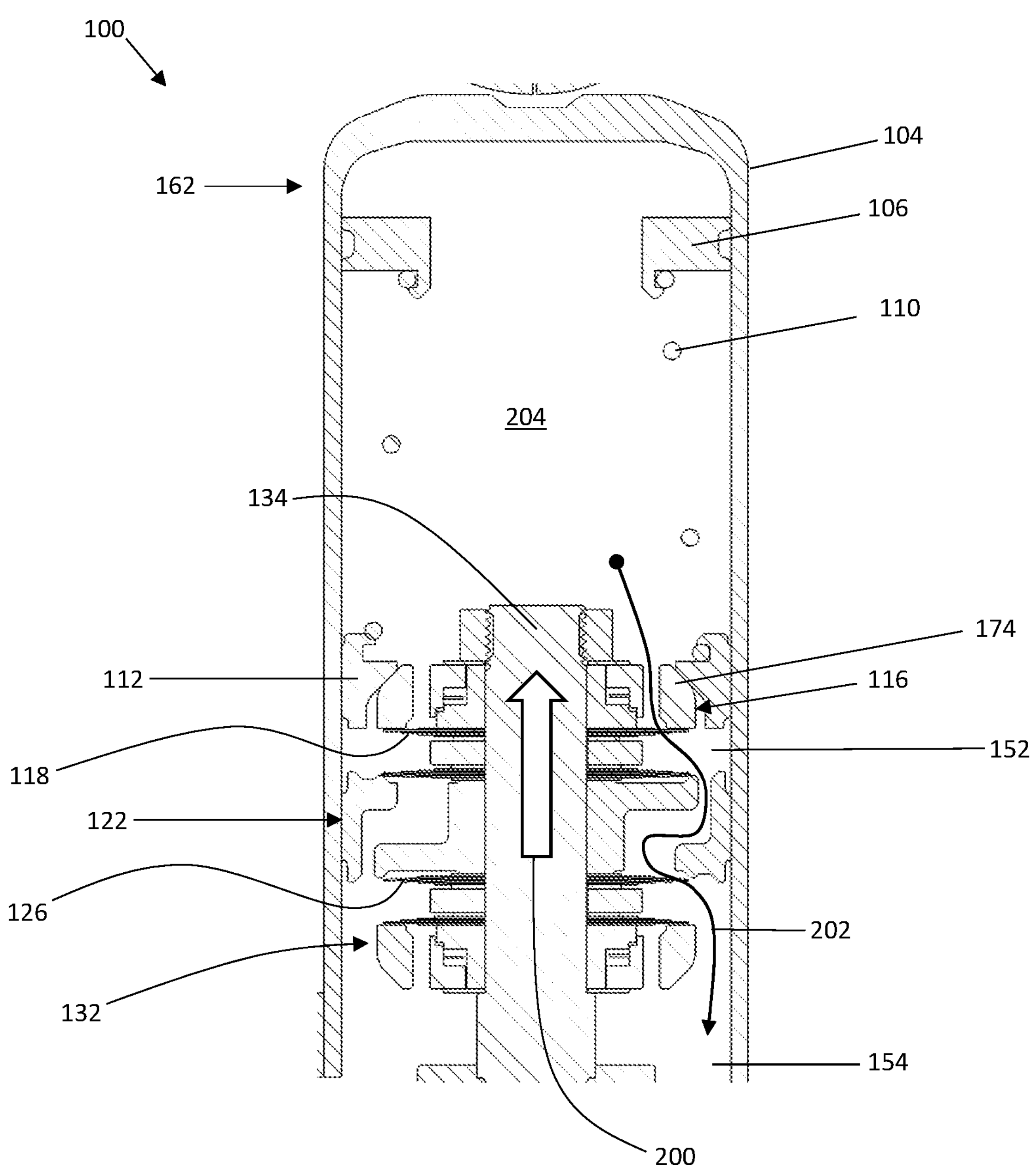
FIG. 3B is a cross-sectional view of an example vibration damper showing a second step in a sequence whereby an example end-stop control valve is engaged and then disengaged.

As shown in FIG. 3B, if the piston rod 134 is driven far enough into the damper tube 104, the JCO valve piston assembly 116, specifically, the JCO piston 174 thereof, engages and mates with the JCO catch piston 112 to form a seal. At this point, hydraulic fluid is sealed in a third working chamber 204, which in FIG. 3B is above the JCO catch piston 112. More details regarding flow through the JCO valve piston assembly 116 will be provided further below, but for now suffice it to say that the hydraulic fluid passes from the third working chamber 204 through the JCO valve piston assembly 116, deflecting the JCO valve disc stack-up 118 thereof, into the first working chamber 152 above the main piston 122, through the main piston 122, deflecting the valve discs 126 thereof, and into the second working chamber 154, as again represented by a flow path 202. Because the hydraulic fluid is passing through both the main piston

122 and the JCO valve piston assembly 116, the damping force provided by the deflection of the JCO valve disc stack-up 118 of the JCO valve piston assembly 116 is additive to the damping force provided by the deflection of the valve discs 126 of the main piston 122.

Figure 3C:
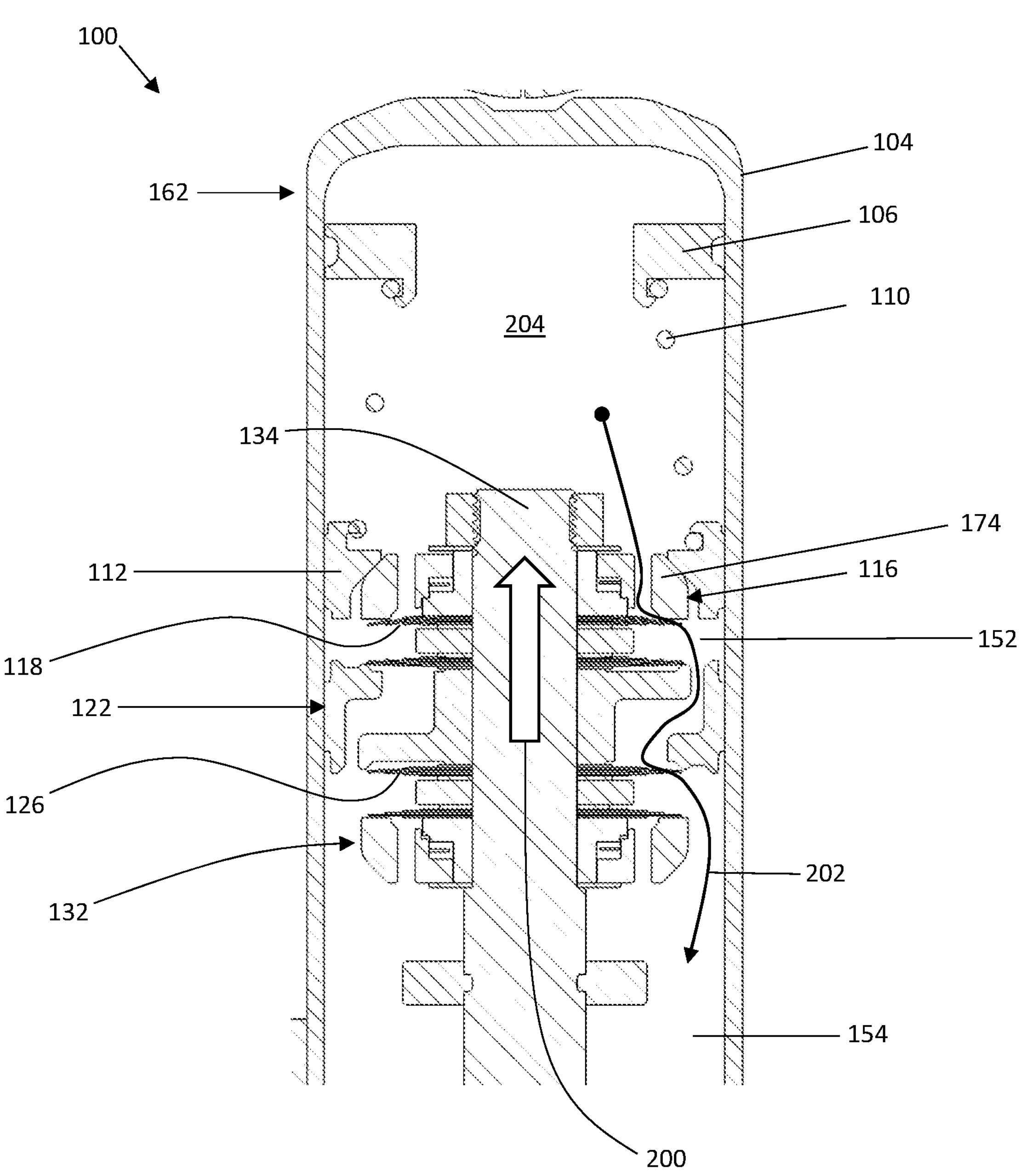
FIG. 3C is a cross-sectional view of an example vibration damper showing a third step in a sequence whereby an example end-stop control valve is engaged and then disengaged.

As reflected in FIG. 3C, as the compression stroke continues, the volume of the third working chamber 204 becomes smaller as the JCO catch piston 112 and the JCO valve piston assembly 116 move closer to the first end 162 of the damper tube 104. The JCO valve disc stack-up 118 deflects even more as the pressure of the hydraulic fluid in the third working chamber 204 builds, thereby providing an increasing amount of damping force.

Figure 3D:
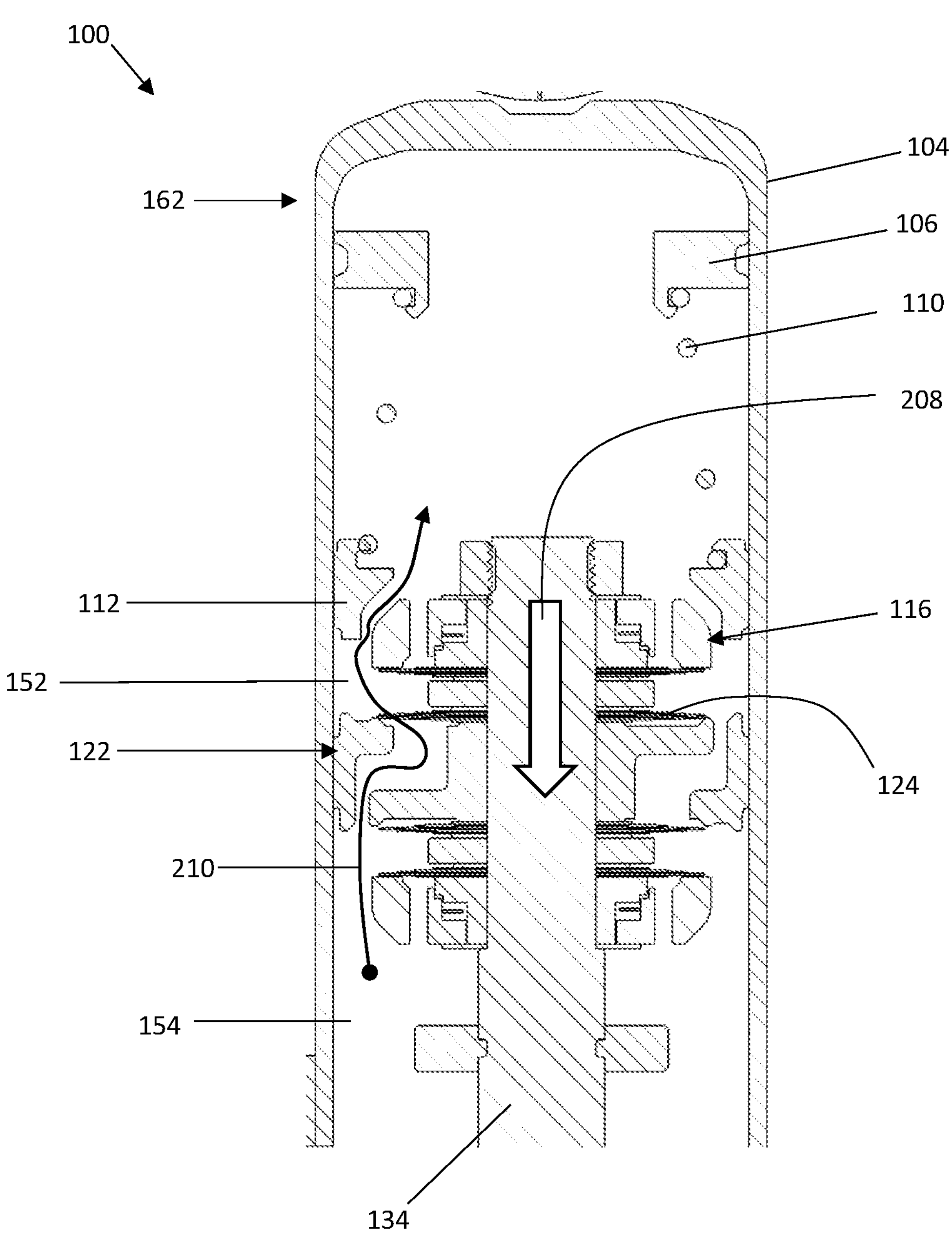
FIG. 3D is a cross-sectional view of an example vibration damper showing a fourth step in a sequence whereby an example end-stop control valve is engaged and then disengaged.

Immediately following the end of the compression stroke, the JCO valve piston assembly 116 disengages from the JCO catch piston 112 as the piston rod 134, the JCO valve piston assembly 116, the main piston 122, and other components disposed along the piston rod 134 begin moving away from the first end 162 of the damper tube 104, as shown by a downward-pointing arrow 208 in FIG. 3D. Consequently, as reflected by a flow path 210, hydraulic fluid flows from the second working chamber 154 through the main piston 122, deflecting the valve discs 124 thereof, into the first working chamber 152 and around the JCO valve piston assembly 116. The third working chamber ceases to exist due to the separation of the JCO valve piston assembly 116 from the JCO catch piston 112. The JCO spring 110 then returns the JCO catch piston 112 to its longitudinal starting position.

One having ordinary skill in the art would understand how hydraulic fluid may flow similarly in a rebound stroke involving the RCO valve piston assembly 132 and the RCO catch piston 136.

Figure 4:
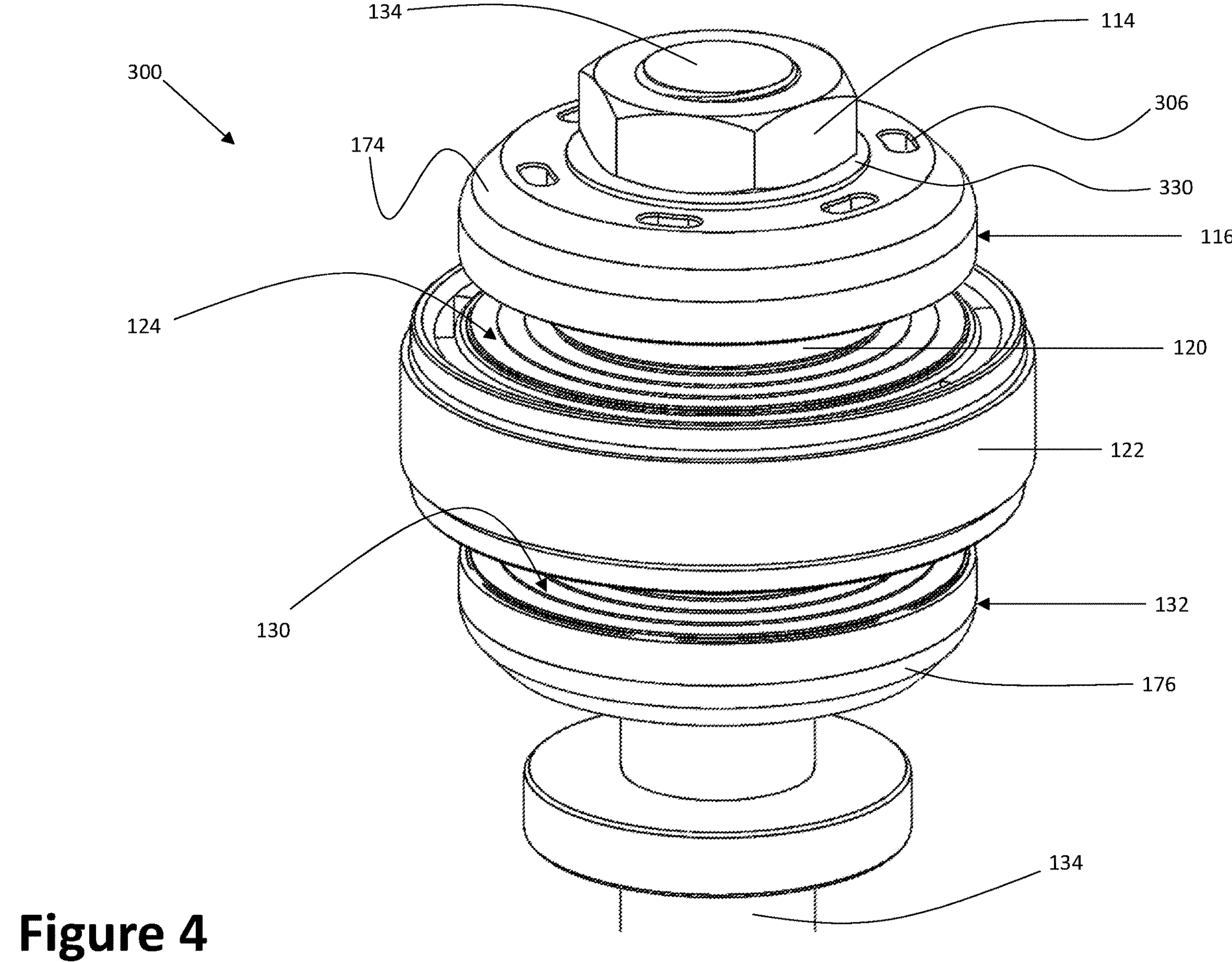
FIG. 4 is a perspective view of an example assembly involving multiple pistons disposed at a distal end of a piston rod.
Figure 5:
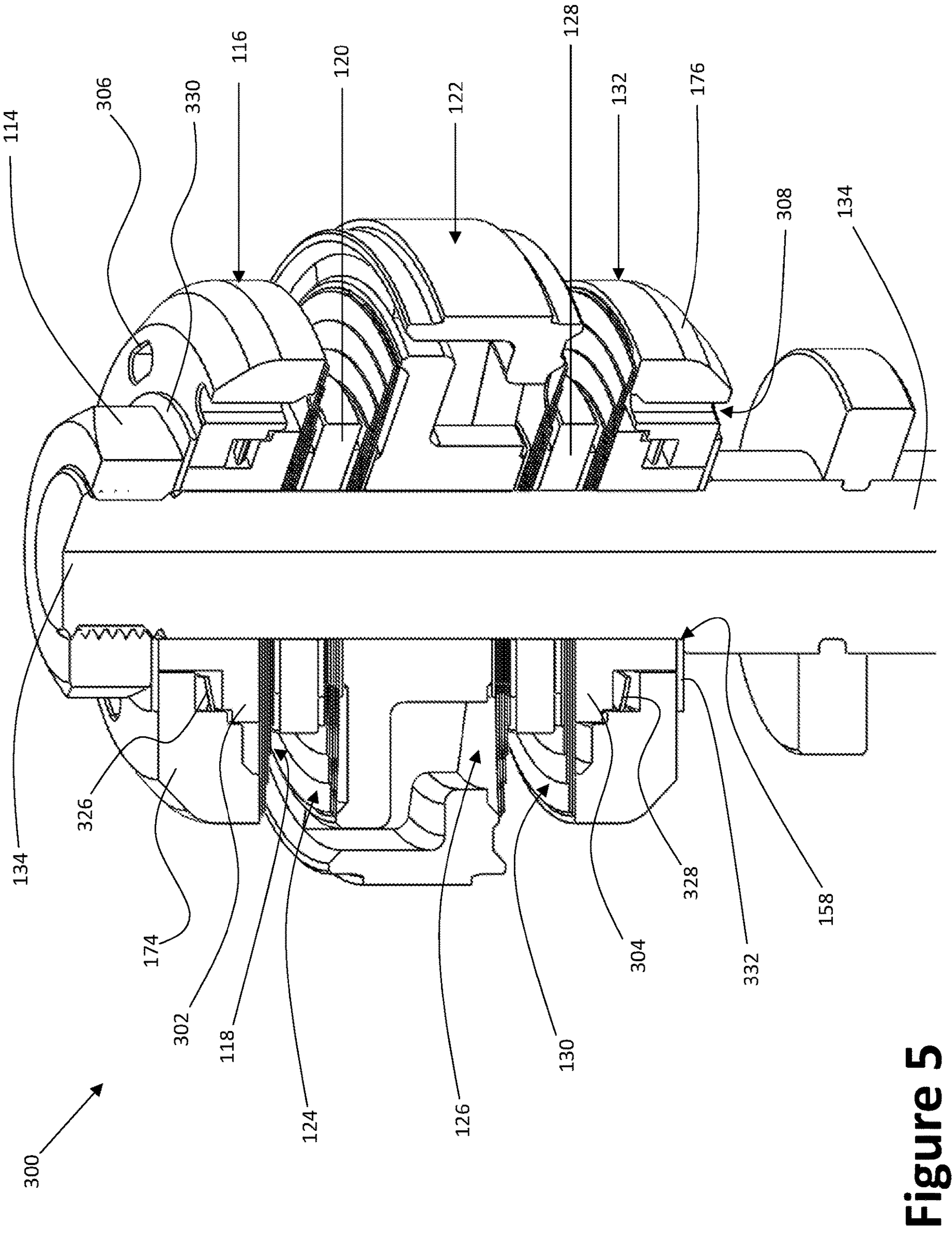
FIG. 5 is a 135° cutaway view of the example assembly shown in FIG. 4.
Figure 6:
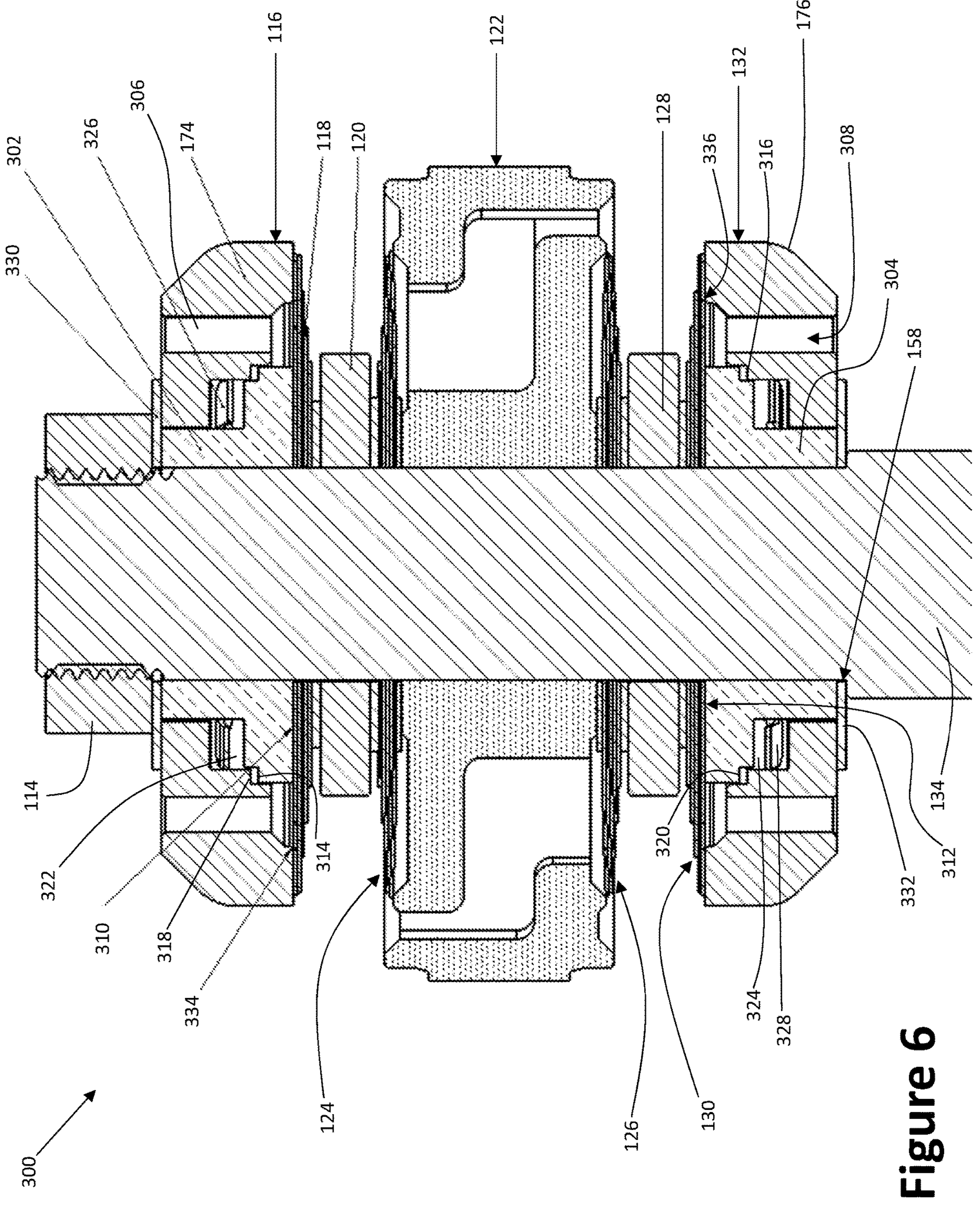
FIG. 6 is a cross-sectional view of the example assembly shown in FIGS. 4 and 5.
Figure 7:
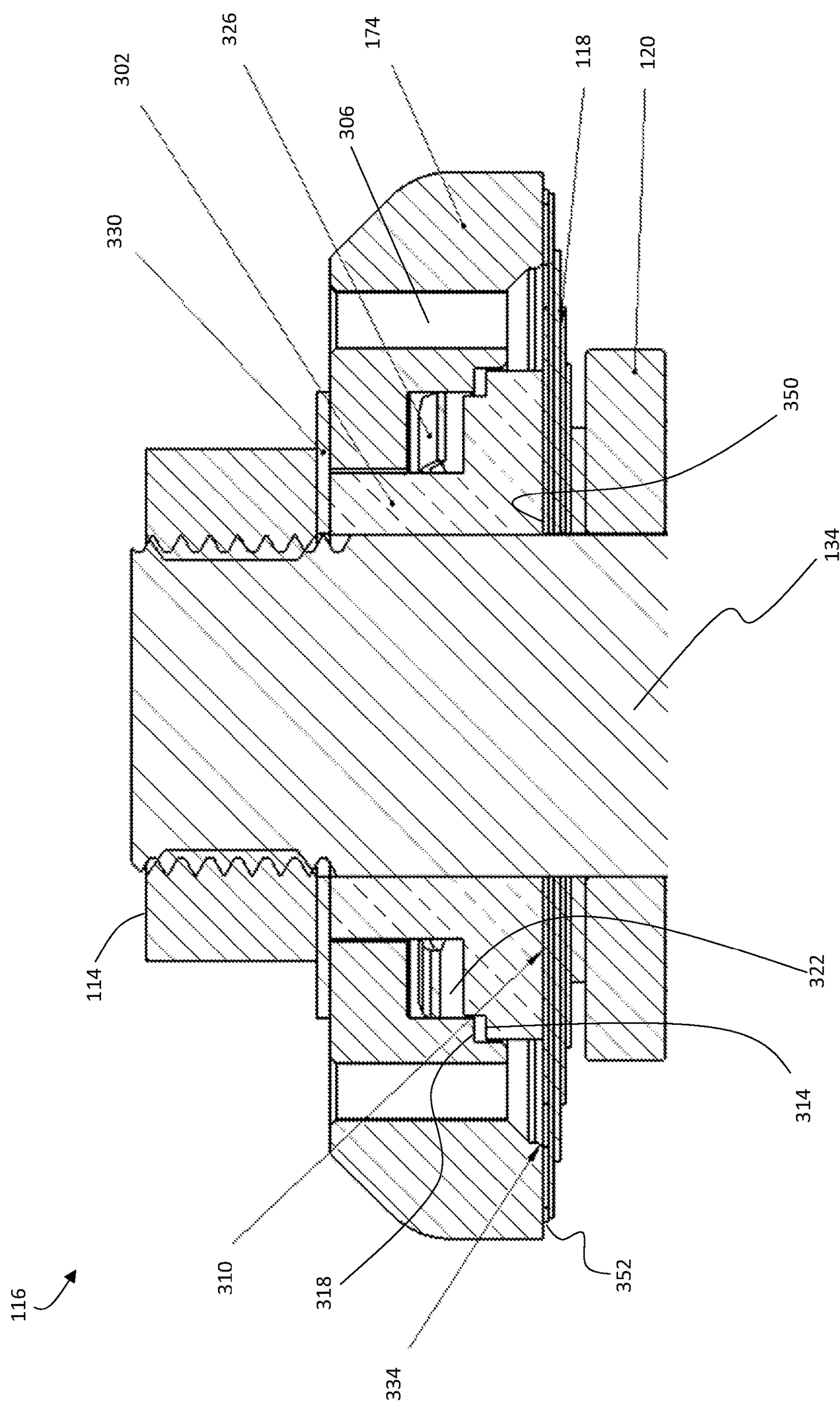
FIG. 7 is a detail cross-sectional view of the example assembly shown in FIGS. 4-6.

Turning now to FIGS. 4-7, a free or distal end 300 of the piston rod 134 is shown in more detail, with FIG. 4 providing a perspective view, FIG. 5 providing a cutaway view, and FIG. 6 providing a cross-sectional view through the distal end 300. FIG. 7 provides a cross-sectional detail view of the example JCO valve piston assembly 116 on the distal end 300 in particular. While more focus may be placed on the JCO valve piston assembly 116 here, those having ordinary skill in the art will appreciate how the teachings may apply with equal force to the RCO valve piston assembly 132.

Building upon without repeating the disclosure above, in some examples each valve piston assembly 116, 132 may generally include the piston 174, 176; a valve piston insert 302, 304; and the valve disc stack-up 118, 130. Each piston 174, 176 may include passages 306, 308 that extend longitudinally through the piston 174, 176 and through which hydraulic fluid can flow. In some cases, the passages 306, 308 may have circular cross-sections when viewed from a longitudinal perspective. In other cases, though, the passages 306, 308 may be elongated circumferentially, as can be seen in FIGS. 4 and 5. The valve piston inserts 302, 304 may be arranged radially inward relative to the pistons 174, 176. Further, hubs 310, 312 of the valve piston inserts 302, 304 may serve as bases or support surfaces for the respective valve disc stack-ups 118, 130.

While the valve piston inserts 302, 304, amongst other components, may be fixed longitudinally along the piston rod 134 between the piston rod assembly fastener 113 and the shoulder 158, the pistons 174, 176 may move longitudinally relative to the respective valve piston inserts 302, 304, as will be described in more detail below. The valve piston inserts 302, 304 may each include a shoulder 314, 316 that opposes and, at times, contacts a seat 318, 320 of each piston 174, 176. The shoulders 314, 316 are longitudinally spaced apart, respectively, from the seats 318, 320 when the pistons 174, 176 are not engaged with the respective catch pistons 112, 136.

In some examples such as that shown in FIGS. 4-7, the valve piston inserts 302, 304 and the pistons 174, 176 may be sized and shaped so as to form annular voids 322, 324 longitudinally and radially between the respective pairs of the valve piston inserts 302, 304 and the pistons 174, 176. Wave springs 326, 328 may be inserted in the annular voids 322, 324. The wave springs 326, 328 serve to longitudinally separate the pistons 174, 176, respectively, from the valve piston inserts 302, 304 after end-of-stroke damping events. In addition, retention discs 330, 332 may be utilized not only to help spread the load imparted, respectively, by the piston rod assembly fastener 114 and the shoulder 158, but also to maintain longitudinal alignment between the pistons 174, 176 and the respective valve piston inserts 302, 304 when the valve piston assemblies 116, 132 are disengaged from the respective catch pistons 112, 136.

Each piston 174, 176 may have a valve seat 334, 336 that extends annularly around the piston rod 134 and is configured, at least selectively, to form a seal with the respective valve disc stack-ups 118, 130. Each valve seat 334, 336 may be chamfered or radiused. As one having ordinary skill in the art will appreciate, especially in light of the discussion below, such chamfers or radiuses accommodate preload of the valve disc stack-ups 118, 130; help form a better seal with the valve disc stack-ups 118, 130; facilitate better control over the flow of hydraulic fluid; and enable smooth deformation of the valve disc stack-ups 118, 130 during end-of-stroke damping.

Typically, at least with respect to conventional pistons, the term "preload" describes the position of the valve disc stack-up relative to the valve seat and hence the extent to which a valve disc stack-up is deformed (if any) in a steady state, prior to any damping movement. In the present disclosure, however, the preload of the valve piston assembly, specifically, of the valve disc stack-up, varies over at least part of the course of the end-of-stroke damping. Hence the present disclosure will distinguish between the terms "initial preload" and "maximum preload."

With respect to FIG. 7, the example JCO valve piston assembly 116 is said to have zero initial preload because a top surface 350 (at the piston rod 134) of a valve disc 352 of the JCO valve disc stack-up 118 that is in contact with the valve seat 334 is positioned at a same longitudinal location as the valve seat 334 of the JCO piston 174 when the vibration damper 100 is in a steady state. If the top surface 350 of the valve disc 352 were 0.25 mm higher (longitudinally) at the piston rod 134 than at the valve seat 334, then there would be 0.25 mm of initial preload and at least the valve disc 352 would be slightly deformed before any damping even begins. Conversely, if the top surface 350 of the valve disc 352—and thus the entire disc 352—were 0.1 mm lower (longitudinally) than the valve seat 334, then there would be negative 0.1 mm of initial preload, which in some cases may also be referred to as bypass. Greater preload requires greater force to deflect and thereby open the JCO valve disc stack-up 118 to permit hydraulic fluid to pass through the JCO valve piston assembly 116. Those having ordinary skill in the art will appreciate that valve piston assemblies can be tuned with different levels of initial and maximum preload depending on the application of the vibration damper.

The two-part nature of—and hence the longitudinal spacing between—the piston and the valve piston insert enables the progressive nature of the end-of-stroke damping force of the present disclosure. Rather than being stuck with a fixed amount of preload as in conventional pistons, the valve piston assemblies of the present disclosure gradually increase preload (i.e., from initial preload to maximum preload) during the end-of-stroke damping. This concept is explained further with respect to FIGS. 8A-8E.

Figure 8A:
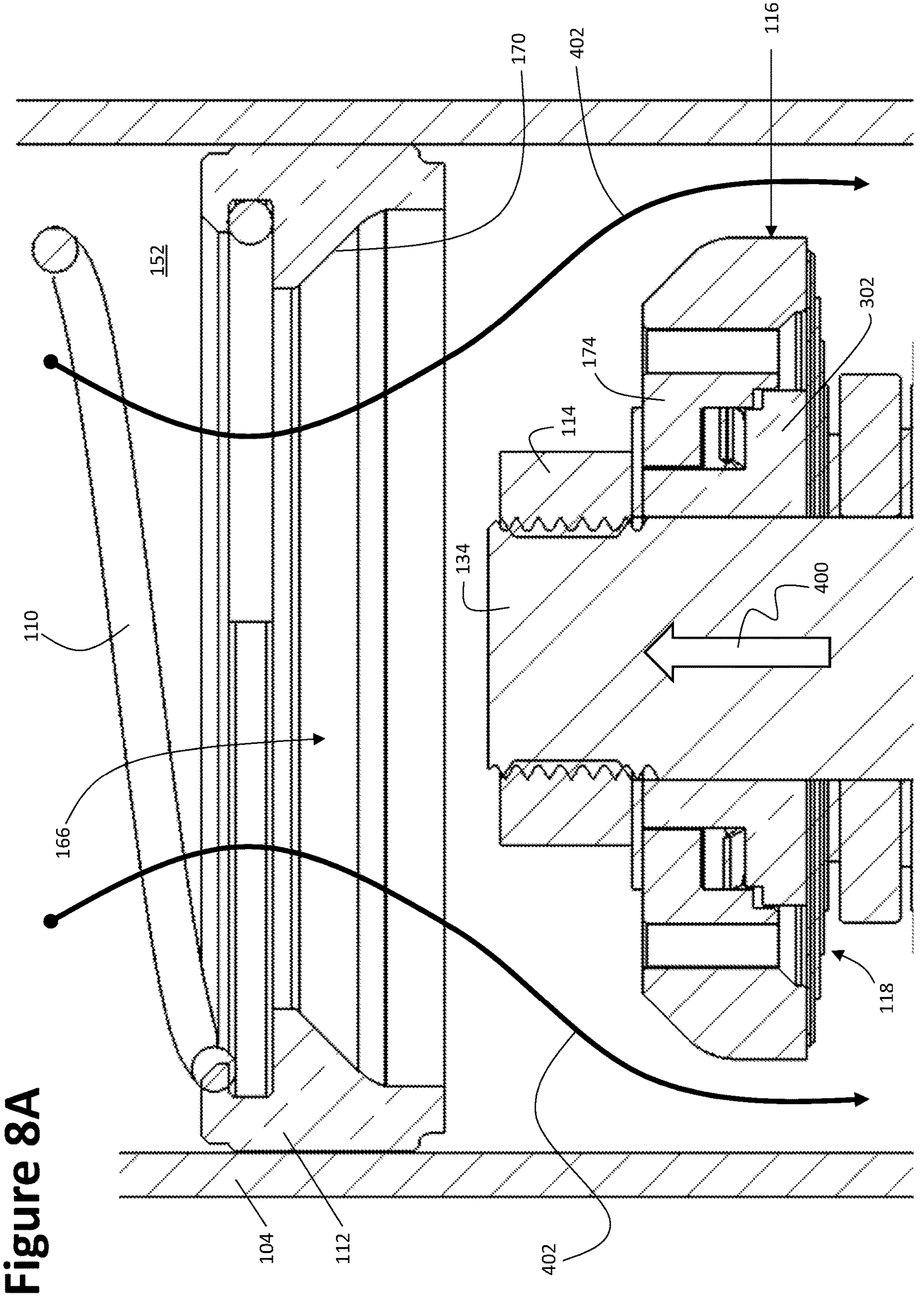
FIG. 8A is a is a cross-sectional view showing a first step in a sequence whereby an example end-stop control valve is engaged and then disengaged.

In FIG. 8A, the piston rod 134 is being driven in a compression stroke, as represented by an arrow 400, towards the JCO catch piston 112 and the first end 162 of the damper tube 104. Following a flow path 402, hydraulic fluid can flow through the main opening 166 of the JCO catch piston 112, bypassing the JCO valve piston assembly 116, which has not yet engaged with the JCO catch piston 112, and through the main piston 122 and onto the second working chamber 154. The force output of the vibration damper 100 is attributable to the main piston 122 and its valve discs 126, as shown more generally in FIG. 3A.

Figure 8B:
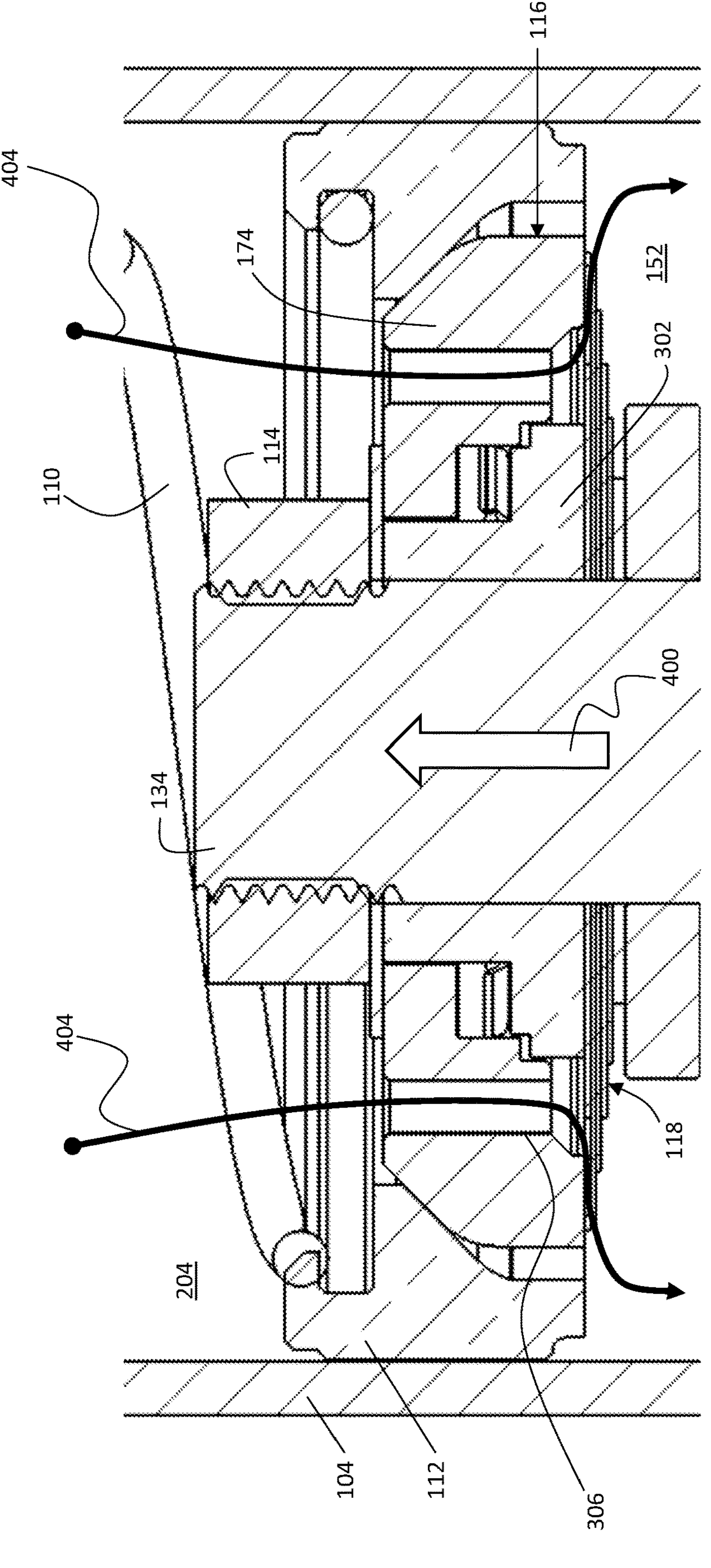
FIG. 8B is a is a cross-sectional view showing a second step in a sequence whereby an example end-stop control valve is engaged and then disengaged.

FIG. 8B shows the point in time during compression at which the JCO piston 174 makes contact with and engages the JCO catch piston 112 to form a seal and close off the main opening 166 of the JCO catch piston 112. At this point, the third working chamber 204 is created above the JCO catch piston 112. The JCO piston 174 begins to carry the JCO catch piston 112 towards the first end 162 of the damper tube 104 as the JCO spring 110 provides a negligible amount of resistance. Since in this example the JCO valve disc stack-up 118 has zero initial preload, the JCO valve disc stack-up 118 must deflect at least to some degree to permit hydraulic fluid to pass from the third working chamber 204 into the first working chamber 152, as shown by a flow path 404. Alternatively, in other examples where negative initial preload or bypass exists between the valve disc stack-up and the valve seat, hydraulic fluid may still flow freely through the valve piston assembly, at least temporarily. FIG. 3B generally corresponds to this stage in FIG. 8B at which the JCO piston 174 makes contact with and engages the JCO catch piston 112, although FIG. 3B shows flow through the main piston 122 and the damper tube 104 more generally.

Figure 8C:
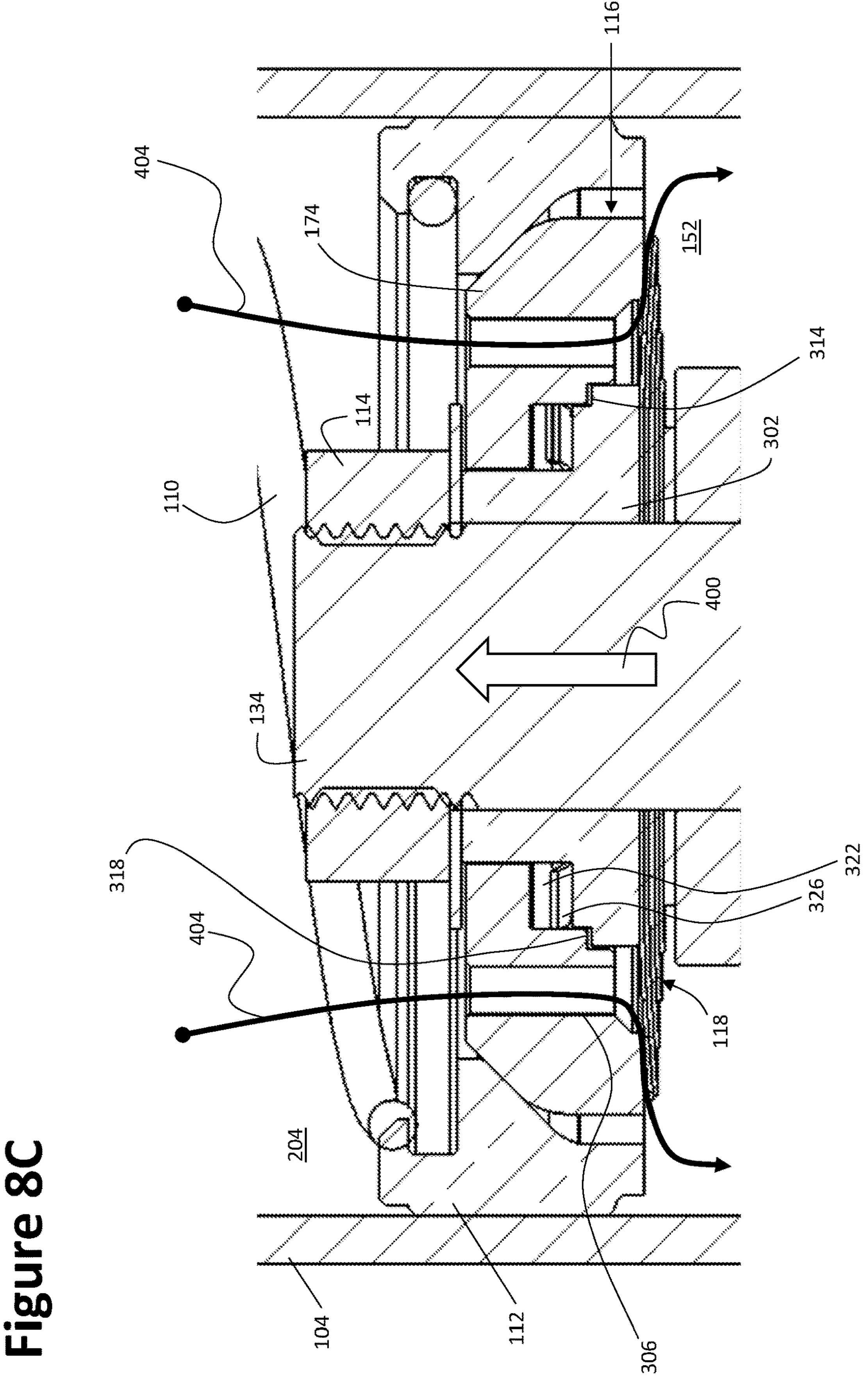
FIG. 8C is a is a cross-sectional view showing a third step in a sequence whereby an example end-stop control valve is engaged and then disengaged.

FIG. 8C illustrates how the longitudinal spacing between the JCO piston 174 and the JCO valve piston insert 302 shrinks as the piston rod 134 continues its compression stroke. The resistance provided by the hydraulic fluid trapped in the third working chamber 204 causes the JCO catch piston 112 and the JCO piston 174 to move longitudinally towards the JCO valve piston insert 302, which is securely fixed on the piston rod 134. As the piston rod 134 advances into the third working chamber 204, the JCO piston 174 also compresses, moving the valve seat 334 of the JCO piston 174 into/towards the JCO valve disc stack-up 118. As this longitudinal spacing between the JCO piston 174 and the JCO valve piston insert 302 decreases, preload is introduced to the JCO valve disc stack-up 118, which then progressively increases the JCO valve disc stack-up 118 stiffness. To be sure, FIG. 8C shows some early deflection in the JCO valve disc stack-up 118 as well as closer proximity of the shoulder 314 and the seat 318.

Figure 8D:
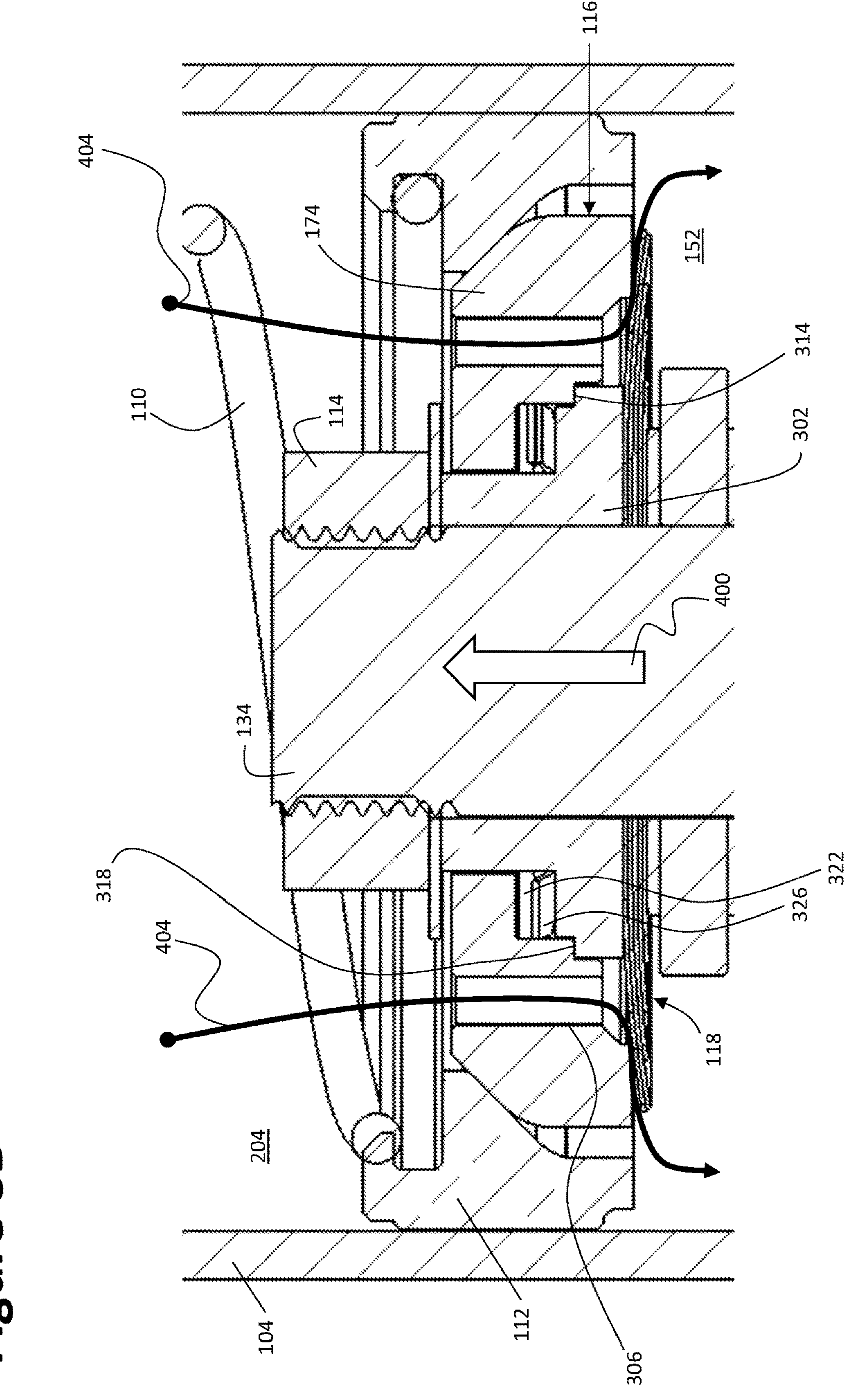
FIG. 8D is a is a cross-sectional view showing a fourth step in a sequence whereby an example end-stop control valve is engaged and then disengaged.

Eventually the shoulder 314 and the seat 318 contact one another, as shown in FIG. 8D. At this point, the JCO valve disc stack-up 118 of the JCO valve piston assembly 116 has reached maximum preload, which provides greater resistance. Put another way, the maximum amount of preload is not present initially, but is reached only after a portion of the end-of-stroke damping event. By varying the preload during an end-of-stroke damping event, the damper output force transitions significantly more smoothly into a condition where supplemental damping (i.e., in addition to damping provided by the main piston 122) is provided by one of the valve piston assemblies. Also, in the state shown in FIG. 8D, the wave spring 326 is compressed at least to some degree within the annular void 322. FIG. 3C loosely corresponds to the stages shown in FIGS. 8C and 8D, although FIG. 3C shows flow through the main piston 122 and the damper tube 104 more generally.

Figure 8E:
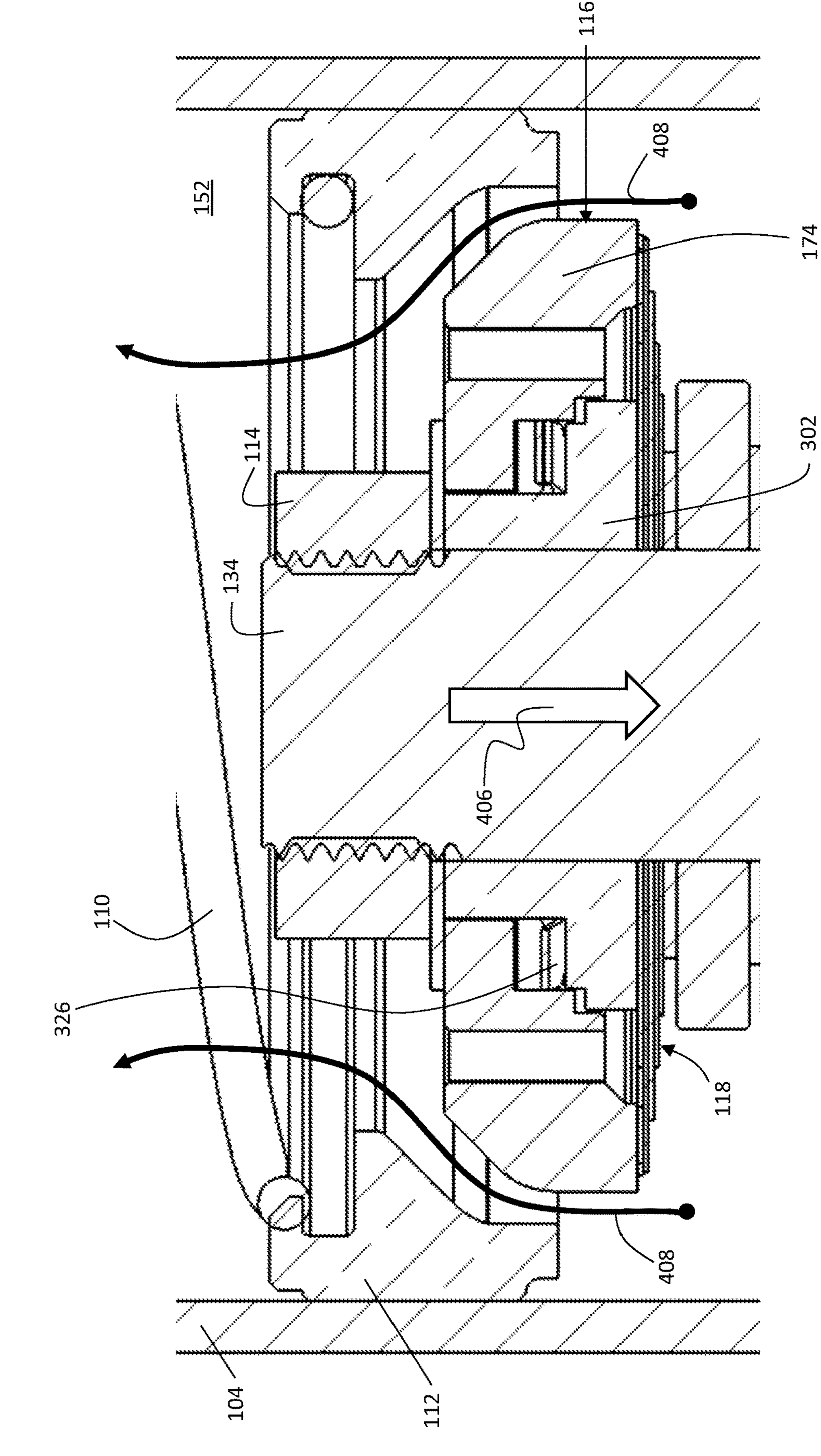
FIG. 8E is a is a cross-sectional view showing a fifth step in a sequence whereby an example end-stop control valve is engaged and then disengaged.

Once the JCO valve piston assembly 116 and the piston rod 134 have completed the end stop compression stroke, the piston rod 134 reverses directions and begins moving away from the first end 162 of the damper tube 104, as shown figuratively in FIG. 8E by an arrow 406. At this point, the JCO piston 174 separates from the JCO catch piston 112, the wave spring 326 pushes the JCO piston 174 and the JCO valve piston insert 302 longitudinally apart, the JCO valve disc stack-up 118 returns to a state of zero initial preload (at least in this example), the third working chamber 204 ceases to exist, and hydraulic fluid can flow freely through the main opening 166 of the JCO catch piston 112 and around the JCO valve piston assembly 116, as represented by a flow path 408. FIG. 3D generally corresponds to the stage shown in FIG. 8E, although FIG. 3D shows flow through the main piston 122 and the damper tube 104 more generally.

It should be understood that in some cases the terms “end-stop control valve” or “auxiliary piston” may be used to refer to the components that provide end-of-stroke damping, such as the catch piston and the valve piston assembly. Furthermore, it should be understood that the examples disclosed herein are non-limiting. For instance, in many applications a vibration damper may only have one of the end-stop control valves, as opposed to two, at opposite ends of the damper tube. As another example, in some cases a piston may be fixed to the piston rod and the valve piston insert may be longitudinally movable relative to the piston.

Figure 9:
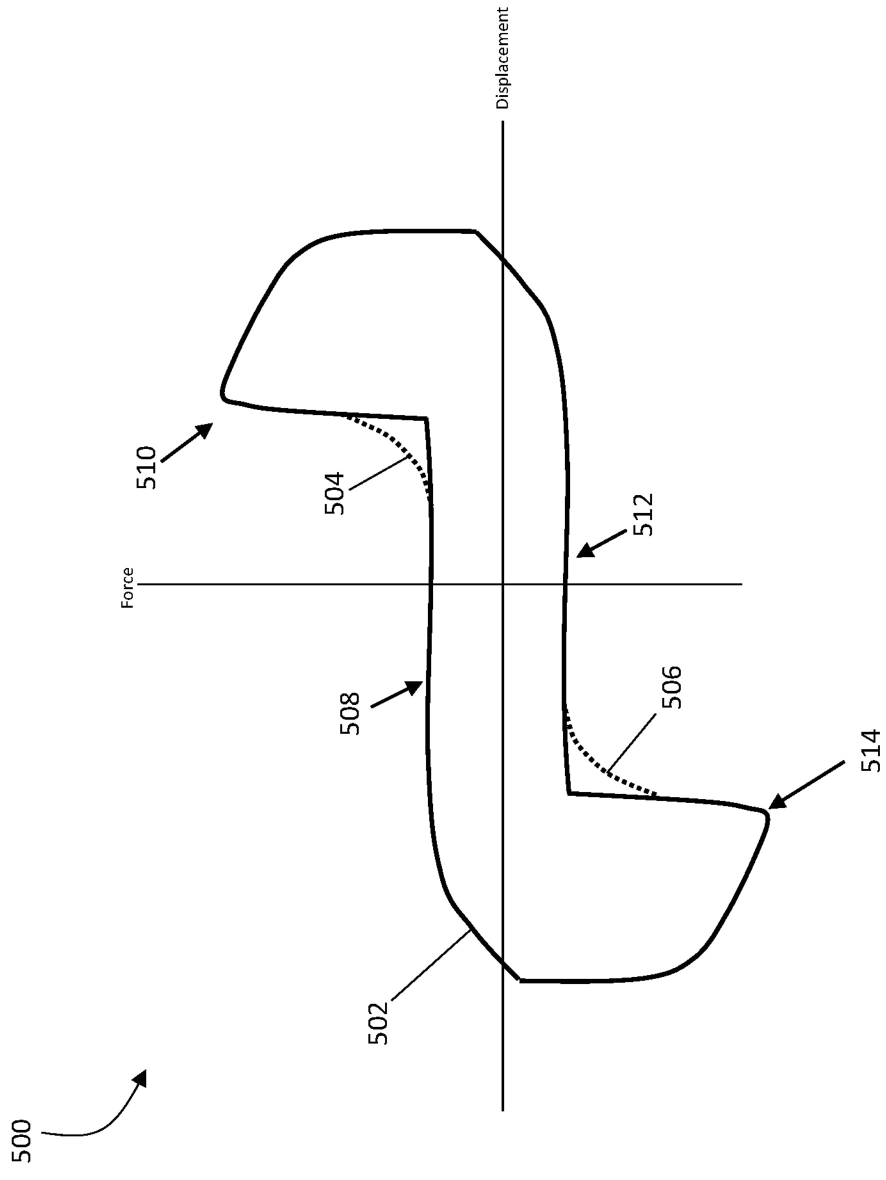
FIG. 9 is a graph showing force-versus-displacement curves for a conventional vibration damper relative to an example vibration damper of the present disclosure.

Turning now to FIG. 9, a graph 500 plots damper output force versus displacement of the piston rod. A solid line 502 represents the behavior of a vibration damper without the benefit of the inventive/progressive end-stop control valves disclosed herein, whereas dotted lines 504, 506 represent the modified behavior of a vibration damper that includes such end-stop control valves. In general, reference character 508 corresponds to output from the main piston during rebound, reference character 510 corresponds to output from the main piston with the assistance of an RCO end-of-stroke damping force, reference character 512 corresponds to output from the main piston during jounce or compression, and reference character 514 corresponds to output from the main piston with the assistance of a JCO end-of-stroke damping force. One having ordinary skill in the art will appreciate how a smoother transition into end-of-stroke damping can drastically improve NVH characteristics.

Figure 10:
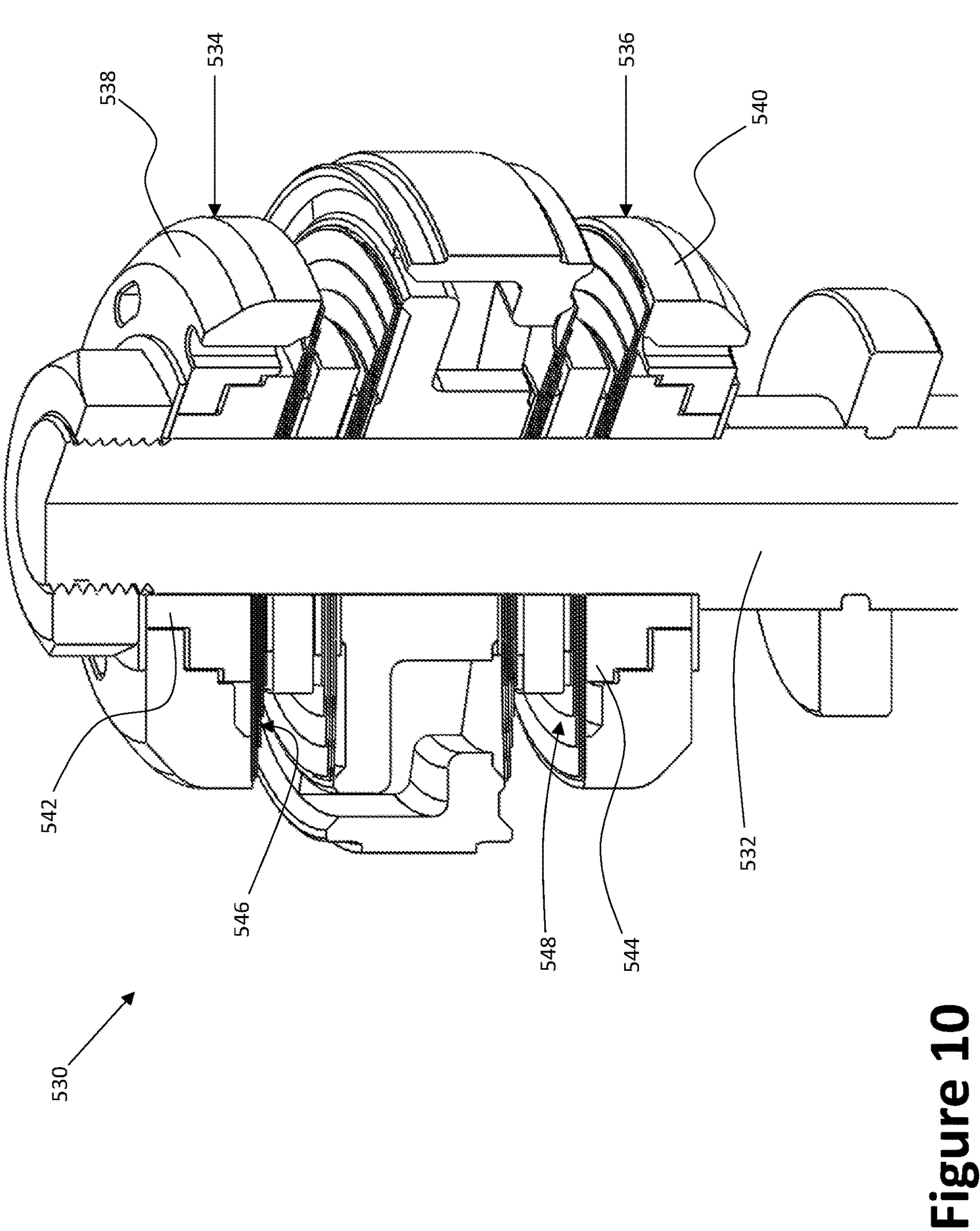
FIG. 10 is a 135° cutaway view of another example assembly involving multiple pistons disposed at a distal end of a piston rod.

With respect to FIG. 10, another example distal end 530 of a piston rod 532 is shown. In this example and those that follow, only the differences relative to the vibration damper 100 will be discussed. Here, in the example of FIG. 10, a JCO valve piston assembly 534 and a RCO valve piston assembly 536 each include a piston 538, 540 and a valve piston insert 542, 544. However, unlike the valve piston assemblies disclosed above, an annular void that is big enough to accommodate a wave spring is not included here. Instead, positive initial preload that is introduced into valve disc stack-ups 546, 548 serves the purpose of pushing the piston 538, 540 away from the respective valve piston insert 542, 544 to create space longitudinally between the components. In other words, because the valve disc stack-ups 546, 548 are elastically deformed by the initial preload, even before any engagement with a catch piston, the valve disc stack-ups 546, 548 naturally push the pistons 538, 540 away, respectively, from the valve piston inserts 542, 544.

Figure 11:
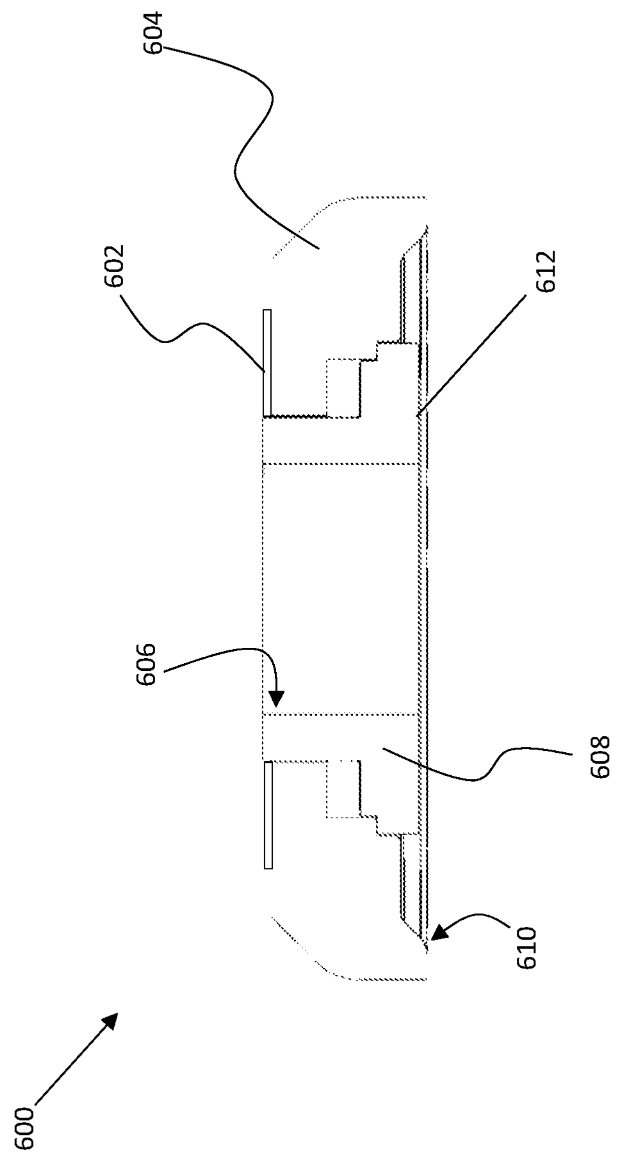
FIG. 11 is a cross-sectional view of an example piston.

FIG. 11 shows an example valve piston assembly 600, or at least part thereof, that includes a spacer disc 602 disposed above a piston 604 and around a top 606 of a valve piston insert 608. The spacer disc 602 exemplifies one way to introduce more initial preload into an assembly without the need to manufacture additional components or remanufacture certain components. In particular, the spacer disc 602 introduces more initial preload because the spacer disc 602 positions a valve seat 610 on the piston 604 farther away from a hub 612 of the valve piston insert 608.

Figure 12:
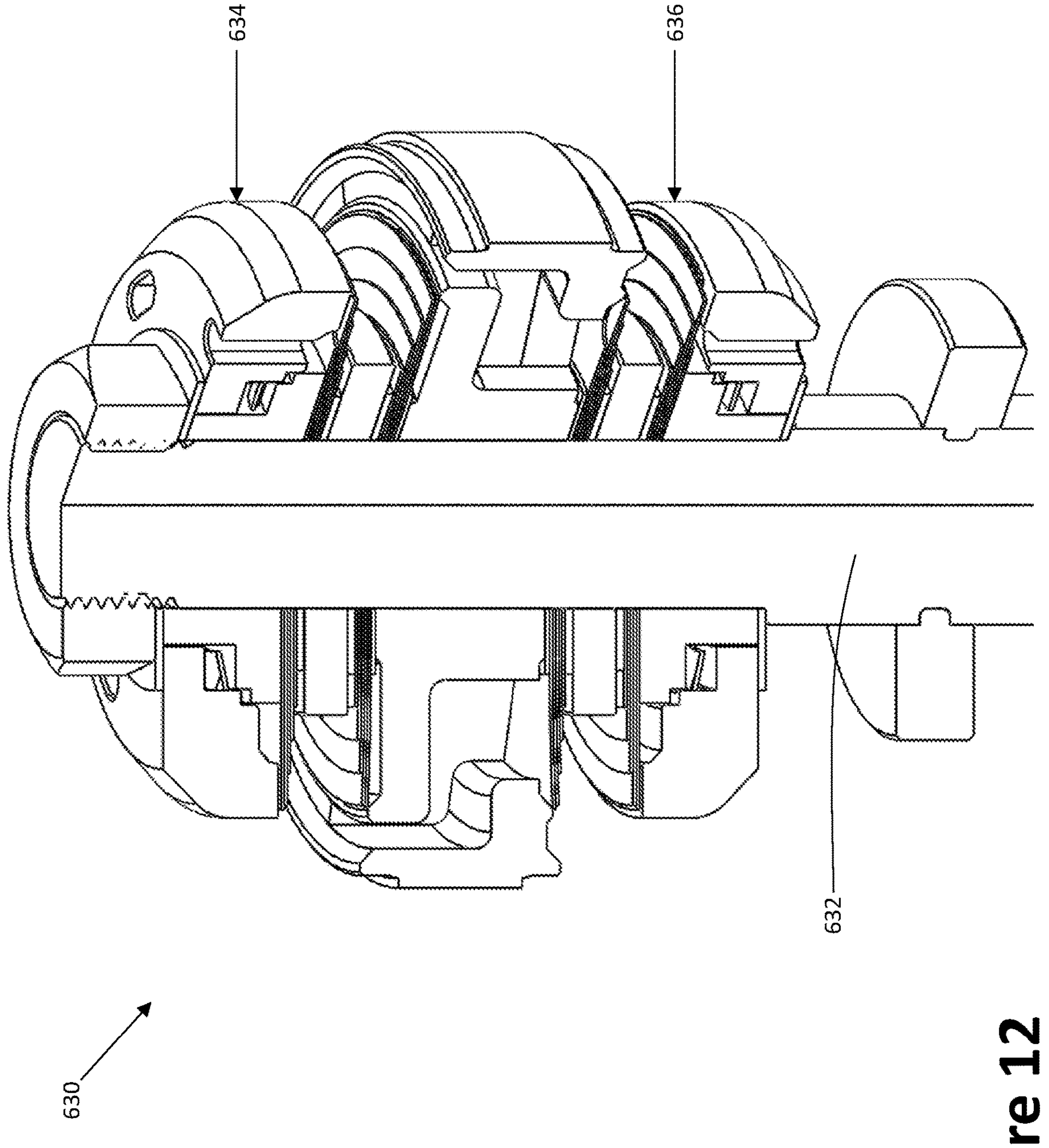
FIG. 12 is a 135° cutaway view of still another example assembly involving multiple pistons disposed at a distal end of a piston rod.

FIG. 12 shows still another example distal end 630 of a piston rod 632. In the example shown in FIG. 12, a JCO valve piston assembly 634 and an RCO valve piston assembly 636 each has negative 0.1 mm of initial preload.

Figure 13:
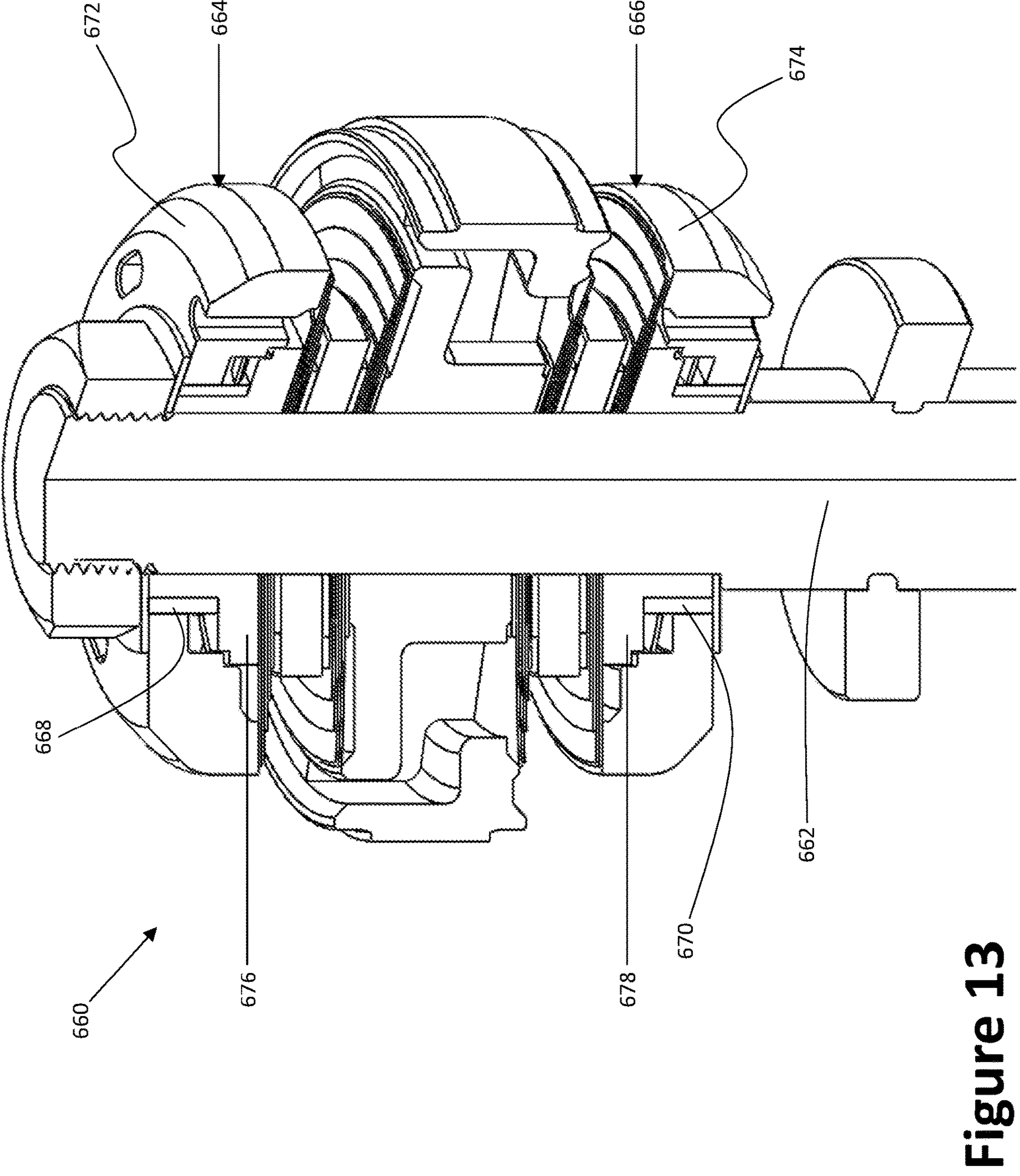
FIG. 13 is a 135° cutaway view of yet another example assembly involving multiple pistons disposed at a distal end of a piston rod.

The example shown in FIG. 13 features another distal end 660 of a piston rod 662. In this example, a JCO valve piston assembly 664 and an RCO valve piston assembly 666 each has a bushing 668, 670 disposed radially between a respective piston 672, 674 and a respective valve piston insert 676, 678. The bushings 668, 670 help further improve NVH characteristics, especially at the respective points at which the pistons 672, 674 engage with catch pistons.

Figure 14:
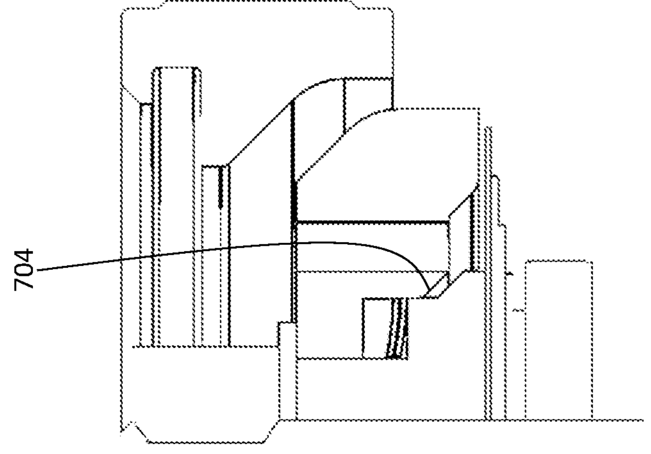
FIG. 14 is a cross-sectional view of another example auxiliary piston.
Figure 14:
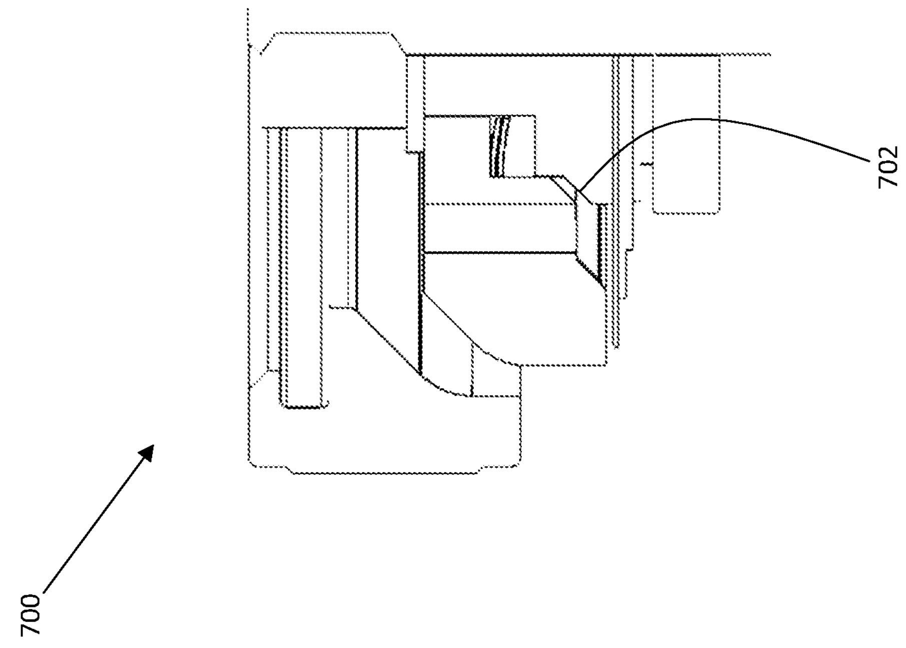

FIG. 14 shows an example end-stop control valve 700 that includes a shoulder 702 and a seat 704 that are transverse, rather than perpendicular, to a longitudinal axis.

Figure 15:
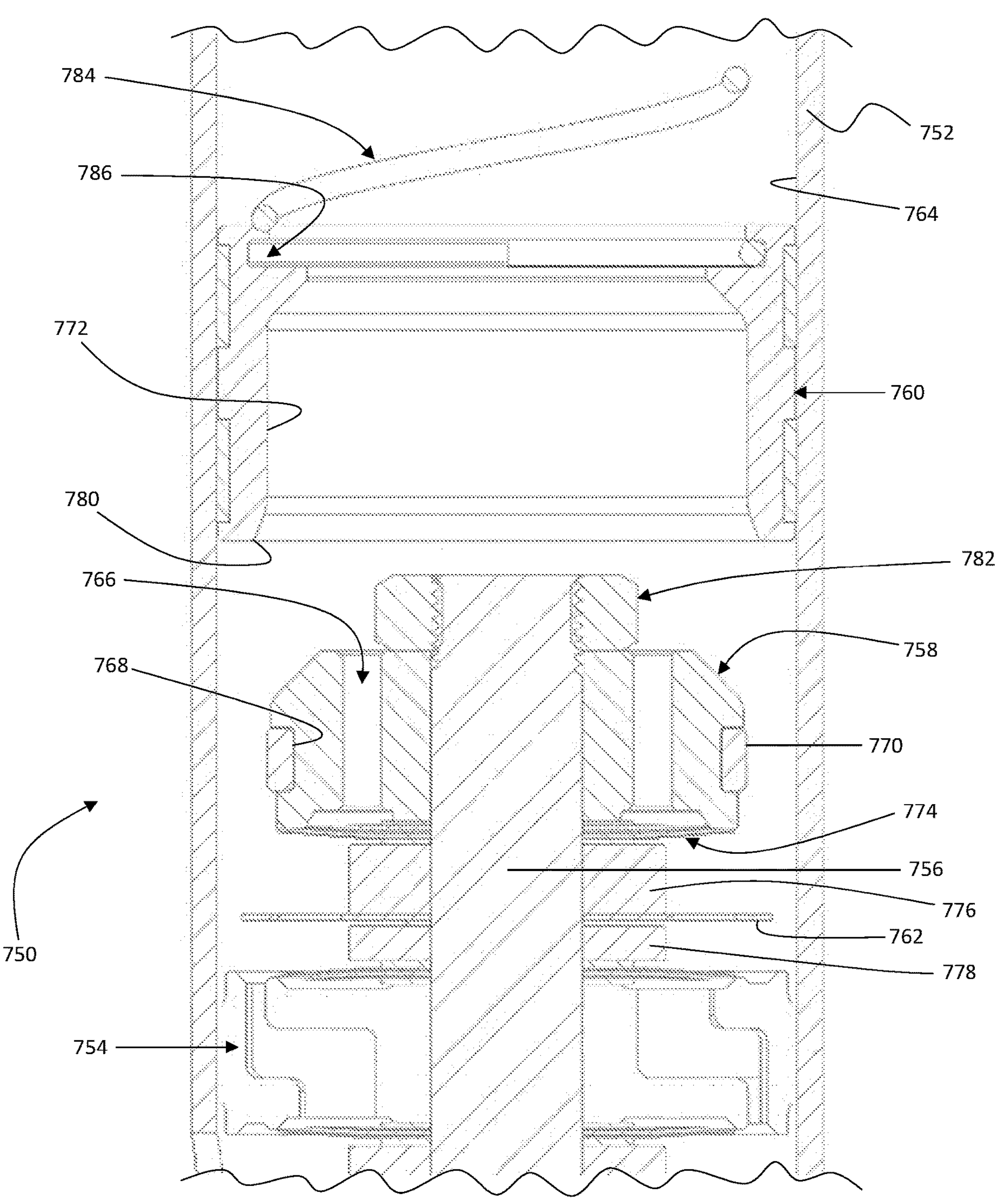
FIG. 15 is a cross-sectional view of another example end-stop control valve.

With respect now to FIG. 15, another example end-stop control valve 750, which can be used for JCO and/or RCO, is shown in cross section. It should be understood that the description of the example end-stop control valve 750 and other examples that follow build upon and utilize principles of the disclosure set forth above such that every last detail concerning the end-stop control valve 750 and other examples that follow is not set forth below. Notwithstanding, FIG. 15 shows the example end-stop control valve 750 in a damper tube 752, which in some cases may be similar to the damper tube 104 shown in one or more of the preceding examples. In this example, the end-stop control valve 750 is disposed on one side of a main piston 754 and is, in part, supported on a piston rod 756. In some examples, the end-stop control valve 750 may generally include a piston 758, an elongate catch piston 760, and a spring disc 762. The piston 758 may have a smaller radial extent than an inner wall 764 of the damper tube 752 such that hydraulic fluid can pass around the piston 758 when the piston 758 is not engaged with the elongate catch piston 760. The piston 758 may have passages 766 that extend longitudinally through the piston 758 and through which hydraulic fluid can flow. In some cases, the passages 766 may have circular cross-sections when viewed from a longitudinal perspective. In other cases, though, the passages 766 may be elongated circumferentially, for instance.

The piston 758 may also include a circumferential recess 768 in which a piston band 770 is disposed. The piston band 770 may in some cases protrude radially relative to a radial outermost portion of the piston 758. The piston band 770 may be configured to selectively contact an elongate sidewall 772 of the elongate catch piston 760, as will be described below. At least in some examples, the sidewall 772 has a greater longitudinal extent than radial extent. In some cases, the piston band 770 may have a break such that the piston band 770 does not extend 360° about the piston 758. In other cases, the piston band 770 may have circumferentially spaced through-holes, notches, grooves, recesses, slots, channels, or other pathways that extend longitudinally and permit fluid to pass in a controlled manner either through the piston band 770 or between the piston band 758 and the elongate sidewall 772 of the elongate catch piston 760, from one longitudinal side of the piston 758 and/or the catch piston 760 to the other longitudinal side. One example piston band is a split ring with a bypass channel. The piston band 770 may be comprised of aluminum, steel, glass filled nylon, bronze, nylon, and/or a plastic such as Delrin®. The size, quantity, shape, and spacing of such pathways may be varied to control the initial end-of-stroke damping force.

A valve disc stack-up 774 may be secured along the piston rod 756 between the piston 758 and a spacer disc 776. Similar to the valve disc stack-ups explained above, the valve disc stack-up 774 may have negative, positive, or no preload. The valve disc stack-up 774 may be elastically deformed during an end-of-stroke damping event to generate end-of-stroke damping force. Furthermore, in the example shown in FIG. 15, the spring disc 762 is secured along the piston rod 756 between the spacer disc 776 and another spacer disc 778. As discussed further below, the spring disc 762 selectively engages with a support 780 of the elongate catch piston 760 during end-of-stroke damping. The support 780 may take a wide variety of forms depending on the size and shape of the elongate catch piston 760, such as a support edge, a support surface, a flange, a lip, a rim, or a valve seat, for example. Moreover, as with numerous of the examples disclosed above, a piston rod assembly fastener 782 may be utilized to secure many of these and other components longitudinally along the piston rod 756.

The elongate catch piston 760 is movable longitudinally within the damper tube 752. However, a spring 784 that is received in and/or joined to a base 786 of the elongate catch piston 760 may restore the elongate catch piston 760 to the position shown in FIG. 15 when the elongate catch piston 760 is not engaged. The elongate catch piston 760 may be annular and may be arranged in a sealing manner with respect to the inner wall 764 of the damper tube 752.

Figure 16:
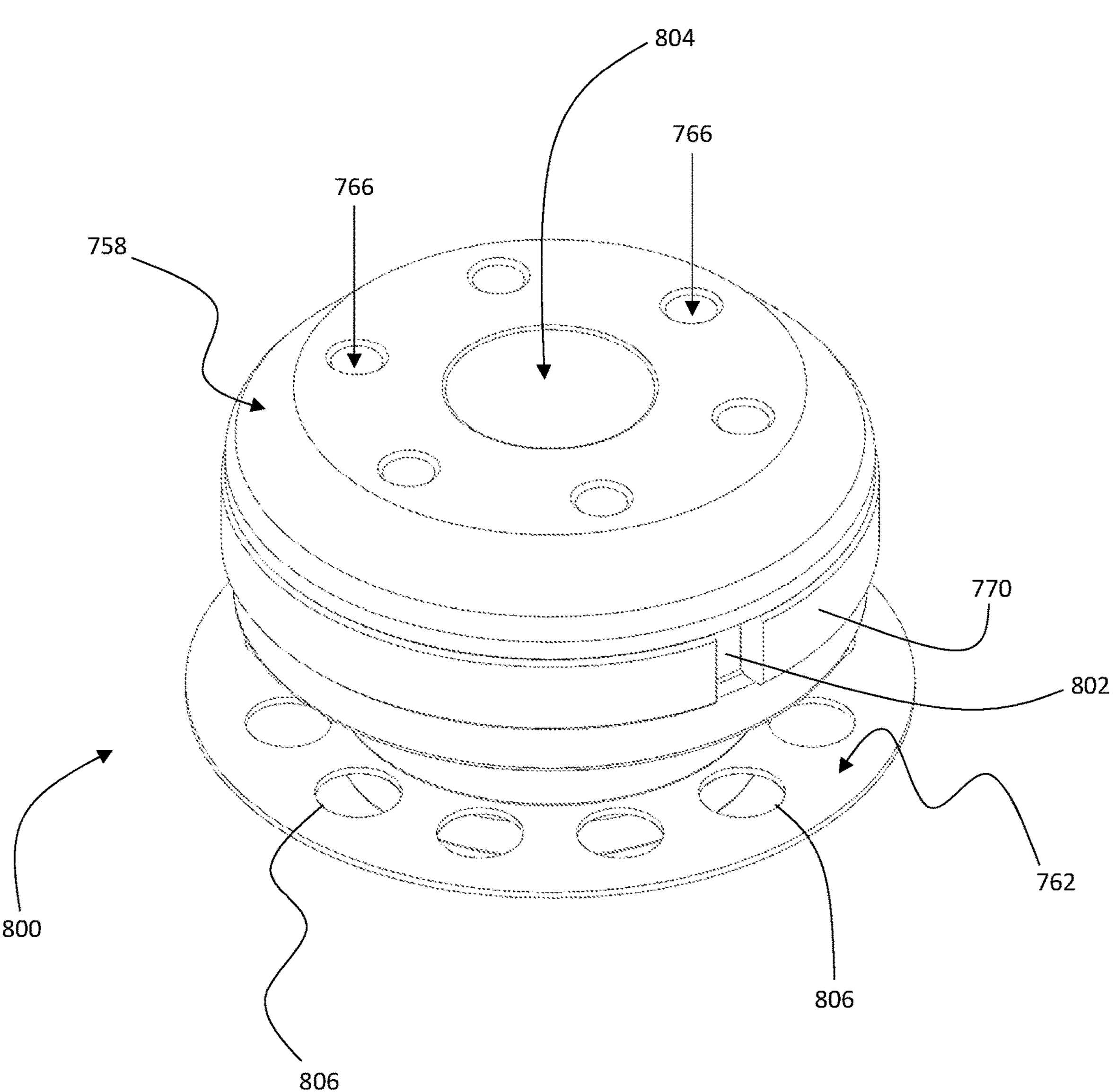
FIG. 16 is an isometric view of a subassembly of the end-stop control valve of FIG. 15.

FIG. 16 shows a subassembly 800 of the end-stop control valve 750 that includes the piston 758, the piston band 770, and the spring disc 762. FIG. 16 shows an example pathway 802 for hydraulic fluid in the piston band 770. FIG. 16 also shows an opening 804 in the piston 758 through which the piston rod 756 can extend. Further, the example spring disc 762 in FIG. 16 includes circumferentially spaced apart openings 806 that extend longitudinally through the spring disc 762. As will be explained below, these openings 806 in the spring disc 762 enable hydraulic fluid to pass through the spring disc 762, even when the spring disc 762 is engaged with the support 780 of the elongate catch piston 760.

Figure 17A:
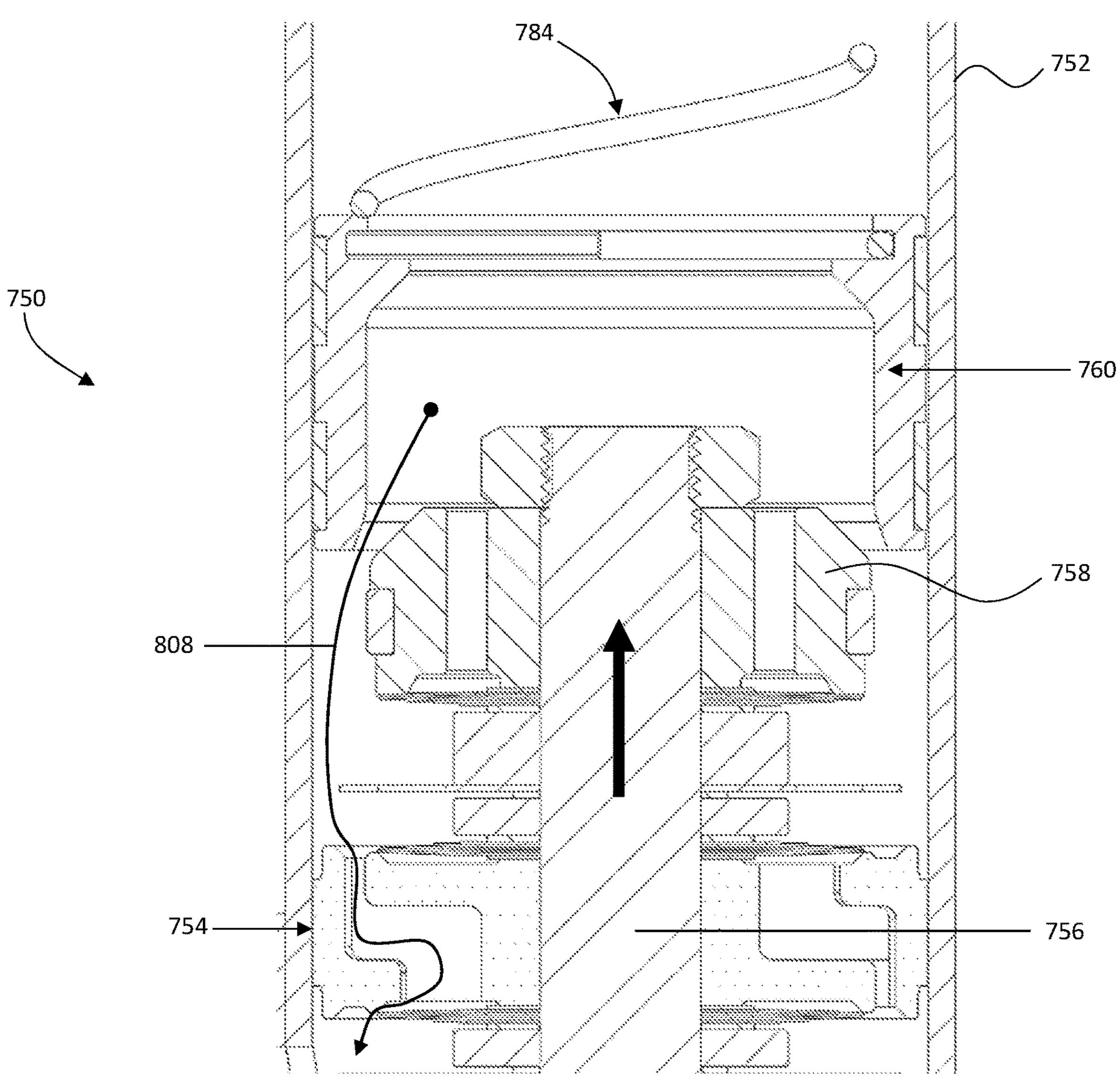
FIG. 17A is a cross-sectional view showing a first step in a sequence whereby the example end-stop control valve of FIG. 15 is engaged and then disengaged.

Turning to FIGS. 17A-17F, a sequence is shown that illustrates an end-of-stroke damping event. In a first step as represented in FIG. 17A, the piston rod 756 and thus the piston 758 move deeper into the damper tube 752 and approach the elongate catch piston 760. There is no engagement between the piston 758 and the elongate catch piston 760 yet, though, and hydraulic fluid follows a flow path 808 around the piston 758 and through the main piston 754.

Figure 17B:
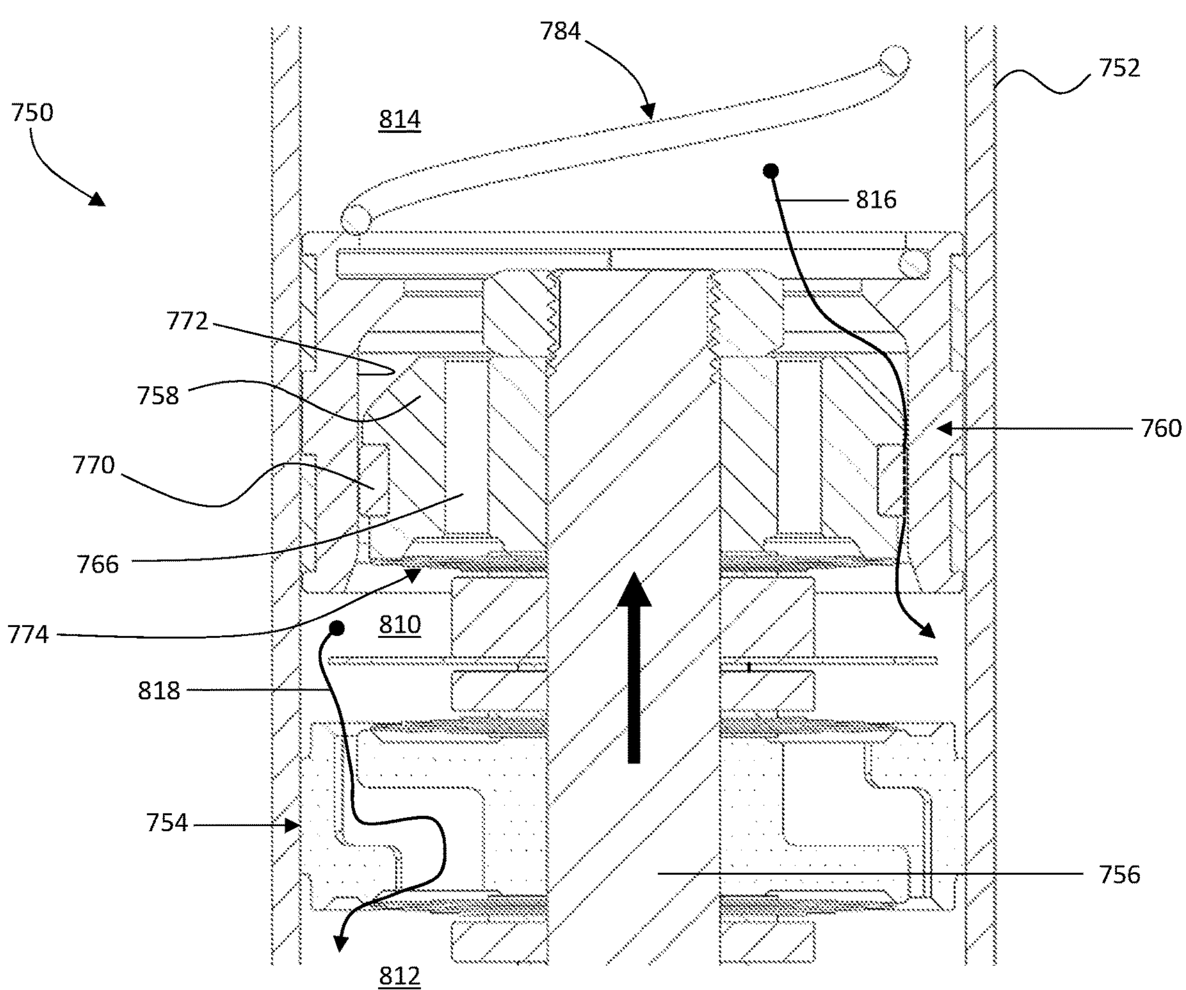
FIG. 17B is a cross-sectional view showing a second step in a sequence whereby the example end-stop control valve of FIG. 15 is engaged and then disengaged.

In a second step as represented in FIG. 17B, the piston 758 comes within the elongate catch piston 760, but does not engage with the elongate catch piston 760. However, the piston band 770 that at least partially encircles and is secured on the piston 758 contacts the elongate sidewall 772 of the elongate catch piston 760. The piston band 770 helps stabilize the elongate catch piston 760 relative to the piston 758. At this point, despite the pathway 802 of the piston band 770, it can generally be said that a first working chamber 810, a second working chamber 812, and a third working chamber 814 are created. Consequently, to pass along a flow path 816 from the third working chamber 814 to the first working chamber 810, hydraulic fluid must flow either through the passages 766 in the piston 758 and deform the valve disc stack-up 774 or through the pathway 802 in the piston band 770. Because the pathway 802 in the piston band 770 provides less resistance than the valve disc stack-up 774, hydraulic fluid will mainly flow through the pathway 802 in the piston band 770. In effect, the pathway 802 provides the main flow path for hydraulic fluid to pass from the third working chamber 814 to the first working chamber 810, as the pathway 802, at least at this point in time, amounts to a flow path having the greatest cross-sectional area through which hydraulic fluid can flow from the third working chamber 814 to the first working chamber 810.

It should be understood that in other examples, a piston band may contain multiple pathways. Either way, by reducing the amount of bypass once the piston band 770 engages with the elongate catch piston 760 such that hydraulic fluid flows exclusively through the pathway 802 of the piston band 770, albeit temporarily, prior to the piston 758 engaging with the elongate catch piston 760, the end-stop control valve 750 begins to gradually increase end-of-stroke damping resistance before the piston 758 even contacts the elongate catch piston 760. From the first working chamber 810, hydraulic fluid can then follow a flow path 818 through the main piston 754 and into the second working chamber 812. To be clear, the cross-sectional area between the piston and an inner diameter of the damper tube 752 through which hydraulic fluid can flow when the piston 754 is not within the elongate catch piston 760 is reduced by 98.00%, 99.00%, 99.50%, 99.75%, or even 99.8% relative to the cross-sectional area that is provided through the pathway 802 that hydraulic fluid must utilize when the piston band 770 engages with the elongate sidewall 772 of the elongate catch piston 760.

Figure 17C:
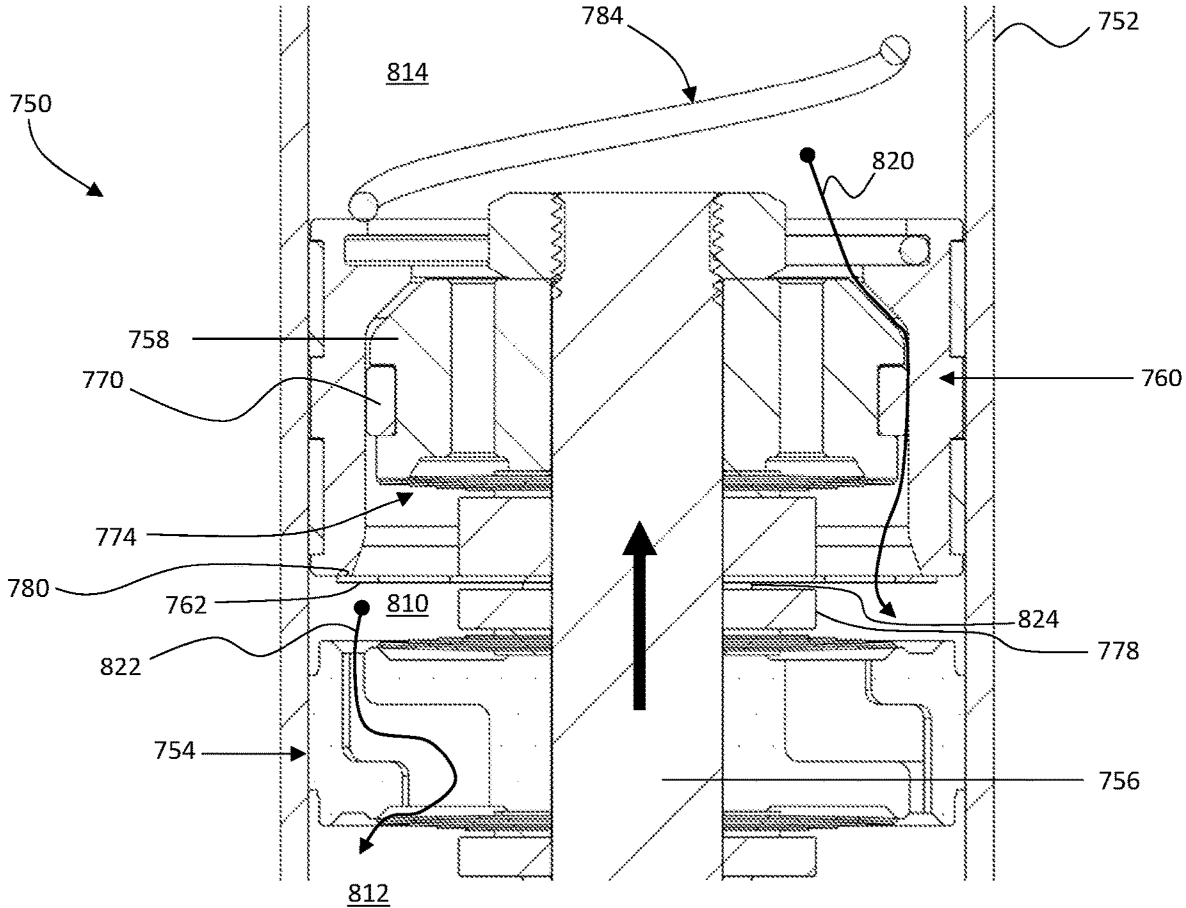
FIG. 17C is a cross-sectional view showing a third step in a sequence whereby the example end-stop control valve of FIG. 15 is engaged and then disengaged.

In a third step as represented in FIG. 17C, the piston 758 is nearly in contact with the elongate catch piston 760. In this particular example, the spring disc 762 makes contact with the support 780 of the elongate catch piston 760 as the piston 758 (or a contact surface thereof) is about 0.8 mm worth of longitudinal travel away from the elongate catch piston 760 (or a contact surface thereof). In other examples, this longitudinal spacing—between the piston 758 and the elongate catch piston 760 at a point when the spring disc 762 contacts the support 780—may be closer to 0.2 mm, 0.4 mm, 0.6 mm, 1.0 mm, 1.2 mm, 1.5 mm, 2.0 mm, 2.5 mm, 3.0 mm, 4.0 mm, 5.0 mm, and/or ranges therebetween (e.g., 0.2 mm to 5.0 mm or 1.2 mm to 2.0 mm). At this point, hydraulic fluid can follow a flow path 820, passing from the third working chamber 814, between the piston 758 and the elongate catch piston 760, through one or more pathways 802 of the piston band 770, through the openings 806 in the spring disc 762, and into the first working chamber 810. From the first working chamber 810, hydraulic fluid can follow a flow path 822 through the main piston 754 and into the second working chamber 812.

Figure 17D:
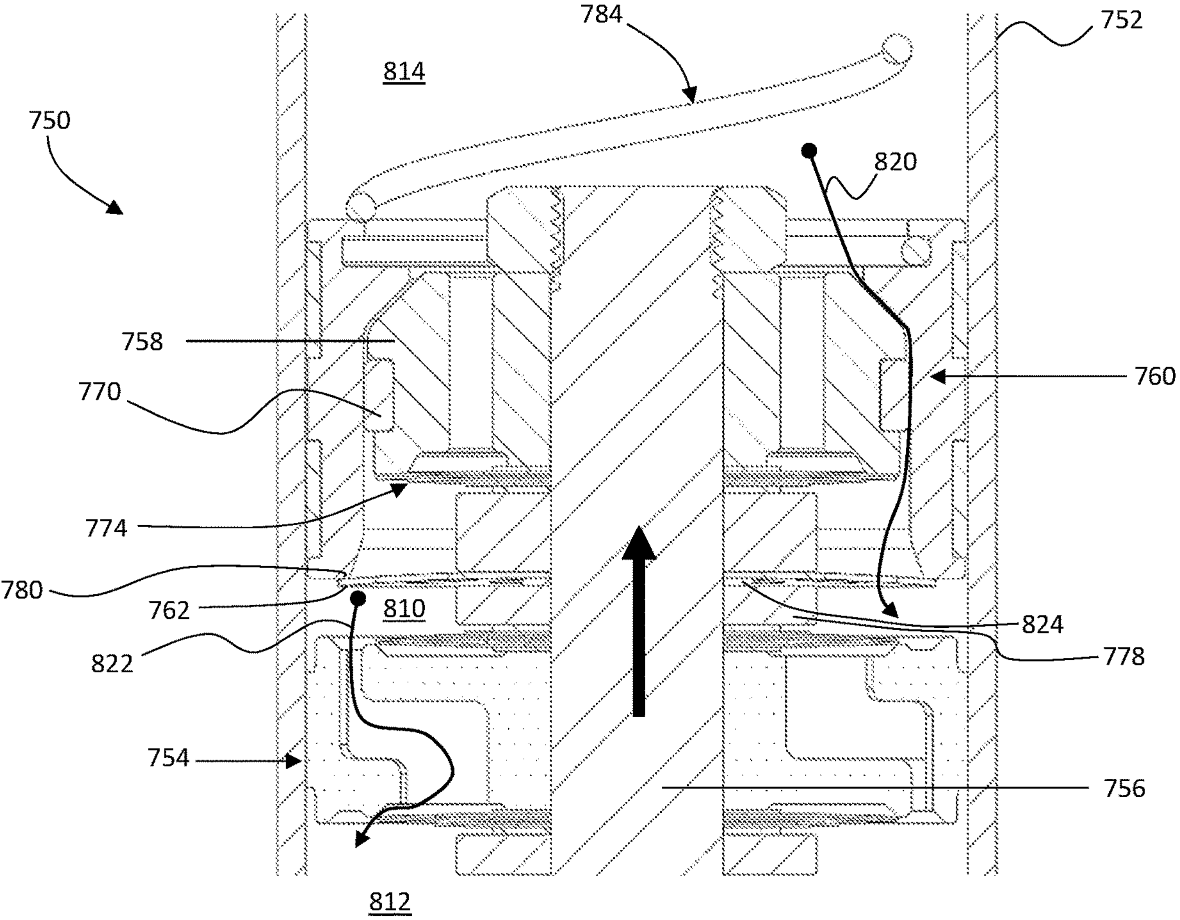
FIG. 17D is a cross-sectional view showing a fourth step in a sequence whereby the example end-stop control valve of FIG. 15 is engaged and then disengaged.

Once the spring disc 762 contacts and begins pushing on the elongate catch piston 760, as shown in FIG. 17C, the spring disc 762 is elastically deformed in a longitudinal direction as the piston rod 756 and the piston 758 continue to move closer to the elongate catch piston 760 and reach a position such as that shown in FIG. 17D, where the piston 758 is just about to engage with the elongate catch piston 760. FIG. 17D illustrates the elastic deformation of the spring disc 762 in the longitudinal direction. In some examples, a washer 824 may be positioned on the piston rod 756 longitudinally between the spring disc 762 and the spacer disc 778. The washer 824, particularly the outer peripheral edges of upper and lower faces thereof, may act as a fulcrum for the spring disc 762. As such, the diameter of the washer 824 can be used to tune the performance of the spring disc 762. A diameter of the washer 824 may be 36%-40%, 35%-41%, 33%-43%, 28%-48%, or 25%-63% of a diameter of the spring disc 762, for example. It will be appreciated that the washer 824 may have chamfered or rounded edges to prevent acute pressure points and thus wear of the spring disc 762. Furthermore, the thickness of the washer 824 in the longitudinal direction may depend on the extent to which the spring disc 762 will deform, so as to prevent contact between the spring disc 762 and the spacer disc 778. As shown in various figures, the spacer disc 778 may have a larger diameter than the washer 824.

Hence the spring disc 762 also contributes to the end-of-stroke damping resistance provided by the end-stop control valve 750, even before the piston 758 engages the elongate catch piston 760. In some examples, the resistance provided by, respectively, forcing hydraulic fluid to pass through the pathway 802 of the piston band 770 and elastically deforming the spring disc 762 is smaller in magnitude than the resistance attributable to deforming the valve disc stack-up 774, but such resistance greatly helps ease into the resistance attributable to deforming the valve disc stack-up 774. In some cases, the valve disc stack-up 774 and the spring disc 762 may be configured such that a force that is required to deflect the valve disc stack-up 774 off the valve seat of the piston 758 is greater than a force that is required to elastically deform the spring disc 762 in a longitudinal direction. Conversely, in other cases, the valve disc stack-up 774 and the spring disc 762 may be configured such that a force that is required to elastically deform the spring disc 762 in a longitudinal direction is greater than a force that is required to deflect the valve disc stack-up 774 off the valve seat of the piston 758.

Figure 17E:
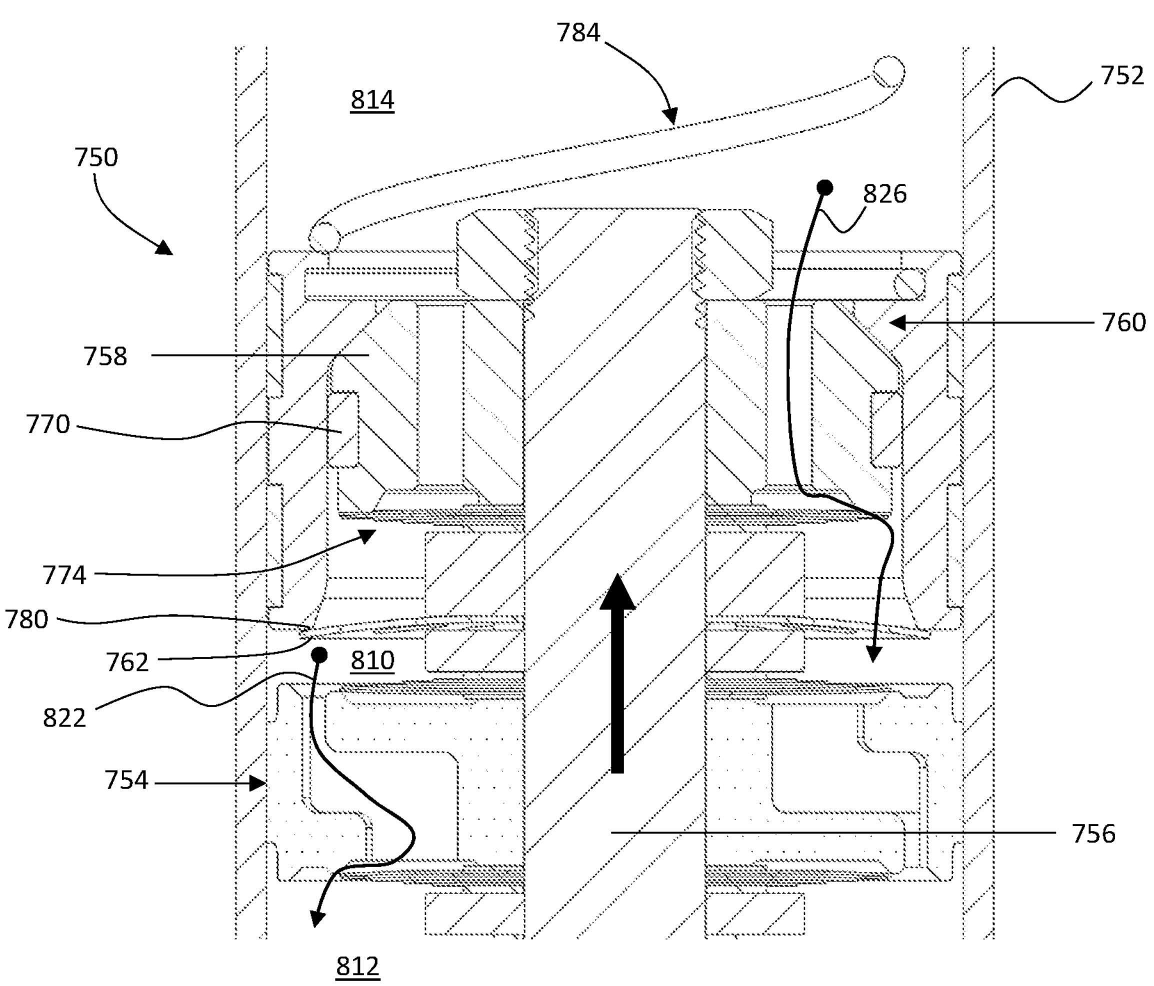
FIG. 17E is a cross-sectional view showing a fifth step in a sequence whereby the example end-stop control valve of FIG. 15 is engaged and then disengaged.

In the step represented in FIG. 17E, the piston 758 makes contact with the elongate catch piston 760, and the end-stop control valve 750 outputs a maximum amount of end-of-stroke damping force. In this example, hydraulic fluid can no longer pass between the elongate catch piston 760 and the piston 758 to the pathway 802 of the piston band 770. The spring disc 762 is in a state of maximum deformation, but still contributes resistance as at least some force is required to maintain the elastic deformation in the spring disc 762. To pass from the third working chamber 814 to the first working chamber 810 along a flow path 826, hydraulic fluid must flow through the passages 766 in the piston 758, deform the valve disc stack-up 774, and flow through the openings 806 in the spring disc 762. Hydraulic fluid can then flow from the first working chamber 810, through the main piston 754, and into the second working chamber 812.

Figure 17F:
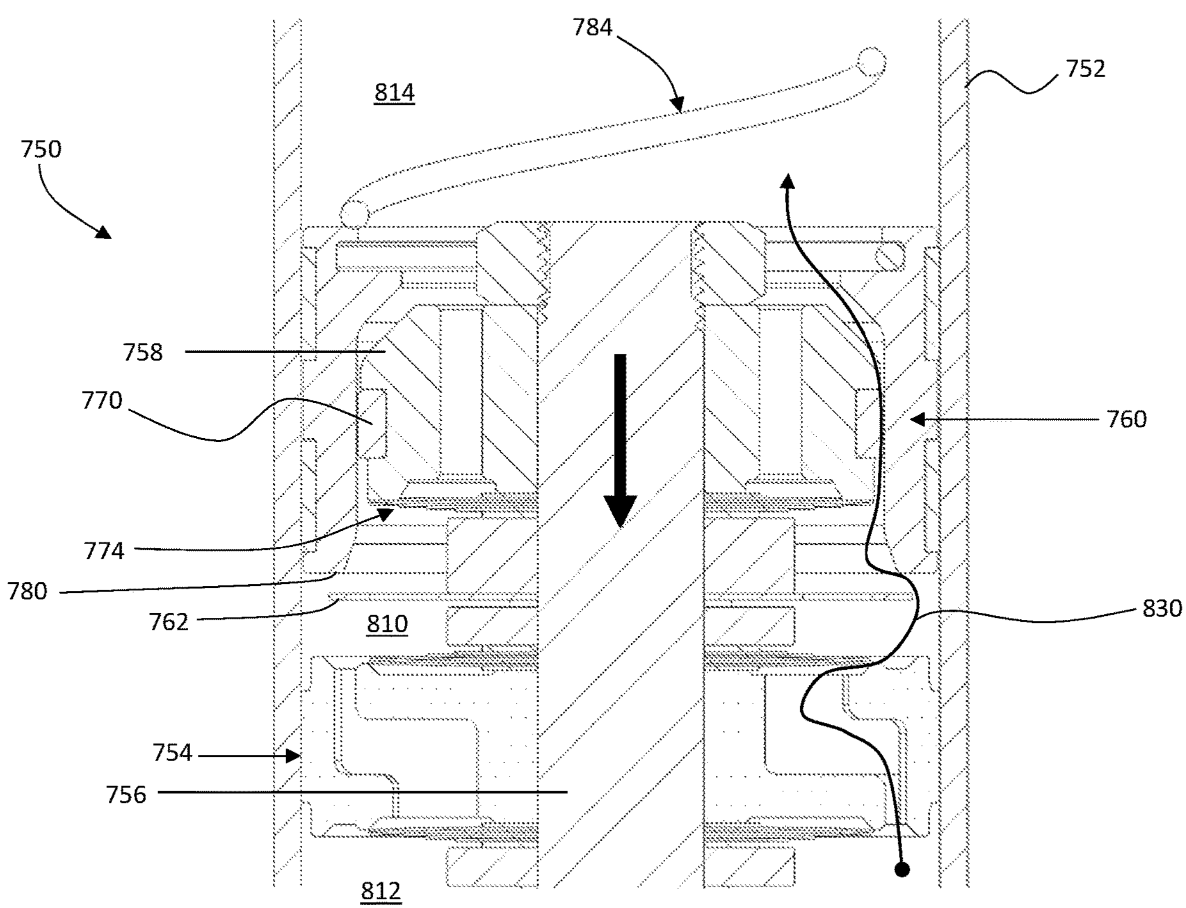
FIG. 17F is a cross-sectional view showing a sixth step in a sequence whereby the example end-stop control valve of FIG. 15 is engaged and then disengaged.

Finally, a return stroke begins in FIG. 17F. Here, the piston rod 756 and the various components secured thereon, including the piston 758, begin retreating from the damper tube 752 as the spring 784 begins to restore the elongate catch piston 760 to the state shown in FIG. 15, for instance. The piston 758 disengages from the elongate catch piston 760. The spring disc 762 elastically returns to a neutral, steady state, as the spring disc 762 had when the spring disc 762 first contacted the elongate catch piston 760, and disengages from the support 780 of the elongate catch piston 760. A pressure differential between the third working chamber 814 and the first and second working chambers 810, 812 as well as the elastic state of the spring disc 762 helps separate the piston 758 from the elongate catch piston 760. Hydraulic fluid begins flowing along a flow path 830 in an opposite direction, namely, from the second working chamber 812, through the main piston 754, into the first working chamber 810, around and/or through the spring disc 762, into the pathway 802 of the piston band 770, and into the third working chamber 814.

Those having ordinary skill in the art will appreciate that the present disclosure contemplates that various parameters of the example end-stop control valve 750 can be modified for different applications. As just one example, the longitudinal extent of the elongate sidewall 772 of the elongate catch piston 760 and/or the longitudinal thickness of the spacer disc 776 can be varied depending on the desired amount of travel within the damper tube 752 during which hydraulic fluid is forced to flow through the pathway 802 of the piston band 770. As additional examples, the stiffness of the spring disc 762 and the dimensions of the pathway(s) 802 of the piston band 770 can be varied to control the manner in and/or extent to which the end-stop control valve 750 eases into the maximum amount of end-of-stroke damping force. Still further, in some examples a piston band may be utilized without a spring disc. In other examples, a spring disc may be utilized without a piston band. Yet another example end-stop control valve may involve a combination of a spring disc, a piston such as the piston 112, and a piston insert such as the valve piston insert 302.

Figure 18:
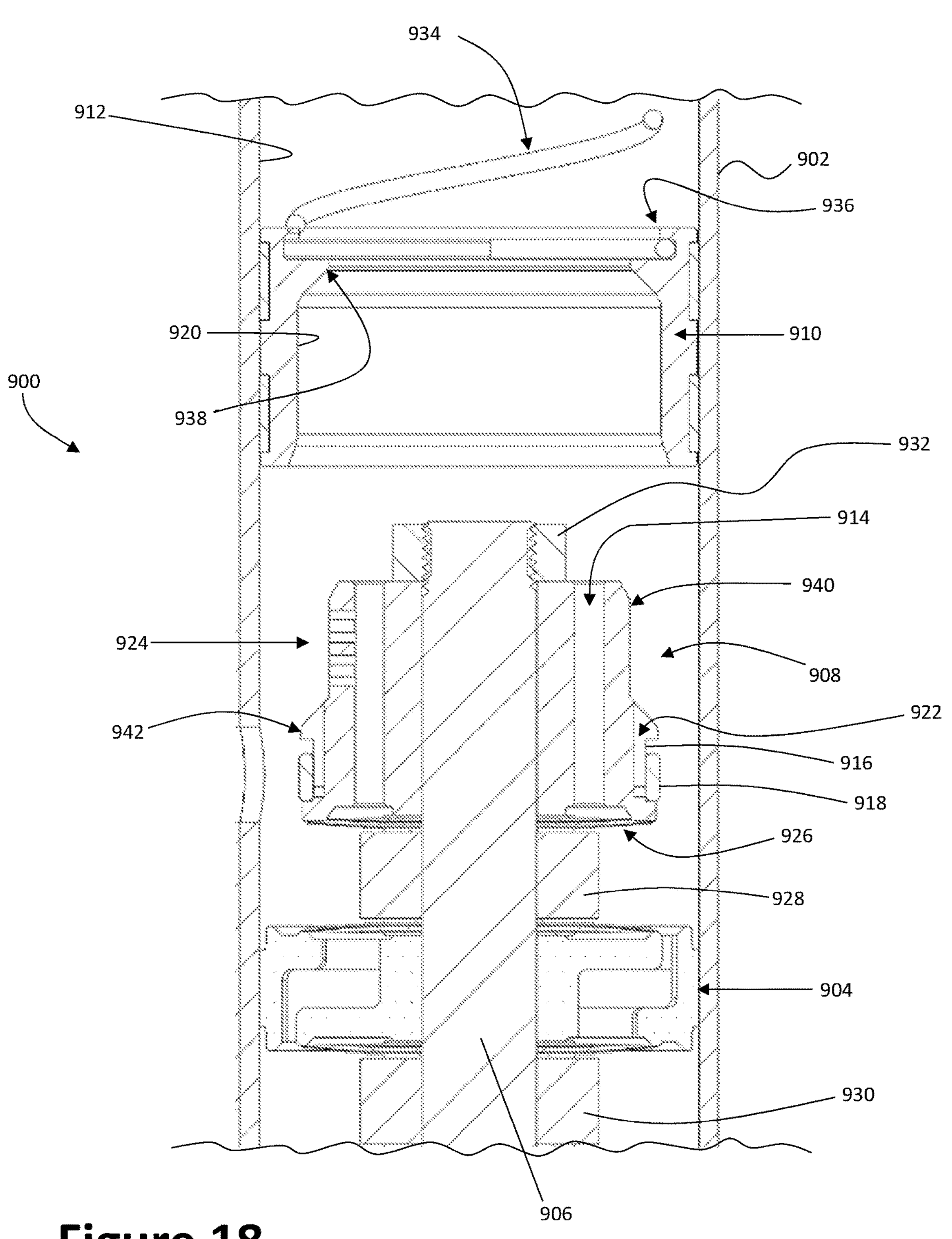
FIG. 18 is a cross-sectional view of still another example end-stop control valve.

Yet another example end-stop control valve 900 is shown within a damper tube 902 in cross section in FIG. 18. The end-stop control valve 900 in FIG. 18 is shown as a form of JCO end-stop control valve, although those having ordinary skill in the art will understand that damper tubes may employ such end-stop control valves for JCO and/or RCO applications. With respect to this example too, the description of the end-stop control valve 900 builds upon and utilizes principles of the disclosure set forth above such that every last detail concerning the end-stop control valve 900 is not reiterated in full below.

The end-stop control valve 900 is disposed on a side of a main piston 904, supported partially on a piston rod 906. The example end-stop control valve 900 generally includes a piston 908 and an elongate catch piston 910. The piston 908 may have a smaller radial extent than an inner wall 912 of the damper tube 902 such that hydraulic fluid can pass around the piston 908 when the piston 908 is not engaged with the elongate catch piston 910. The piston 908 may have passages 914 that extend longitudinally through the piston 908 and through which hydraulic fluid can flow. In some cases, the passages 914 may have circular cross-sections when viewed from a longitudinal perspective. In other cases, though, the passages 914 may be elongated circumferentially, for instance.

The piston 908 may include a circumferential recess 916 in which a piston band 918 is disposed. The piston band 918 may in some cases protrude radially relative to a radial outermost portion of the piston 908. The piston band 918 may be configured to selectively contact an elongate sidewall 920 of the elongate catch piston 910. At least in some examples, the elongate sidewall 920 has a greater longitudinal extent than radial extent. In some instances, the piston band 918 may be similar to the piston band 770 disclosed above, which has one or more longitudinally-extending pathways where hydraulic fluid can bypass a piston when a piston is engaged with an elongate catch piston. In other instances, however, the piston band 918 may completely encircle the piston 908 and/or may lack pathways for hydraulic fluid. The piston band 918 may be comprised of aluminum, steel, glass filled nylon, bronze, nylon, and/or a plastic such as Delrin®.

Further, the recess 916 in the example shown in FIG. 18 has a greater longitudinal extent than the piston band 918. Consequently, the piston band 918 slides to a first longitudinal side of the recess 916 (i.e., the bottom of the recess 916 in FIG. 18) when the piston rod 906 and the piston 908 move deeper into the damper tube 902 in a compression stroke. Conversely, the piston band 918 slides to a second longitudinal side of the recess 916 (i.e., the top of the recess 916 in FIG. 18) when the piston rod 906 and the piston 908 retreat from the damper tube 902. When the piston band 918 is positioned at the bottom of the recess 916 of the piston 908, the piston band 918 covers and effectively closes a bypass duct 922. When the piston band 918 is positioned at the top of the recess 916 of the piston 908, the piston band 918 opens the bypass duct 922 through which hydraulic fluid can flow, even when the piston band 918 is engaged with the elongate sidewall 920 of the elongate catch piston 910.

Another part of the piston 908 may include a series of bypass channels 924 that are longitudinally-spaced apart and fluidically connected to at least one of the passages 914 of the piston 908. The operation of the bypass duct 922 and the bypass channels 924 will be explained below.

Still further, a valve disc stack-up 926 may be secured along the piston rod 906 between the piston 908 and a spacer disc 928. The valve disc stack-up 926 in this example preferably has neutral or positive preload, but negative preload is at least a possibility too. The valve disc stack-up 926 may be elastically deformed during an end-of-stroke damping event to generate end-of-stroke damping force. Furthermore, in the example shown in FIG. 18, at least the piston 908, the valve disc stack-up 926, the spacer disc 928, the main piston 904, and another spacer disc 930 are secured longitudinally along the piston rod 906 between a piston rod assembly fastener 932 and, for example, a shoulder (not shown) of the piston rod 906.

The elongate catch piston 910 is movable longitudinally within the damper tube 902. However, a spring 934 that is received in and/or joined to a base 936 of the elongate catch piston 910 may restore the elongate catch piston 910 to the position shown in FIG. 18 when the elongate catch piston 910 is not engaged. The elongate catch piston 910 may be annular and may be arranged in a sealing manner with respect to the inner wall 912 of the damper tube 902. The elongate catch piston 910 may also have an inner portion 938 that is located at or near the base 902 and protrudes radially inward relative to the elongate sidewall 920. The inner portion 938 of the elongate catch piston 910 may be configured to, at times, physically engage with a first segment 940 of the piston 908, which protrudes longitudinally from a second segment 942 of the piston, with the first segment 940 having a smaller diameter than the second segment 942. In other cases, the inner portion 938 of the elongate catch piston 910 may be configured to, at times, to come within very close proximity of the first segment 940 of the piston 908, without physically engaging the first segment 940, so as to prevent substantially prevent hydraulic fluid from passing between the first segment 940 of the piston 908 and the inner portion 938 of the elongate catch piston 910.

Figure 19:
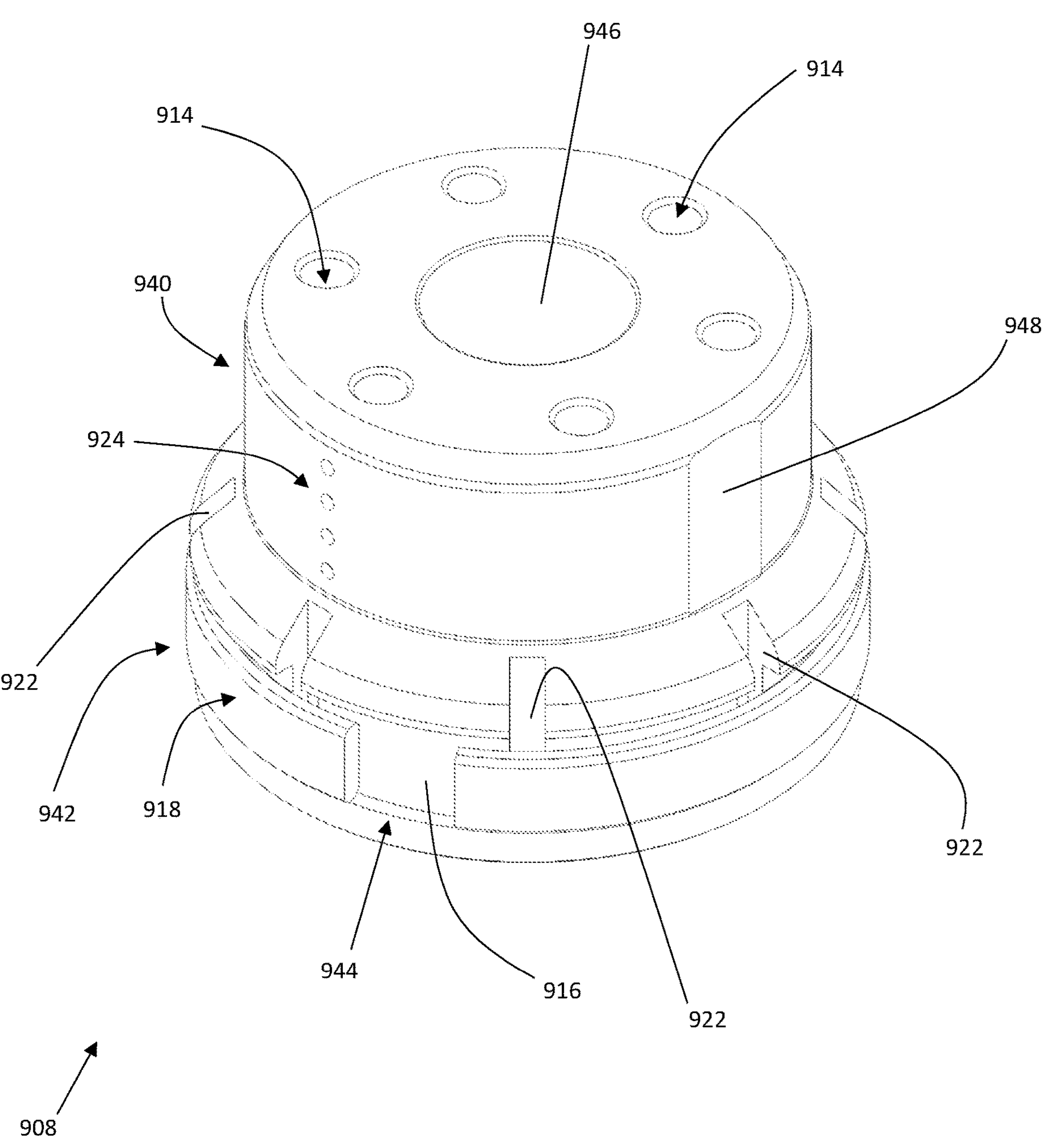
FIG. 19 is an isometric view of a subassembly of the end-stop control valve of FIG. 18.

FIG. 19 shows the piston 908 and the piston band 918 of the end-stop control valve 900. In this example, a pathway 944 of the piston band 918 is formed by a break in the piston band 918, as the piston band 918 only partially surrounds the piston 908 in this example. Nevertheless, the piston band 918 and the circumferential recess 916 are disposed at or along the second segment 942 of the piston band 918. FIG. 19 also illustrates how the example piston 908 may include numerous of the bypass ducts 922. The example bypass ducts 922 here are circumferentially spaced apart along the second segment 942 of the piston 908. A central opening 946 for the piston rod 906 can also be seen in FIG. 19.

Still further, one having ordinary skill in the art will understand from FIG. 19 how the series of bypass channels 924 may be circumferentially aligned with the passages 914 of the piston 908 so as to be able to communicate with the passages 914. In the view shown in FIG. 19, only one series of channels 924 can be seen. However, it should be understood that the piston 908 may in some examples include as many series of channels as there are passages 914 in the piston 908, especially depending on the dimensions and quantity of the series of channels.

Still another aspect to the piston 908 is a constant bypass notch 948 in the first segment 940. The constant bypass notch 948 extends longitudinally along the first segment 940 and permits at least a limited amount of hydraulic fluid to pass between the first segment 940 of the piston 908 and the inner portion 938 of the elongate catch piston 910 when the first segment 940 and the inner portion 938 are engaged or at least overlapping in the longitudinal direction. As will be explained in more detail below, the series of channels 924 and the constant bypass notch 948 complement one another in providing a limited amount of bypass for hydraulic fluid, particularly as end-of-stroke resistance gradually increases prior to the engagement of the piston 908 and the elongate catch piston 910.

Figure 20A:
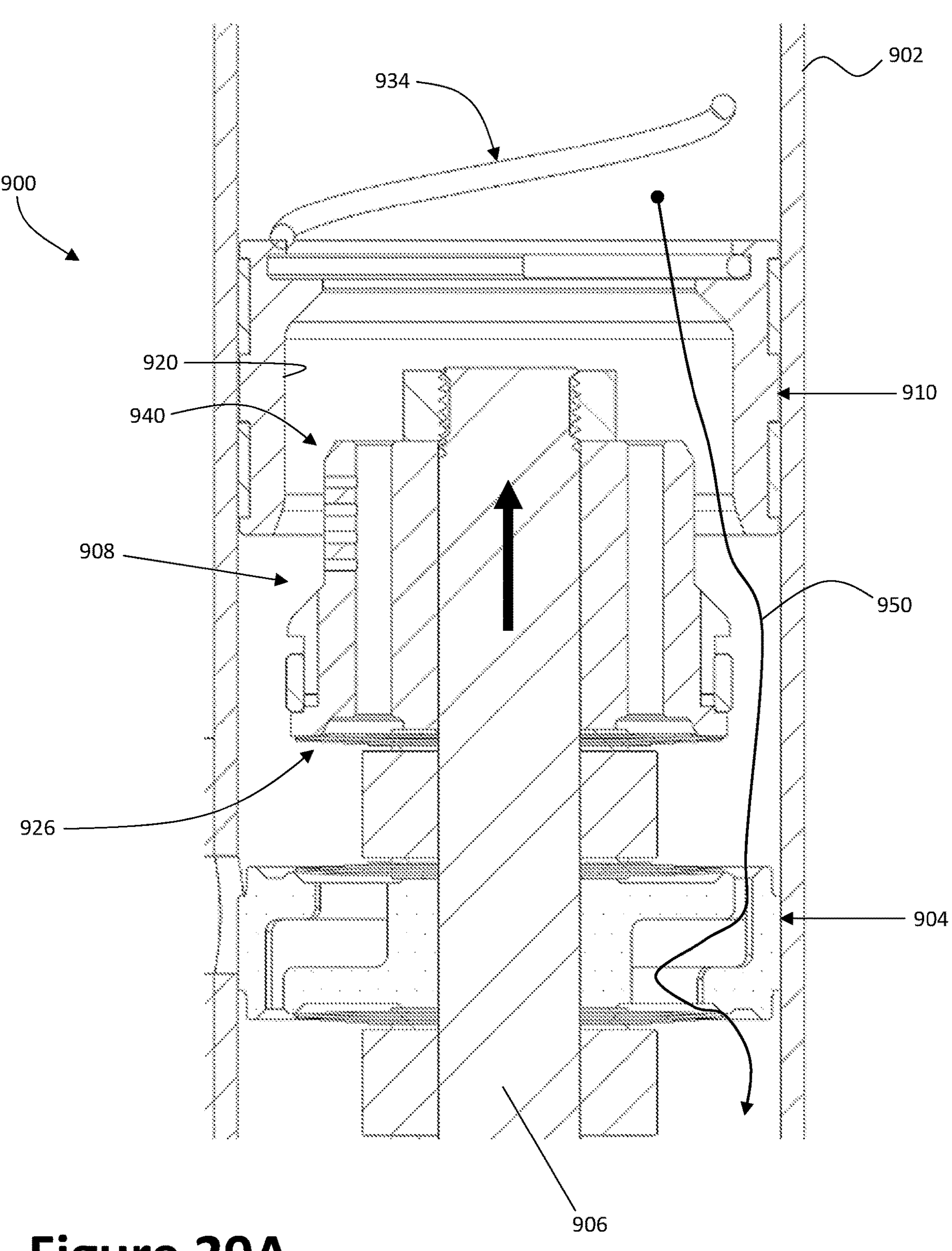
FIG. 20A is a cross-sectional view showing a first step in a sequence whereby the example end-stop control valve of FIG. 18 is engaged and then disengaged.

FIGS. 20A-20F show a sequence illustrating an end-of-stroke damping event. FIG. 20A shows a first step where the piston rod 906 and the piston 908 move deeper into the damper tube 902 and approach the elongate catch piston 910. The first segment 940 of the piston 908 longitudinally overlaps with the elongate sidewall 920 of the elongate catch piston 910, but there is no engagement between the piston 908 or the piston band 918 and the elongate catch piston 910. Hydraulic fluid follows a flow path 950 through the elongate catch piston 910, around the piston 908, and through the main piston 904.

Figure 20B:
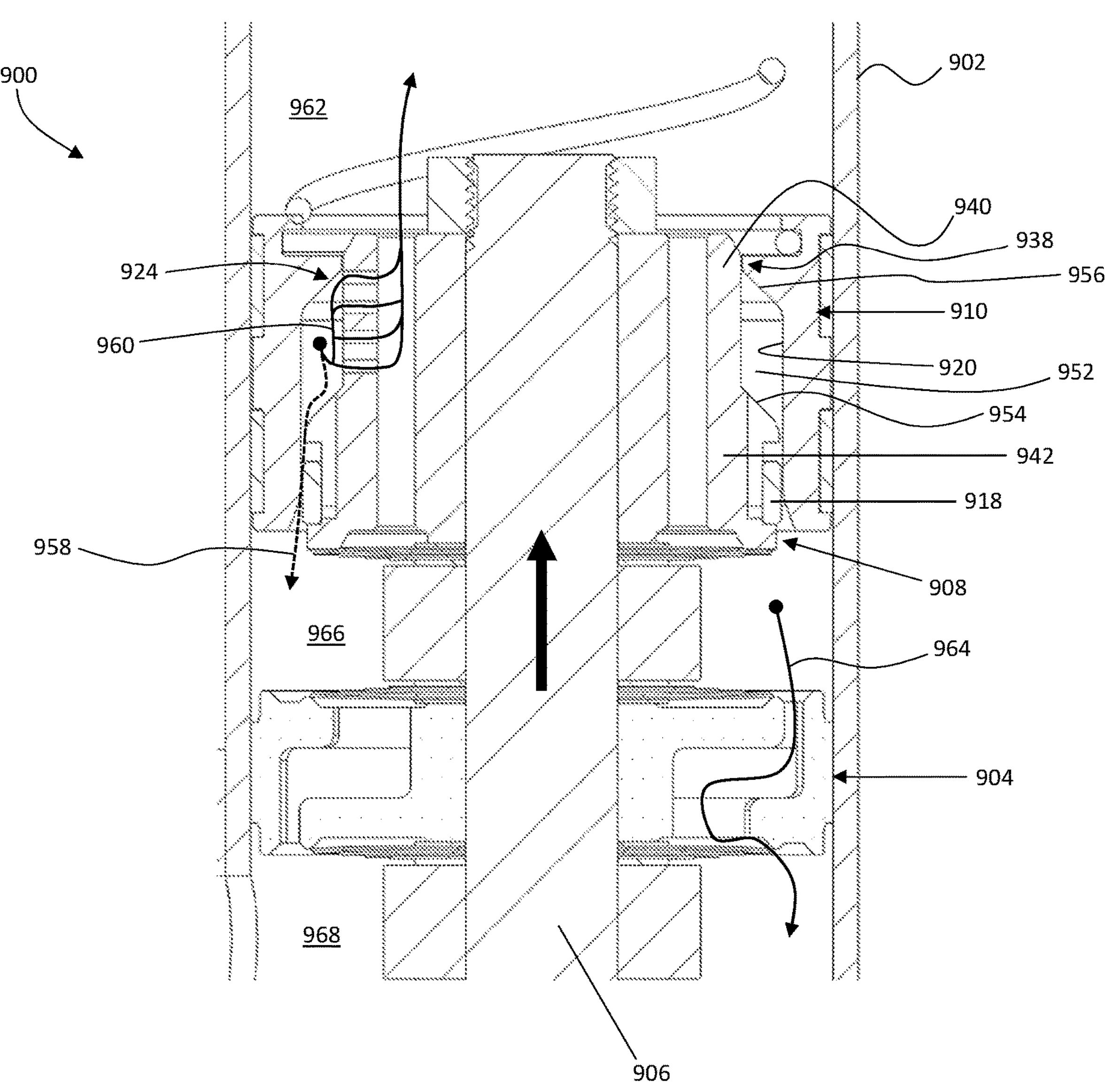
FIG. 20B is a cross-sectional view showing a second step in a sequence whereby the example end-stop control valve of FIG. 18 is engaged and then disengaged.

In the second step represented in FIG. 20B, the piston band 918 comes into contact with the elongate sidewall 920 and, simultaneously, the first segment 940 of the piston 908 is disposed within and longitudinally overlaps with the inner portion 938 of the elongate catch piston 910. The first segment 940 of the piston 908 may be said to "engage" the inner portion 938 of the elongate catch piston 910, with "engage" in this instance meaning either coming into physical contact with or being positioned close enough to prevent substantially all hydraulic fluid from passing between the inner portion 938 of the elongate catch piston 910 and the first segment 940 of the piston 908. Moreover, it should be understood that in other examples these two conditions need not necessarily occur simultaneously. For example, the size(s) and/or shape(s) of a piston, an elongate catch piston, and/or a piston band may be configured such that (i) a first segment of the piston engages an inner portion of the elongate catch piston before the piston band engages an elongate sidewall of the elongate catch piston, or (ii) the piston band engages the elongate sidewall of the elongate catch piston before the first segment of the piston engages the inner portion of the elongate catch piston. Either of these events alone will considerably reduce the amount of bypass around the piston.

Notwithstanding, once the piston band 918 engages the elongate sidewall 920 and the first segment 940 engages the inner portion 938, a pocket 952 of hydraulic fluid that is annular in shape forms between the first segment 940 of the piston, the elongate sidewall 920 of the elongate catch piston 910, the inner portion 938, and the second segment 942 of the piston 908. By restricting the number and type of pathways by which hydraulic fluid can exit this pocket 952, the end-stop control valve 900 begins generating end-of-stroke damping resistance prior to engagement between the piston 908 and the elongate catch piston 910 where a contact surface 954 of the second segment 942 of the piston 908 engages a contact surface 956 of the elongate catch piston 910. Put another way, the pocket 952 acts as a type of hydraulic cushion and helps ease into a peak damping force that is ultimately generated by the end-stop control valve 900.

One way for hydraulic fluid to exit the pocket 952 when the piston 908 and the elongate catch piston 910 are positioned as shown in FIG. 20B is via the constant bypass notch 948, which is not visible in cross-section in FIG. 20B, but can be seen in FIG. 19. Of course, some example pistons do not include such a constant bypass notch, while other pistons may include multiple constant bypass notches. In still other examples, bypass notches may not necessarily have a constant profile in the longitudinal direction. In particular, the profile of the bypass notch may taper towards a second segment of the piston such that the cross-sectional bypass area defined by the bypass notch decreases with proximity to the second segment of the piston. The result of such tapering is an increase in end-of-stroke damping resistance as the piston moves deeper into the damper tube. In yet other examples, one or more constant bypass notches or tapered bypass notches may be integrated into an inner portion of the elongate catch piston rather than on a first segment of the piston.

Another way for hydraulic fluid to exit the pocket 952 when the piston 908 and the elongate catch piston 910 are positioned as shown in FIG. 20B is along a flow path 958 that extends through the pathway 944 of the piston band 918 and hence between the elongate sidewall 920 and the second segment 942 of the piston 908.

Still another way for hydraulic fluid to exit the pocket 952 when the piston 908 and the elongate catch piston 910 are positioned as shown in FIG. 20B is along flow paths 960 that pass through the channels 924, into at least one of the passages 914 of the piston 908, and into a third working chamber 962. As noted above, in some examples numerous or even all of the passages of a piston may be fluidically connected to series of channels. Further, in some cases the cross-sectional area of each successive channel may decrease with proximity to a second segment of the piston. In other words, the channel that is closest to the second segment of the piston may have the smallest cross-sectional area (e.g., diameter), whereas the channel that is farthest from the second segment of the piston may have the largest cross-sectional area. FIG. 20B also shows a flow path 964 by which hydraulic fluid can pass through the main piston 904, from a first working chamber 966 to a second working chamber 968.

Figure 20C:
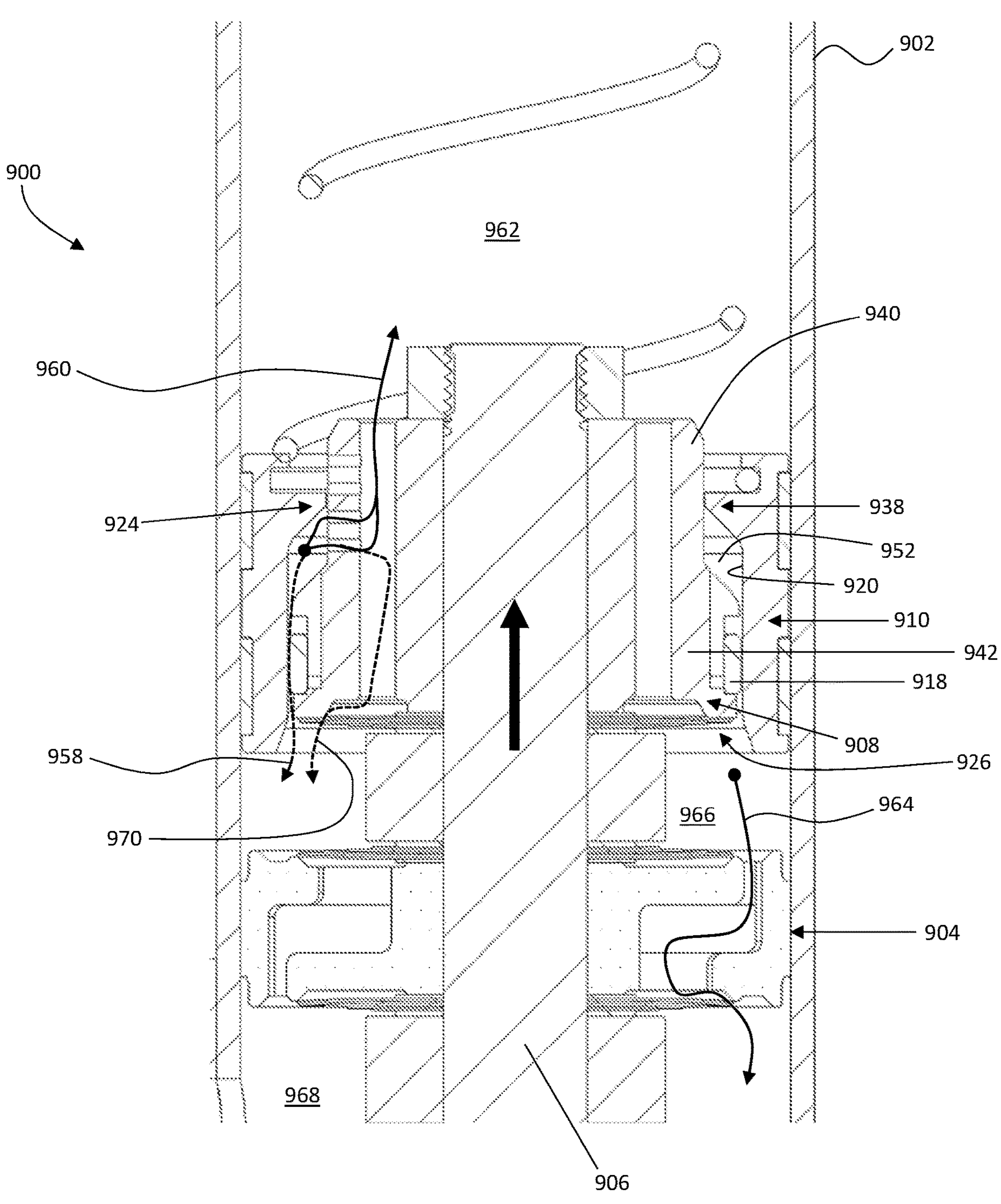
FIG. 20C is a cross-sectional view showing a third step in a sequence whereby the example end-stop control valve of FIG. 18 is engaged and then disengaged.

In a third step, as shown in FIG. 20C, the piston 906 continues to move farther into the damper tube 902, and the size of the pocket 952 between the piston 908 and the elongate catch piston 910 is reduced. Two of the four channels 924 have reached or passed the inner portion 938 of the elongate catch piston 910 and no longer fluidically connect the hydraulic fluid in the pocket 952 to the passage 914 of the piston 908. The end-of-stroke damping resistance provided by the pocket 952 thus increases as the hydraulic fluid therein now has only two of the original four channels 924 by way of which to exit the pocket 952. In general, as the piston 908 approaches the elongate catch piston 910, the cross-sectional area through which hydraulic fluid can travel to and from the pocket 952 decreases.

FIG. 20C also shows a flow path 970 along which hydraulic fluid passes from the pocket 952 to the first working chamber 966. At some point in the stroke, the pressure of the hydraulic fluid in the third working chamber 962 will increase enough to a point where the valve disc stack-up 926 begins to open. The valve disc stack-up 926 may open before the pocket 952 is drained of hydraulic fluid and, if it does, at least some portion of the hydraulic fluid that is leaving the pocket 952 and entering the passage 914 of the piston 908 may take the flow path 970 towards the first working chamber 966 instead of the third working chamber 962. In some examples, hydraulic fluid that travels along the flow path 970 may pass through a bypass disc in the valve disc stack-up 926, regardless of whether the valve disc stack-up 926 opens or not.

Figure 20D:
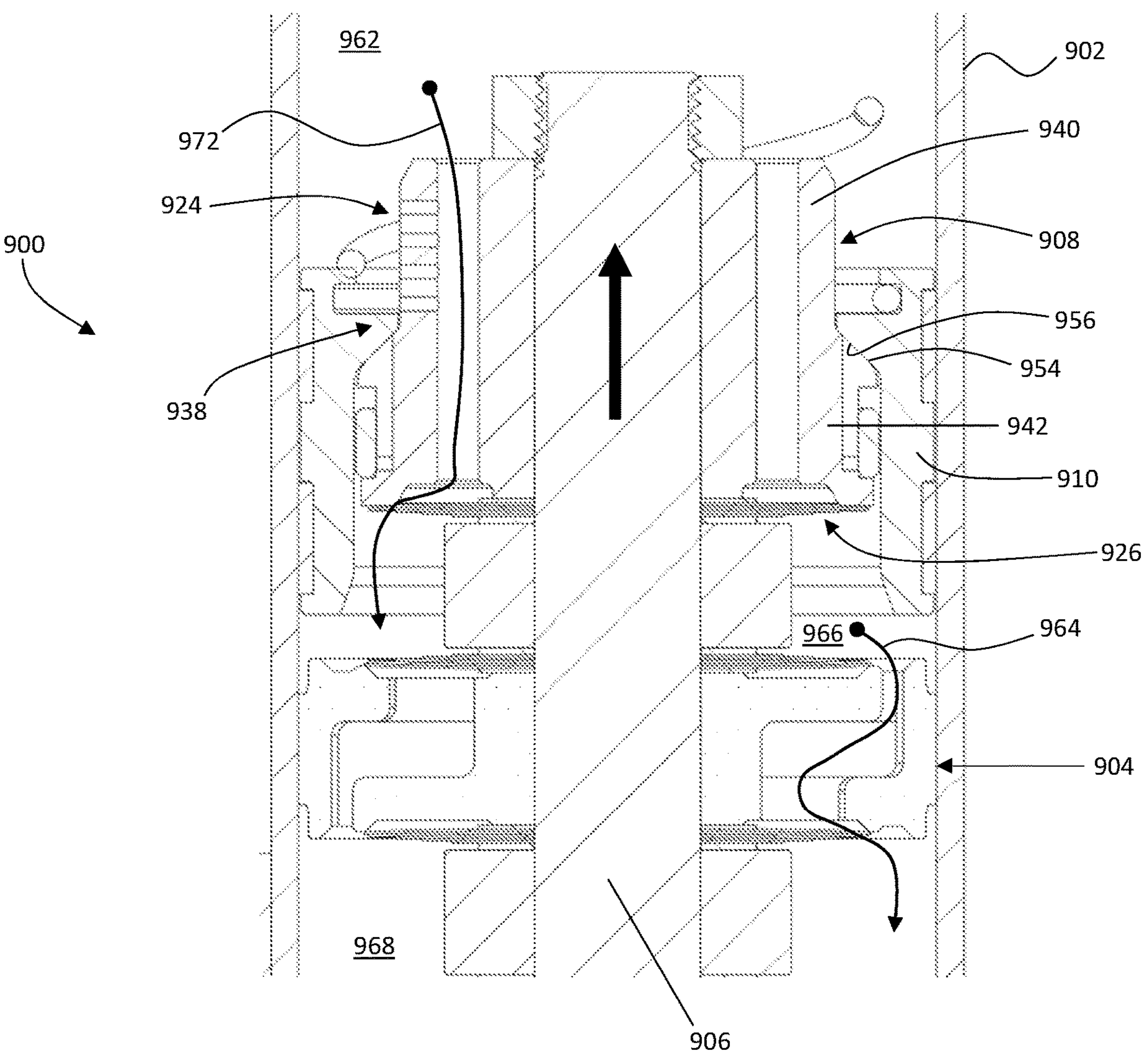
FIG. 20D is a cross-sectional view showing a fourth step in a sequence whereby the example end-stop control valve of FIG. 18 is engaged and then disengaged.

With respect now to FIG. 20D, in a fourth step the pocket 952 is drained, and the contact surface 954 of the second segment 942 of the piston 908 engages the contact surface 956 of the elongate catch piston 910. The piston 908 displaces the elongate catch piston 910 farther into the damper tube 902, increasing the pressure of the hydraulic fluid in the third working chamber 962. To pass from the third working chamber 962 to the first working chamber 966, hydraulic fluid must follow a flow path 972 through the passages 914 of the piston 908 and deflect the valve disc stack-up 926. The end-stop control valve 900 outputs a peak end-of-stroke damping resistance.

Figure 20E:
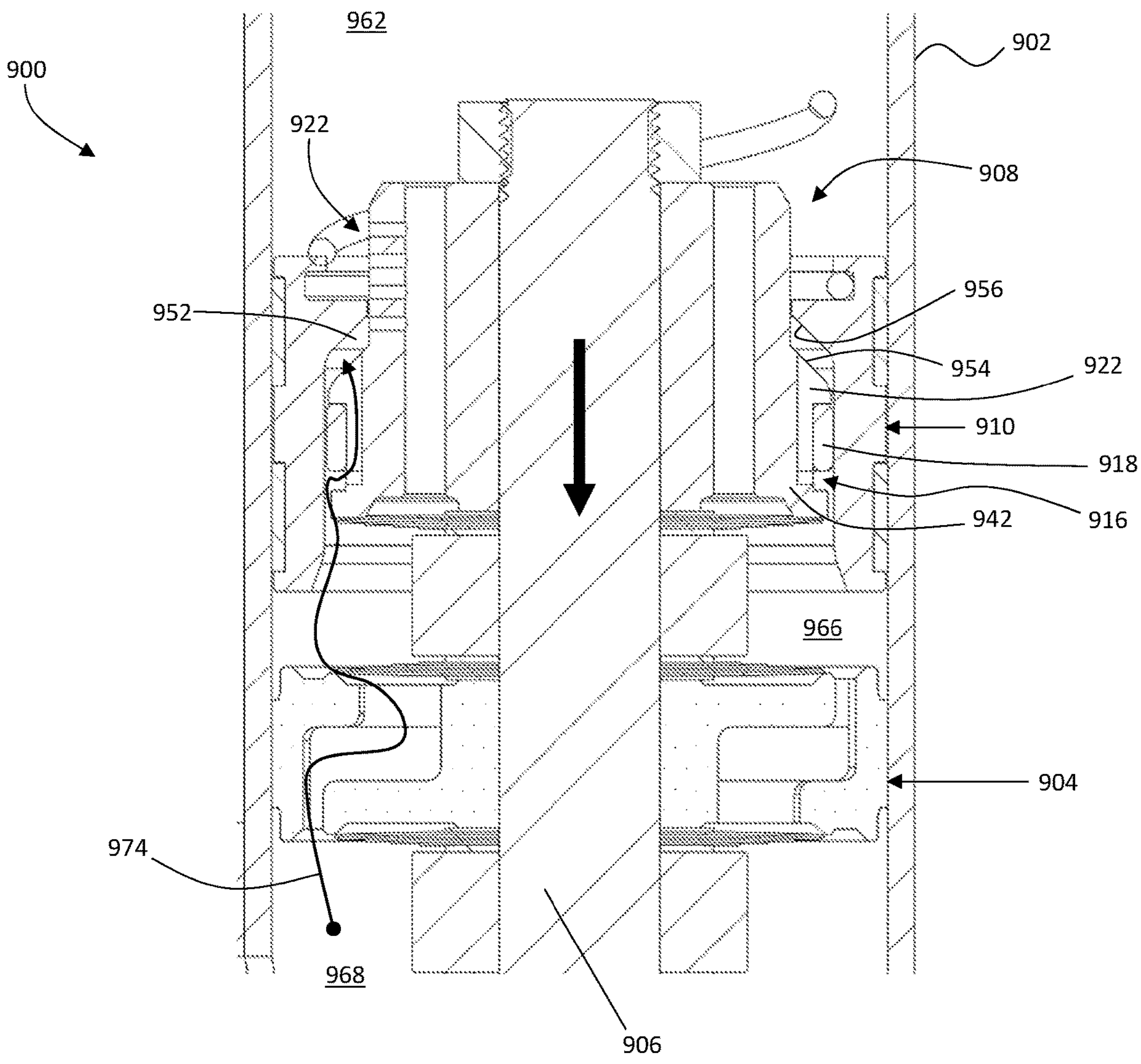
FIG. 20E is a cross-sectional view showing a fifth step in a sequence whereby the example end-stop control valve of FIG. 18 is engaged and then disengaged.

In a fifth step, as shown in FIG. 20E, the piston 908 and the piston rod 906 begin retreating from the damper tube 902. The contact surface 954 of the second segment 942 of the piston 908 separates from the contact surface 956 of the elongate catch piston 910 as the pocket 952 starts refilling and increases in size. As the piston 908 begins retreating from the damper tube 902, the piston band 918 slides to a second longitudinal side of the recess 916 (i.e., the top of the recess 916 in FIG. 20E) to open the bypass ducts 922. Hydraulic fluid may then follow a flow path 974 from the second working chamber 968, through the main piston 904, into the first working chamber 966, through the bypass ducts 922, and into the pocket 952. At least some hydraulic fluid may also flow from the third working chamber 962, through the bypass ducts 922, and into the pocket 952. Though not shown in FIG. 20E, at least some hydraulic fluid may also flow from the first working chamber 966, through the pathway 944 in the piston band 918, and into the pocket 952.

Figure 20F:
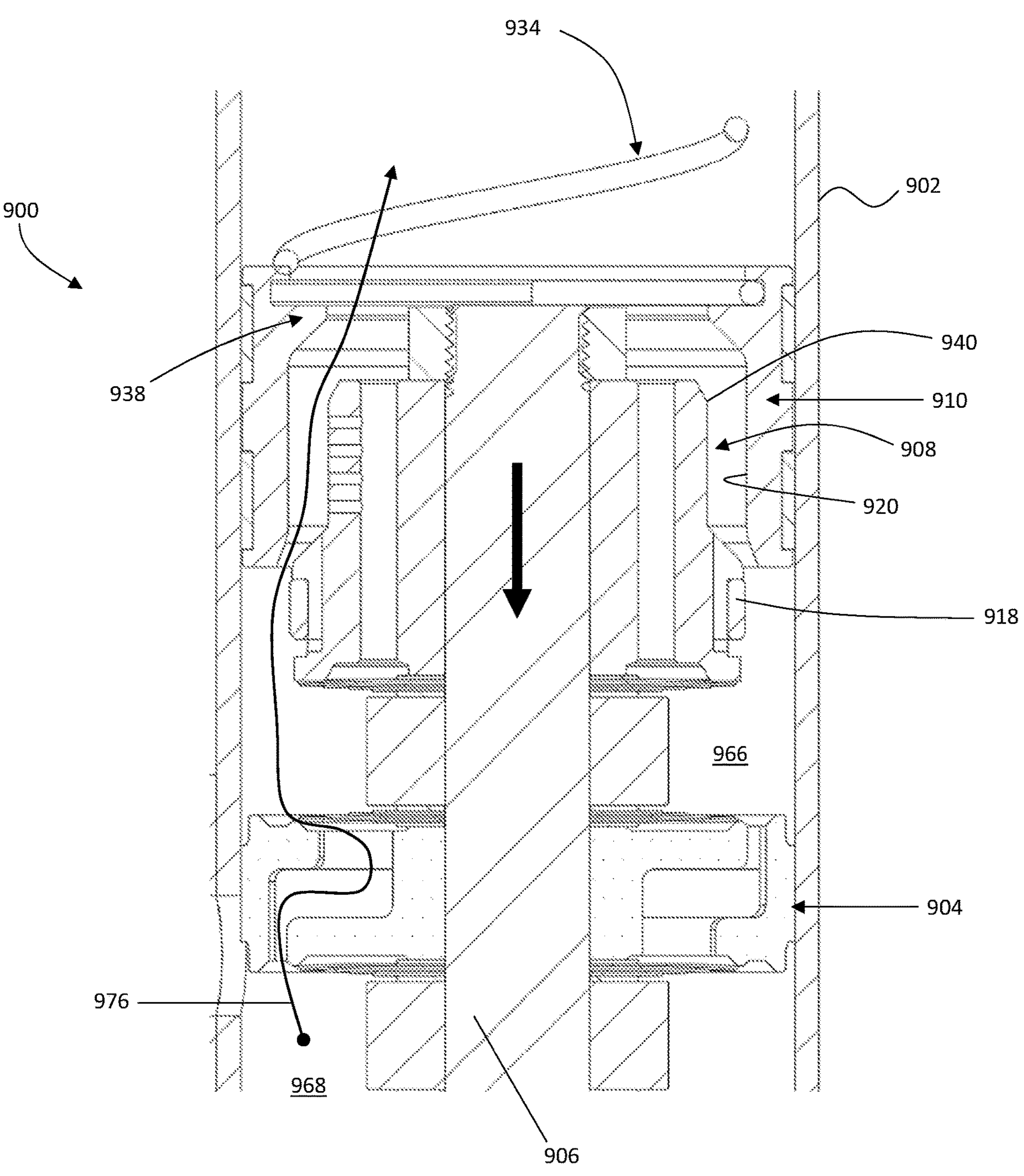
FIG. 20F is a cross-sectional view showing a sixth step in a sequence whereby the example end-stop control valve of FIG. 18 is engaged and then disengaged.

FIG. 20F shows a sixth step where the piston 908 and the piston rod 906 continue to retreat from the damper tube 902. Here the piston band 918 has disengaged from the elongate sidewall 920 of the elongate catch piston 910, and the first segment 940 of the piston 908 has disengaged from the inner portion 938 of the elongate catch piston 910. The pocket 952 no longer exists between the piston 908 and the elongate catch piston 910. Hydraulic fluid can follow a flow path 976 from the second working chamber 968, through the main piston 904, into the first working chamber 966, and around the piston 908 and through the elongate catch piston 910. Meanwhile, the spring 934 begins to restore the elongate catch piston 910 to the position shown in FIG. 18, and pressures on both sides of the end-stop control valve 900 quickly equalize.

Figure 21:
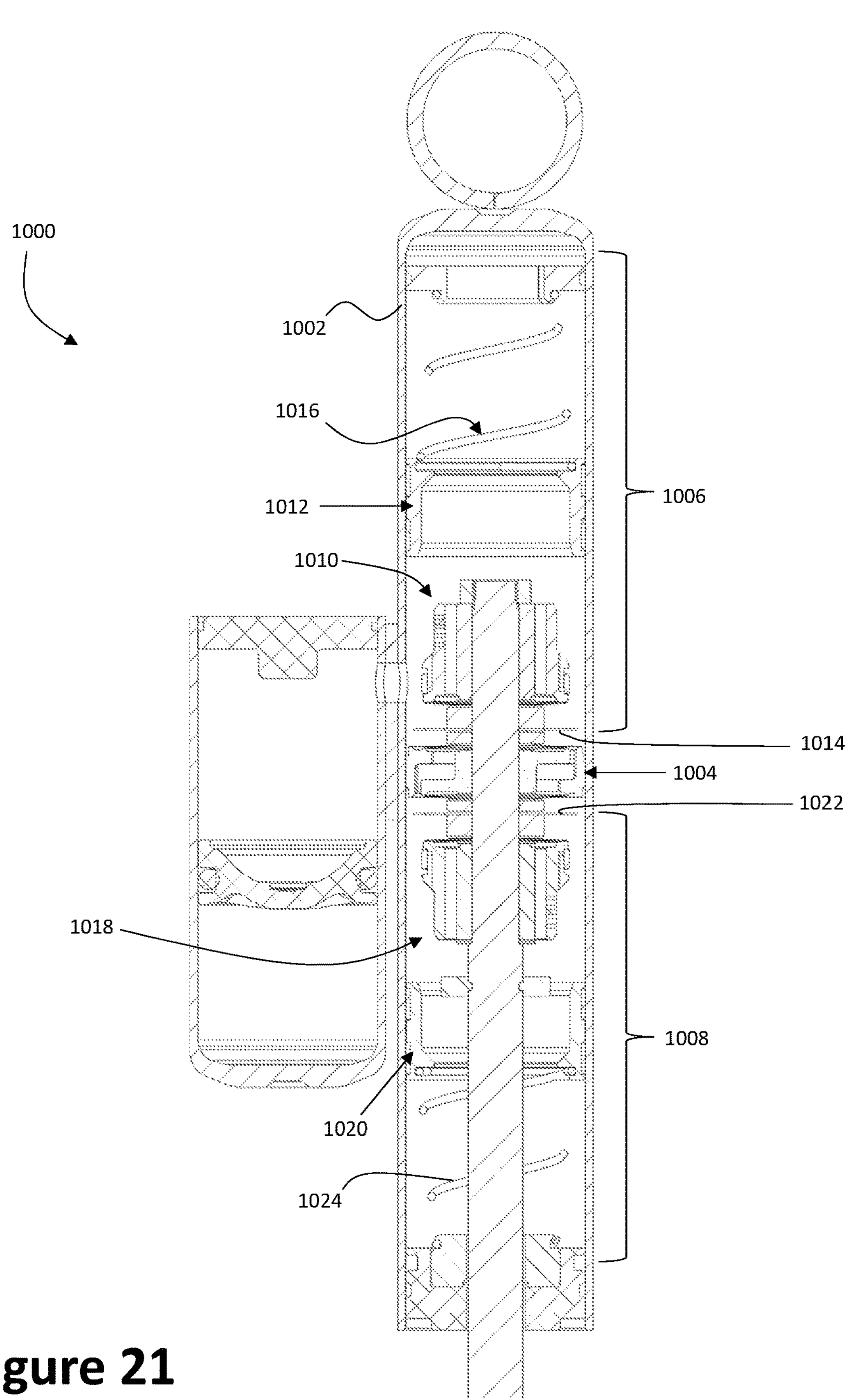
FIG. 21 is a cross-sectional view showing yet a further example end-stop control valve.

Turning to still another example, FIG. 21 shows in cross section an example vibration damper 1000. In relevant part, the vibration damper 1000 includes a damper tube 1002, a main piston 1004, a JCO end-stop control valve 1006 on a first longitudinal side of the main piston 1004, and an RCO end-stop control valve 1008 on a second longitudinal side of the main piston 1004. The JCO end-stop control valve 1006 may generally include a JCO piston 1010, a JCO elongate catch piston 1012, a JCO spring disc 1014, and a JCO spring 1016. Similarly the RCO end-stop control valve 1008 may generally include an RCO piston 1018, an RCO elongate catch piston 1020, an RCO spring disc 1022, and an RCO spring 1024. In this example the end-stop control valves 1006, 1008 may be configured similar to the example end-stop control valve 900 described above. Likewise, in this example the spring disc 1014, 1022 may be configured similar to the example spring disc 762 described above. Hence the example vibration damper 1000 is utilizing end-stop control valves for both JCO and RCO. Furthermore, each end-stop control valve 1006, 1008 combines multiple features that help ease into peak end-of-stroke damping resistance, such as the spring discs 1014, 1022 and the pistons 1010, 1018 and elongate catch pistons 1012, 1020 that are configured to form a pocket for hydraulic fluid just prior to engagement of, respectively, the pistons 1010, 1018 and the elongate catch pistons 1012, 1020. Those having ordinary skill in the art will appreciate how different features disclosed above may be combined and may complement one another so as to further improve NVH characteristics associated with the initiation of end-of-stroke damping.

Figure 22:
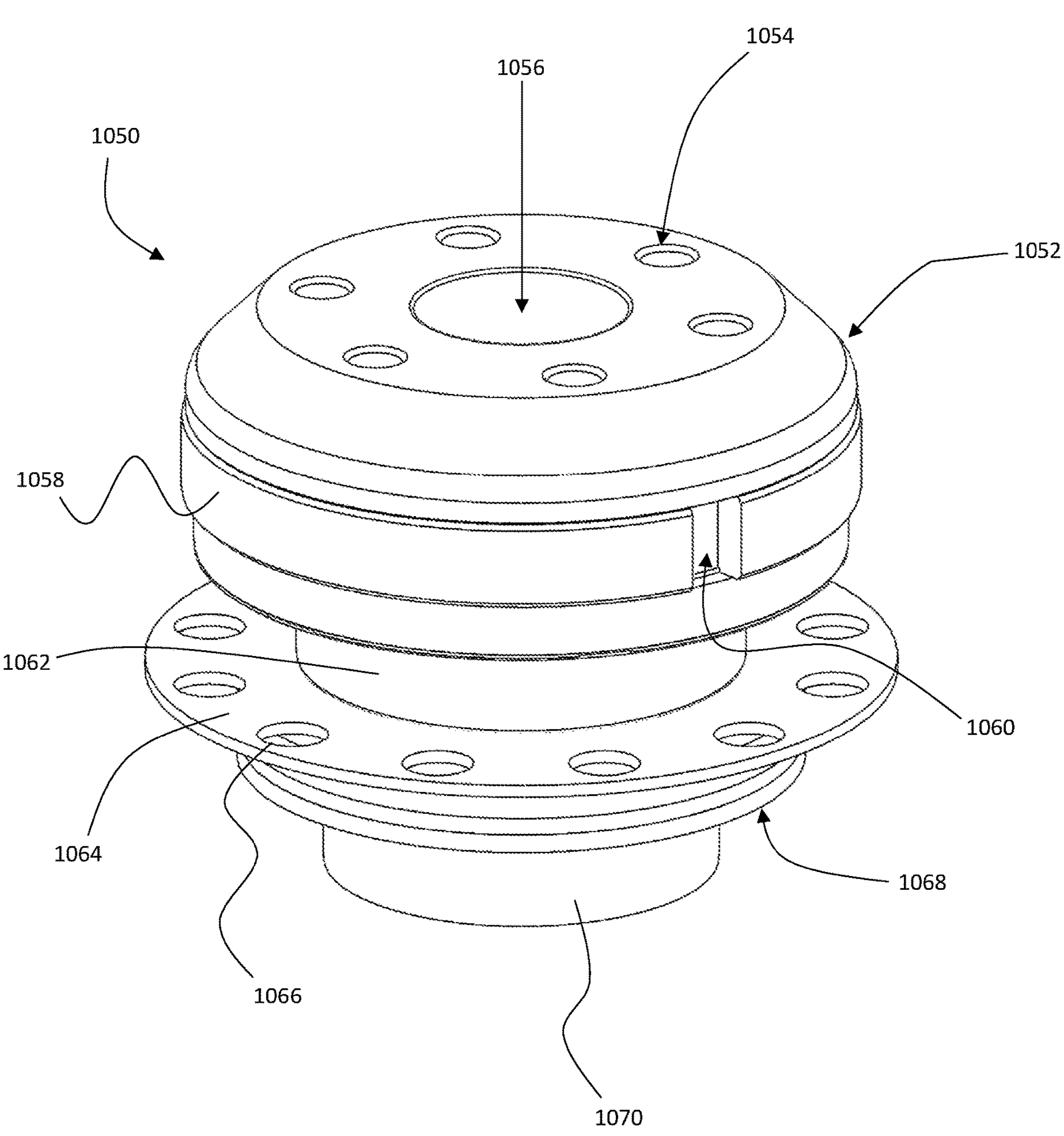
FIG. 22 is an isometric view of a subassembly of an end-stop control valve.

FIG. 22 shows a subassembly 1050 of another example end-stop control valve. The subassembly 1050 in this example may in many respects resemble one or more of the end-stop control valves, or at least subassemblies thereof, disclosed above. For instance, the subassembly 1050 in FIG. 22 includes a piston 1052 with passages 1054 through which hydraulic fluid can travel and with a central opening 1056 for a piston rod. A piston band 1058 that includes a pathway 1060 for hydraulic fluid may be secured on the piston 1052. A spacer disc 1062 may space a spring disc 1064, which has openings 1066 for hydraulic fluid, longitudinally apart from a valve disc stack-up (not shown) that is adjacent to one longitudinal side of the piston 1052.

Unlike the example end-stop control valves disclosed above, in this example a spring 1068 that is adjacent to and in contact with the spring disc 1064 is disposed on a spacer hub 1070 that can be secured on the piston rod. The spring 1068 may take a wide variety of forms, such as, for example, a Belleville spring/washer (also referred to as a “disk spring”), multiple Belleville springs/washers arranged longitudinally in alternating fashion, a helical compression spring, a conical spring, and so on.

Figure 23:
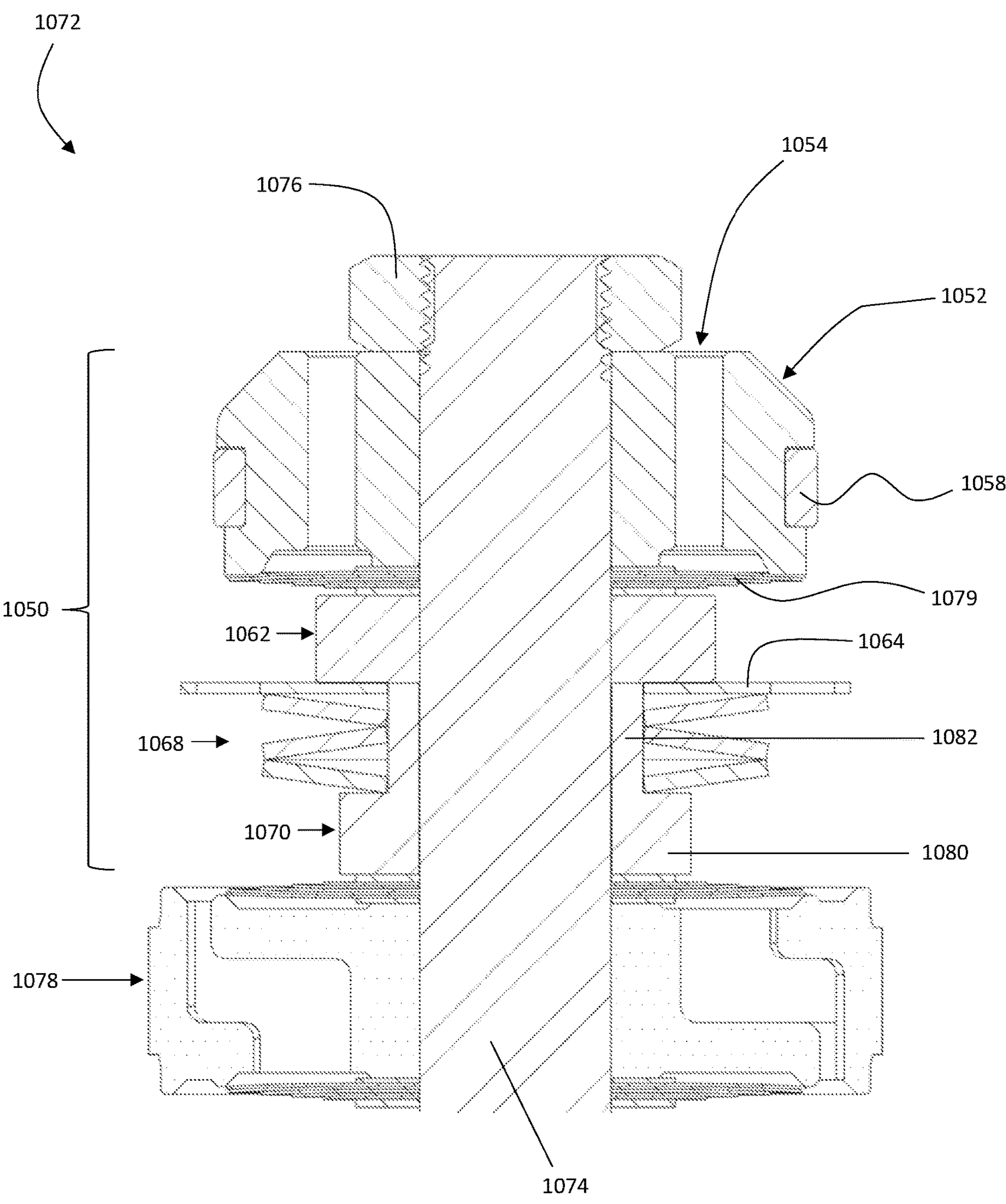
FIG. 23 is a cross-sectional view through an end-stop control valve that includes the subassembly of FIG. 22.

FIG. 23 shows a cross-sectional view through at least part of an end-stop control valve 1072 that includes the subassembly 1050 shown in FIG. 22. In particular, FIG. 23 shows the subassembly 1050 from FIG. 22 disposed along a piston rod 1074, secured longitudinally at least on one end by a piston rod assembly fastener 1076, and on one longitudinal side of a main piston 1078. A valve disc stack-up 1079 is also shown in FIG. 23. The cross-sectional view in FIG. 23 better illustrates one example way in which the spacer hub 1070 may be configured, with the spring 1068 supported longitudinally by and/or on a first portion 1080 of the spacer hub 1070 and disposed around and stabilized by a second portion 1082 of the spacer hub 1070, with the second portion 1082 of the spacer hub 1070 having a smaller radius than the first portion 1080. The second portion 1082 of the spacer hub 1070 is shown here to extend through an opening of the spring disc 1064 and contact the spacer disc 1062. Thus, although the spacer hub 1070 is fixed longitudinally along the piston rod 1074, the spring disc 1064 is supported longitudinally by the spring 1068 and thus flexibly due to the longitudinal elasticity associated with the spring 1068.

Consequently, when the spring disc 1064 contacts a support of an elongate catch piston (similarly to FIG. 17C), the resistance that the piston 1052 begins to experience will be attributable to not only elastic deformation of the spring disc 1064 in a longitudinal direction, but also due to the compression of the spring 1068 in the longitudinal direction. In essence, the spring 1068 adjacent to the spring disc 1064 provides even more cushion prior to engagement of the piston 1052 and an elongate catch piston. As this occurs, the spring disc 1064 may separate in a longitudinal direction from the spacer disc 1062 during compression of the spring 1068. In other examples, the sizes, shapes, and/or material compositions of the spring disc and the spring may be configured such that the spring compresses but such that the spring disc does not deform elastically or deforms only minimally. In still other examples, the spring may have a larger diameter and may even contact the support or another surface of the elongate catch piston, with or without the presence of a spring disc.

What is claimed is:

1. An end-stop control valve comprising:

a piston that is configured to move longitudinally within a damper tube, the piston having a valve seat;

a valve disc stack-up, wherein a radially outer portion of the valve disc stack-up is supported on the valve seat;

a catch piston with which the piston is configured to engage during an end-of-stroke damping event, the catch piston being movable longitudinally within the damper tube;

a piston band that is disposed on the piston and at least partially surrounds the piston, wherein as the end-of-stroke damping event begins the piston band is configured to engage the catch piston before the piston engages the catch piston, wherein the piston band includes a pathway that extends longitudinally and permits hydraulic fluid to flow from a first longitudinal side of the catch piston to a second longitudinal side of the catch piston before the piston engages with the catch piston; and a spring disc that is configured to move longitudinally with the piston within the damper tube, wherein as the end-of-stroke damping event begins the spring disc is configured to engage a support of the catch piston before the piston engages the catch piston.

2. The end-stop control valve of claim 1 wherein the piston band is a split ring and the pathway is formed by a break in the split ring, wherein the piston band is positionable radially within an elongate sidewall of the catch piston, wherein the elongate sidewall has a longitudinal extent that is greater than a radial extent.

3. The end-stop control valve of claim 1 wherein the piston band is disposed in a recess of the piston that extends circumferentially in a radial plane, wherein the piston band protrudes radially relative to a radial outermost portion of the piston.

4. The end-stop control valve of claim 1 configured such that engagement of the piston and the catch piston closes a flow path for hydraulic fluid that extends through the pathway of the piston band, from the first longitudinal side of the catch piston to the second longitudinal side of the catch piston.

5. The end-stop control valve of claim 1 wherein while the piston band is engaged with the catch piston and the valve disc stack-up is positioned on the valve seat of the piston, the pathway of the piston band amounts to a main flow path for hydraulic fluid to pass from the first longitudinal side of the catch piston to the second longitudinal side of the catch piston.

6. The end-stop control valve of claim 1 wherein when the spring disc contacts the support of the catch piston, but prior to any deformation of the spring disc, a first contact surface of the piston is spaced longitudinally apart 0.4 mm to 1.2 mm from a second contact surface of the catch piston.

7. The end-stop control valve of claim 1 wherein the spring disc is in a neutral, steady state and not elastically deformed when the spring disc initially makes contact with the support of the catch piston, wherein the spring disc is elastically deformed in a longitudinal direction to a state of maximum deformation when the piston contacts the catch piston, wherein the spring disc provides end-of-stroke resistance as the spring disc elastically deforms from the neutral, steady state to the state of maximum deformation.

8. The end-stop control valve of claim 1 wherein the spring disc includes openings through which hydraulic fluid can pass, wherein the openings in the spring disc are spaced circumferentially about the spring disc.

9. The end-stop control valve of claim 1 wherein a washer is in direct contact with a side of the spring disc, wherein a spacer disc is in direct contact with the washer, wherein the washer is configured as a fulcrum about which the spring disc bends, wherein a diameter of the washer is 28%-48% of a diameter of the spring disc, wherein a diameter of the spacer disc is larger than the diameter of the washer.

10. The end-stop control valve of claim 1 wherein an outer diameter of the spring disc is greater than an inner diameter of a sidewall of the catch piston, wherein the inner diameter of the sidewall of the catch piston is larger than an outer diameter of the piston band.

11. The end-stop control valve of claim 1 wherein as the end-of-stroke damping event begins the piston band is configured to contact the catch piston and contribute end-of-stroke resistance before the spring disc contacts the catch piston.

12. The end-stop control valve of claim 1 wherein the valve disc stack-up and the spring disc are configured such that a force that is required to deflect the valve disc stack-up off the valve seat of the piston is greater than a force that is required to elastically deform the spring disc in a longitudinal direction.

13. The end-stop control valve of claim 1 wherein the valve disc stack-up and the spring disc are configured such that a force that is required to elastically deform the spring disc in a longitudinal direction is greater than a force that is required to deflect the valve disc stack-up off the valve seat of the piston.

14. An end-stop control valve comprising:

a piston that is configured to move longitudinally within a damper tube, the piston having a valve seat;

a valve disc stack-up, wherein a radially outer portion of the valve disc stack-up is supported on the valve seat, the radially outer portion of the valve disc stack-up being configured to deflect away from the valve seat of the piston at times;

a catch piston with which the piston is configured to engage during an end-of-stroke damping event, the catch piston being movable longitudinally within the damper tube; and a piston band that is disposed on the piston, at least partially surrounds the piston, protrudes radially relative to a radial outermost portion of the piston, and is positionable radially within a sidewall of the catch piston, wherein as the end-of-stroke damping event begins the piston band is configured to engage the catch piston before the piston engages the catch piston, wherein the piston band includes a pathway that extends longitudinally and permits hydraulic fluid to flow from a first longitudinal side of the catch piston to a second longitudinal side of the catch piston before the piston engages with the catch piston, wherein the piston band is configured such that hydraulic fluid can pass around the piston band when the piston band is not engaged with the catch piston.

15. The end-stop control valve of claim 14 configured such that engagement of the piston and the catch piston closes a flow path for hydraulic fluid that extends through the pathway of the piston band, from the first longitudinal side of the catch piston to the second longitudinal side of the catch piston.

16. An end-stop control valve comprising:

a piston that is configured to move longitudinally within a damper tube, the piston having a valve seat;

a valve disc stack-up, wherein a radially outer portion of the valve disc stack-up is supported on the valve seat, the radially outer portion of the valve disc stack-up being configured to deflect away from the valve seat of the piston at times during operation of the end-stop control valve;

a catch piston with which the piston is configured to engage during an end-of-stroke damping event, the catch piston being movable longitudinally within the damper tube;

a spring disc that is configured to move longitudinally within the damper tube with the piston, wherein the spring disc is not part of the valve disc stack-up and is spaced apart from the valve disc stack-up such that the spring disc is not supported on the valve seat with the valve disc stack-up, wherein as the end-of-stroke damping event begins the spring disc is configured to engage a support of the catch piston before the piston engages the catch piston; and a spring that is disposed longitudinally adjacent to the spring disc, wherein the spring disc and the spring are configured such that as the end-of-stroke damping event begins and the spring disc contacts the catch piston, the spring compresses and resists movement of the piston towards the catch piston;

wherein in a first position the spring disc is not elastically deformed in a longitudinal direction when the spring disc initially contacts the support of the catch piston, wherein in a second position the spring disc is elastically deformed in the longitudinal direction when the piston contacts the catch piston.

17. The end-stop control valve of claim 16 comprising a valve piston insert, wherein at one or more longitudinal locations a portion of the valve piston insert is disposed radially within the piston, wherein the piston is longitudinally movable relative to the valve piston insert in an assembled state of the end stop control valve, wherein a radially inner portion of the valve disc stack-up is supported on a hub of the valve piston insert.

18. The end-stop control valve of claim 17 wherein the piston and the valve piston insert are configured such that a preload, which is based on a longitudinal distance between the valve seat and the hub of the valve piston insert, increases from an initial preload to a maximum preload during the end-of-stroke damping event.

* * * * *